(12) United States Patent
Reyes et al.

(10) Patent No.: US 10,921,605 B2
(45) Date of Patent: Feb. 16, 2021

(54) SYSTEMS, DEVICES, AND METHODS FOR NOTIFICATION MANAGEMENT

(71) Applicant: GOOGLE LLC, Mountain View, CA (US)

(72) Inventors: Gabriel Reyes, Dexter, MI (US); Mélodie Vidal, Kitchener (CA); Daniel Perry, Waterloo (CA); Antonio Gomes, Lousã (PT)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/527,540

(22) Filed: Jul. 31, 2019

(65) Prior Publication Data

US 2020/0041803 A1 Feb. 6, 2020

Related U.S. Application Data

(60) Provisional application No. 62/714,489, filed on Aug. 3, 2018.

(51) Int. Cl.

| G02B 27/01 | (2006.01) |
| G06F 3/01 | (2006.01) |
| G06K 9/00 | (2006.01) |
| G09G 5/30 | (2006.01) |
| G10L 15/22 | (2006.01) |
| G10L 25/18 | (2013.01) |
| G10L 25/63 | (2013.01) |
| G08B 6/00 | (2006.01) |

(52) U.S. Cl.
CPC ..... *G02B 27/0179* (2013.01); *G02B 27/0172* (2013.01); *G06F 3/012* (2013.01); *G06F 3/013* (2013.01); *G06F 3/016* (2013.01); *G06K 9/00302* (2013.01); *G06K 9/00335* (2013.01); *G06K 9/00362* (2013.01); *G09G 5/30* (2013.01); *G10L 15/22* (2013.01); *G10L 25/18* (2013.01); *G10L 25/63* (2013.01); *G02B 2027/0141* (2013.01); *G02B 2027/0187* (2013.01); *G08B 6/00* (2013.01); *G09G 2354/00* (2013.01)

(58) Field of Classification Search
CPC combination set(s) only.
See application file for complete search history.

(56) References Cited

U.S. PATENT DOCUMENTS

| 2013/0044130 A1* | 2/2013 | Geisner | G06F 3/002 |
| | | | 345/633 |
| 2016/0086241 A1* | 3/2016 | Proulx | H04L 67/26 |
| | | | 705/26.4 |

* cited by examiner

*Primary Examiner* — Deeprose Subedi

(57) ABSTRACT

Systems, devices, and methods for notification management are described. At least one processor determines whether a user is interacting with another human based on user context data from at least one user context sensor, such as a microphone, a camera, an IMU, an eye tracking system, or proximity sensors, and modifies presentation of notification content if the user is interacting with another human. Modification of presentation of notification content can include repositioning or resizing displayed notification content; modifying intensity, frequency, or pattern of vibratory notification presentation; changing visual notification presentation to vibratory presentation; changing vibratory notification presentation to visual presentation; and delaying presentation of notification content, for example. The at least one processor can also analyze priority level of at least one notification to determine whether presentation of the notification content should be modified, or whether the notification content should be presented immediately without modification.

23 Claims, 32 Drawing Sheets

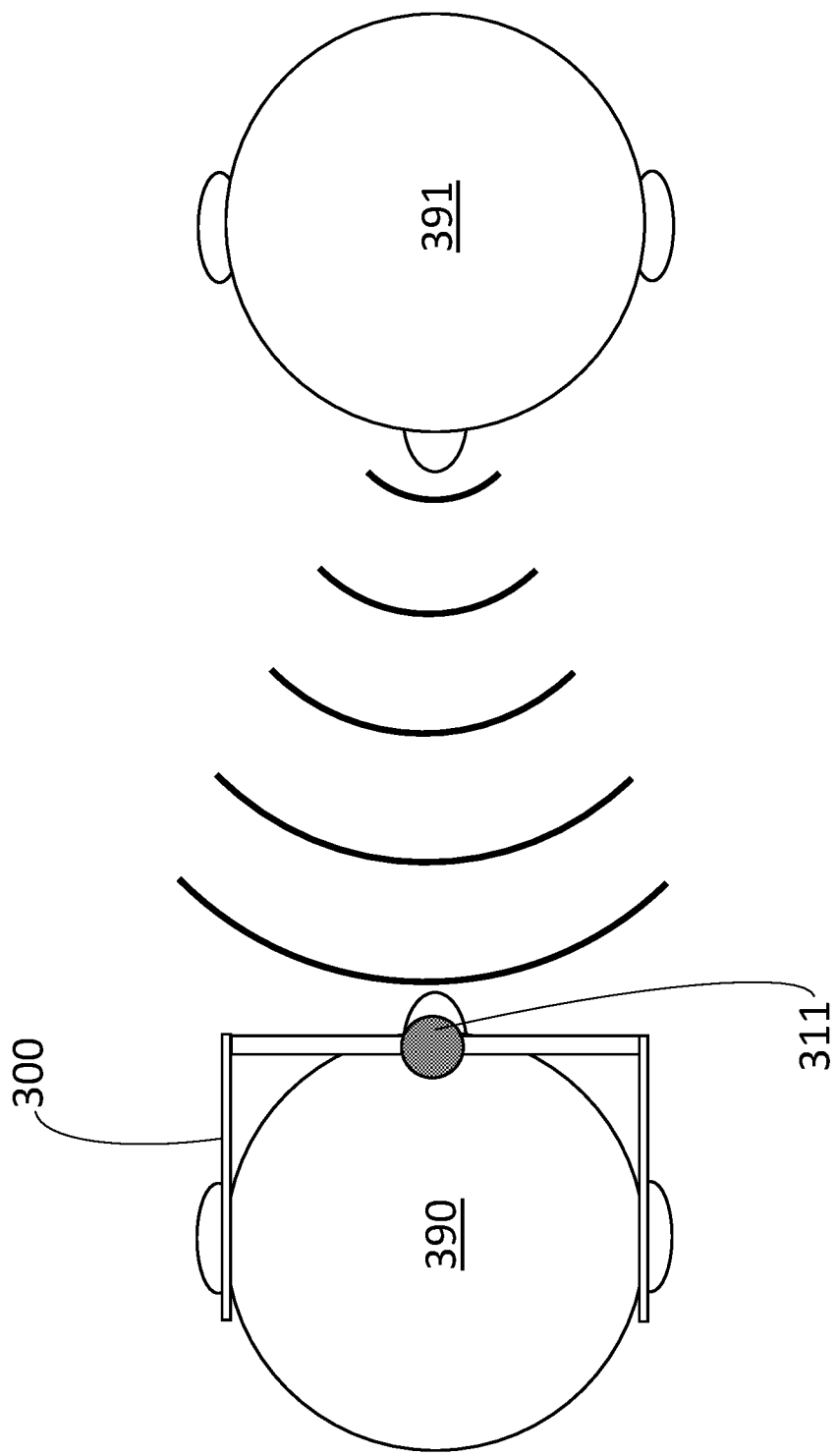

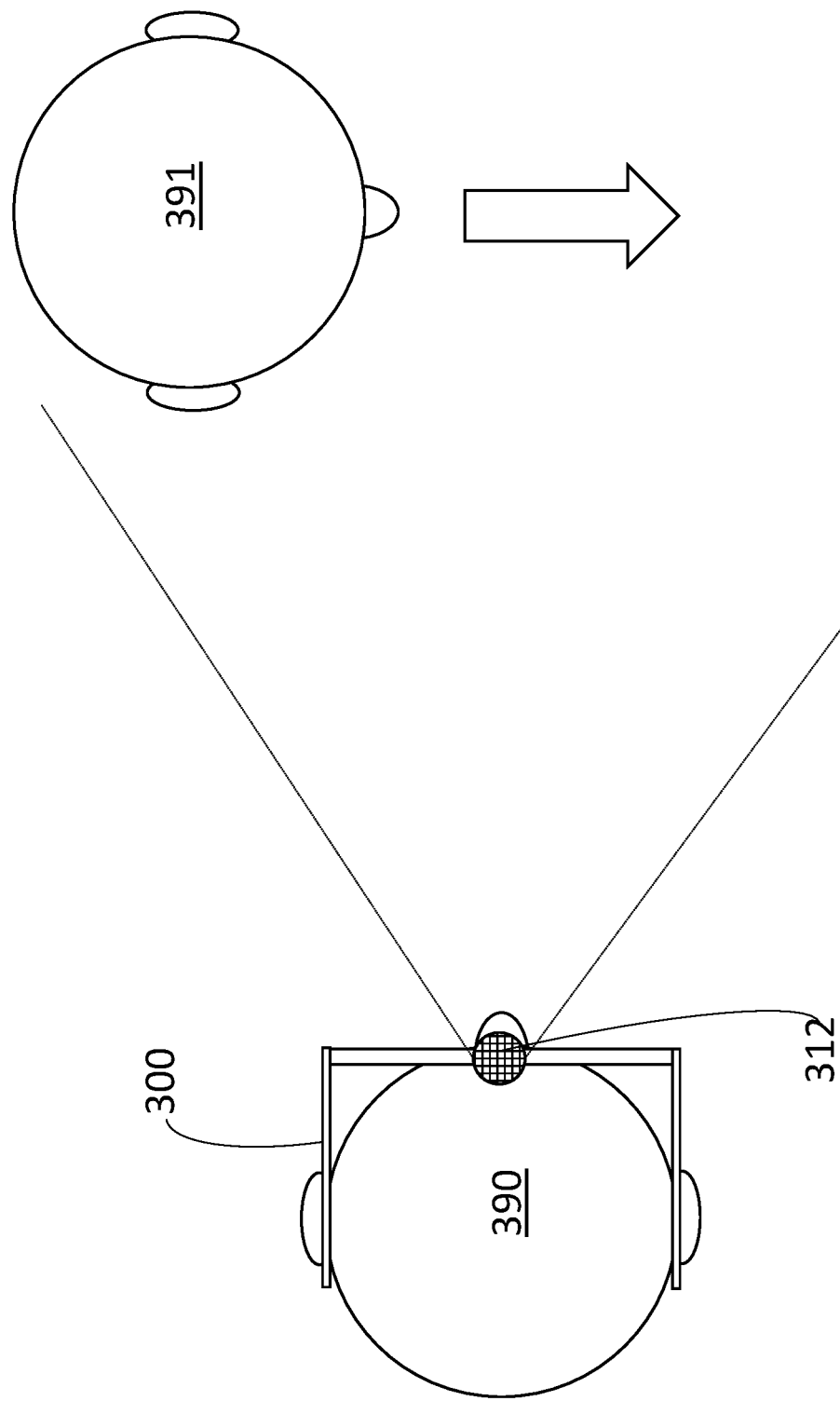

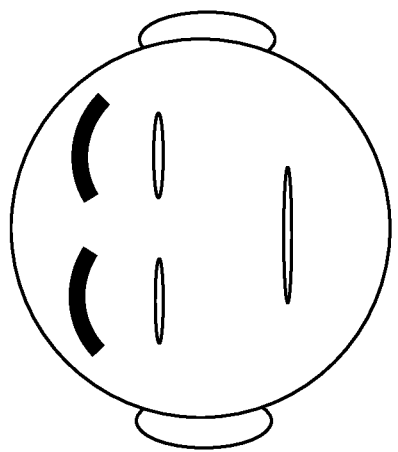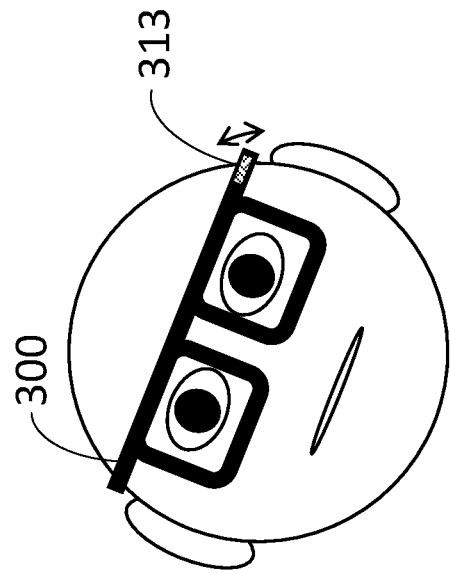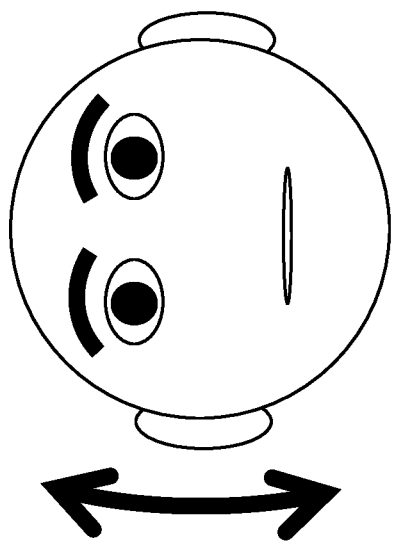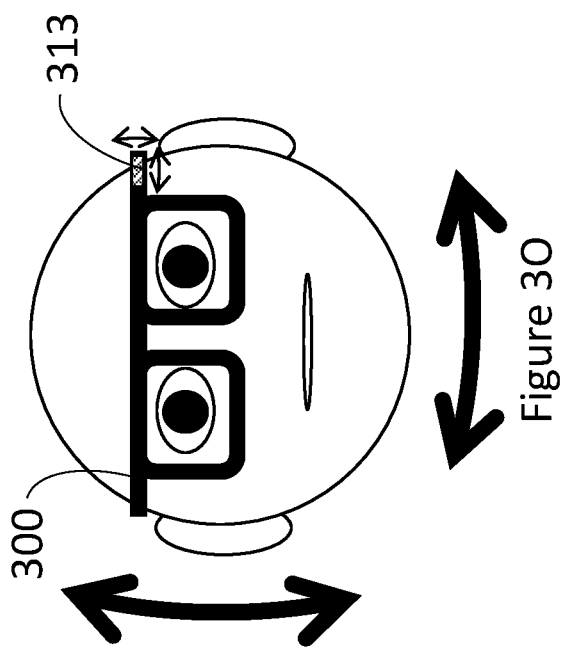
Figure 3N
Figure 3P
Figure 3M
Figure 3O

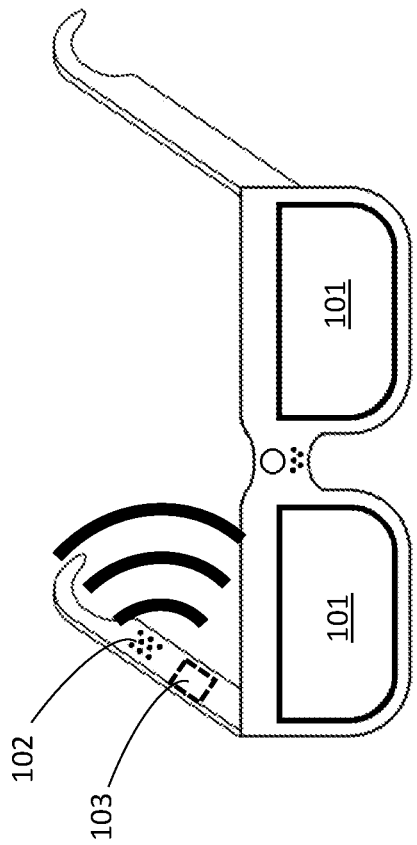
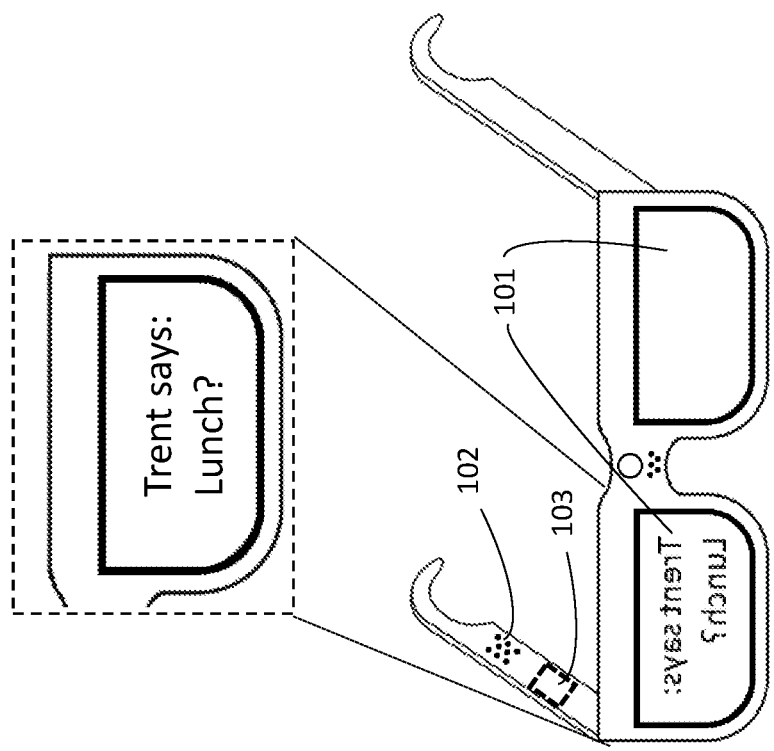
Figure 8B
Figure 8A

Upcoming Appointment:
Meeting with boss starts in 5 minutes

Figure 15A

New message from Mom:
You brother is in the hospital!

Figure 15B

New message from Delicious Tea:
New product starting today! Come try out the new Ultra-delicious tea!

Figure 15C

Successfully updated:
Mobile Button-Clicking Game

Figure 15D

SYSTEMS, DEVICES, AND METHODS FOR NOTIFICATION MANAGEMENT

CROSS-REFERENCE TO RELATED APPLICATIONS

This application claims the benefit of U.S. Provisional Application No. 62/714,489, filed Aug. 3, 2018, titled "Systems, Devices, and Methods for Notification Management", the content of which is incorporated herein in its entirety by reference.

TECHNICAL FIELD

The present systems, devices, and methods generally relate to notification management, and particularly to managing notifications to minimize or prevent distraction from human-to-human interactions.

BACKGROUND

Description of the Related Art

Portable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, earphones may be considered a portable electronic device whether they are operated wirelessly or through a wire connection.

The convenience afforded by the portability of electronic devices has fostered a huge industry. Smartphones, audio players, laptop computers, tablet computers, and ebook readers are all examples of portable electronic devices. Further portable electronic devices enable us to be continuously connected to other's in the world through communication networks such as the Internet or cellular communication networks. This makes it easier for users to connect and interact with other remote users.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

Notifications

In modern electronic devices, it is common for a device to present a "notification" to a user in order to get the attention of the user and present the user with information. For example, in a smartphone, when a user receives a new text message, the smartphone will typically present a notification to the user indicating that they have received a new text message. Notifications can encompass a wide variety of topics, from communication with other users, to information about internal device performance, to software updates, to subscription information, among many others.

One of the problems with notifications is that they can often overwhelm, bombard, and distract the user, often when the user is busy, interacting with another human, unable to check notifications, and/or focused on a critical or important task. Further, many notifications are non-essential, non-urgent, superfluous, and sometimes just annoying to the user. However, because some notifications are of critical importance, many user's will eagerly and dutifully check their device every time a notification is received, just in case the notification pertains to something important. Because of this, notifications often take a user's attention away from something important, in order to present them with what is often non-important information. Further, even if a user has the self-control to not check every notification that their device presents, the mere presence of notifications can still distract a user. For example, if a user is in a job interview and receives a notification in the form of their smartphone vibrating in their pocket, they will be unlikely to check the notification during the interview, but their mind will likely start to wonder what the notification pertains to, thus occupying a portion of the user's thoughts they could otherwise be utilizing to optimize their interview performance.

Notifications in Wearable Heads-Up Displays

Notifications in wearable heads-up displays can be particularly distracting, because such notifications are often visually presented directly in the field of view of the user, and can thus be very difficult to ignore. For example, if a user is in the middle of conversation with another human, and a trivial notification comes in, such as a text message informing the user of a new promotional drink at a café the user occasionally visits, this notification will almost certainly steal a portion of the user's attention span, thus distracting them from the conversation they are in, interrupting their thought process, and/or impeding their ability to listen and remember the conversation. This can be of significant annoyance to the user, and can also be annoying to people the user interacts with. For example, the recipient of the conversation may feel that the user is disengaged and uninterested, and/or the user may acquire a reputation for caring more about their wearable heads-up display than about their friends. Thus, notifications can potentially cause social tension, broken friendships, and alienation.

BRIEF SUMMARY

According to a broad aspect, the description describes a processor-based method of controlling notifications presented by a system, wherein the system includes at least one processor, a non-transitory processor-readable medium communicatively coupled to the at least one processor, and at least one user context sensor communicatively coupled to the at least one processor, wherein the non-transitory processor-readable medium stores processor-executable instructions that, when executed by the at least one processor, cause the system to perform the method, which may be summarized as including identifying, by the at least one processor, that the system is to present content of at least one notification to a user of the system; receiving, by the at least one processor, user context data from the at least one user context sensor; and determining, by the at least one processor, whether the user of the system is interacting with another human based on the user context data, wherein if the at least one processor determines that the user is not interacting with another human, the method may further include presenting, by the system, content of the at least one notification to the user of the system according to a first presentation format, and wherein if the at least one processor determines that the user is interacting with another human, the method may further include presenting, by the system, content of the at least one notification to the user of the system according to a second presentation format different from the first presentation format.

Receiving, by the at least one processor, user context data from the at least one user context sensor may include at least one of: receiving, by the at least one processor, captured audio data from a microphone included in the at least one user context sensor; receiving, by the at least one processor, captured visual data from a camera included in the at least one user context sensor; receiving, by the at least one processor, captured user eye data from a user eye-tracking system included in the at least one user context sensor; and receiving, by the at least one processor, captured user motion data from an inertial measurement unit included in the at least one user context sensor.

The at least one user context sensor may include at least one microphone; receiving, by the at least one processor, user context data from the at least one user context sensor may comprise receiving, by the at least one processor, captured audio data from the at least one microphone; and determining, by the at least one processor, whether a user of the system is interacting with another human based on the user context data may include: analyzing, by the at least one processor, at least one of a volume of the captured audio data, a source direction associated with the captured audio data, a source proximity associated with the captured audio data, a frequency spectrum of the captured audio data, emotion of a human represented in the captured audio data, or content of the captured audio data; and determining, by the at least one processor, whether a user of the system is interacting with another human based on one or a combination of the volume of the captured audio data, the source direction associated with the captured audio data, the source proximity associated with the captured audio data, a frequency spectrum of the captured audio data, emotion of a human represented in the captured audio data, or the content of the captured audio data.

The at least one user context sensor may include at least one camera; receiving, by the at least one processor, user context data from the at least one user context sensor may include receiving, by the at least one processor, captured visual data from the at least one camera; and determining, by the at least one processor, whether a user of the system is interacting with another human based on the user context data may include: determining, by the at least one processor, that another human is represented in the captured visual data; determining, by the at least one processor, at least one of a proximity of the other human to the user, a gaze direction of the other human, a facial expression of the other human, or movement patterns of the other human based on the captured visual data; and determining, by the at least one processor, whether a user of the system is interacting with the other human based on one or a combination of the proximity of the other human to the user, a gaze direction of the other human, a facial expression of the other human, or movement patterns of the other human.

The at least one user context sensor may include at least one inertial measurement unit; receiving, by the at least one processor, user context data from the at least one user context sensor may include receiving, by the at least one processor, captured user motion data from the at least one inertial measurement unit; and determining, by the at least one processor, whether a user of the system is interacting with another human based on the user context data may include: analyzing, by the at least one processor, at least one of head motions made by the user, head position of the user, head angle of the user, and body motions made by the user based on the captured user motion data; and determining, by the at least one processor, whether a user of the system is interacting with the other human based on one or a combination of at least one of the head motions made by the user, the head position of the user, the head angle of the user, and the body motions made by the user based on the captured user motion data.

The at least one user context sensor may include a user eye-tracking system; receiving, by the at least one processor, user context data from the at least one user context sensor may include receiving, by the at least one processor, captured user eye data from the user eye-tracking system; and determining, by the at least one processor, whether a user of the system is interacting with another human based on the user context data may include: analyzing, by the at least one processor, at least one of a blink frequency of the user, gaze direction of the user, movement patterns of at least one of the user's eyes, movement patterns of at least one of the user's eyelids, a facial expression of the user, and iris dilation patterns of at least one of the user's eyes based on the captured user eye data; and determining, by the at least one processor, whether a user of the system is interacting with the other human based on one or a combination of the blink frequency of the user, gaze direction of the user, movement patterns of at least one of the user's eyes, movement patterns of at least one of the user's eyelids, facial expression of the user, and iris dilation patterns of at least one of the user's eyes based on the captured user eye data.

Receiving, by the at least one processor, user context data from the at least one user context sensor may include at least two of: receiving, by the at least one processor, captured audio data from a microphone included in the at least one user context sensor; receiving, by the at least one processor, captured visual data from a camera included in the at least one user context sensor; receiving, by the at least one processor, captured user eye data from a user eye-tracking system included in the at least one user context sensor; and receiving, by the at least one processor, captured user motion data from an inertial measurement unit included in the at least one user context sensor.

The system may further include a display communicatively coupled to the at least one processor; the first presentation format may include a visual presentation format in which content of the at least one notification is to be displayed by the display; and presenting, by the system, content of the at least one notification to the user of the system according to a second presentation format may include: generating, by the at least one processor, a visual summary representative of content of the at least one notification, the visual summary smaller in display size than the visual presentation format when displayed by the display;

and displaying, by the display, the visual summary representative of content of the at least one notification.

The system may further include a display communicatively coupled to the at least one processor; the first presentation format may include a visual presentation format in which content of the at least one notification is to be displayed by the display at a first position; and presenting, by the system, content of the at least one notification to the user of the system according to a second presentation format may include displaying, by the display, content of the at least one notification at a second position different from the first position.

The system may further include a vibratory output interface communicatively coupled to the at least one processor; the first presentation format may include a vibratory presentation format in which content of the at least one notification is to be presented by the vibratory output interface; and presenting, by the system, content of the at least one notification to the user of the system according to a second presentation format may include: generating, by the at least one processor, an alternate vibratory representation of content of the at least one notification, the alternate vibratory representation having a vibration duration shorter than a vibration duration of the vibratory presentation format, having a vibration intensity lower than a vibration intensity of the vibratory presentation format, having a vibration pattern different from a vibration pattern of the vibratory presentation format, or having a vibration frequency different from a vibration frequency of the vibratory presentation format; and presenting, by the vibratory output interface, the alternate vibratory representation of content of the at least one notification.

The system may further include a vibratory output interface communicatively coupled to the at least one processor and a display communicatively coupled to the at least one processor; the first presentation format may include a visual presentation format in which content of the at least one notification is to be displayed by the display; and presenting, by the system, content of the at least one notification to the user of the system according to a second presentation format may include: generating, by the at least one processor, a vibratory representation of content of the at least one notification; and presenting, by the vibratory output interface, the vibratory representation of content of the at least one notification.

The system may further include a vibratory output interface communicatively coupled to the at least one processor and a display communicatively coupled to the at least one processor; the first presentation format may include a vibratory presentation format in which content of the at least one notification is to be presented by the vibratory output interface; and presenting, by the system, content of the at least one notification to the user of the system according to a second presentation format may include: generating, by the at least one processor, a visual representation of content of the at least one notification; and displaying, by the display, the visual representation of content of the at least one notification.

If the at least one processor determines that the user is interacting with another human, the method may further include determining, by the at least one processor, a delay time, and presenting, by the system, content of the at least one notification to the user of the system according to a second presentation format may include presenting, by the system, content of the at least one notification after the delay time has elapsed.

If the at least one processor determines that the user is interacting with another human, the method may further include: determining, by the at least one processor, a delay time; receiving, by the at least one processor, further user context data from the at least one user context sensor after the delay time has elapsed; and determining, by the at least one processor, whether a user of the system is still interacting with another human after the delay time has elapsed based on the further user context data, and presenting, by the system, content of the at least one notification to the user of the system according to a second presentation format may include presenting, by the system, content of the at least one notification if the at least one processor determines that the user is no longer interacting with another human after the delay time has elapsed based on the further user context data.

Identifying, by the at least one processor, that the system is to present content of at least one notification to a user of the system may include: identifying, by the at least one processor, that the system is to present content of a first notification to the user of the system at a first time; and identifying, by the at least one processor, that the system is to present content of a second notification to the user of the system at a second time later than the first time, and if the at least one processor determines that the user is interacting with another human, the method may further include determining, by the at least one processor, a delay time, and presenting, by the system, content of the at least one notification to the user of the system according to a second presentation format may include presenting, by the system, content of the first notification and content of the second notification to the user of the system together after the delay time has elapsed.

If the at least one processor determines that the user is interacting with another human, the method may further include determining, by the at least one processor, a priority level of the at least one notification, and presenting, by the system, content of the at least one notification to the user of the system according to a second presentation format may include: immediately presenting, by the system, content of the at least one notification if the priority level exceeds a priority threshold; and presenting after a delay time, by the system, content of the at least one notification if the priority level does not exceed the priority threshold.

Determining, by the at least one processor, a priority level of the at least one notification may include: determining, by the at least one processor, a source of content of the at least one notification, wherein the source of content of the at least one notification can include at least one of: an operating system installed on the non-transitory processor-readable medium, an application installed on the non-transitory processor-readable medium, a sensor carried by the system, or a content provider external to the system; and determining, by the at least one processor, a priority level of the notification based on the source of content for the at least one notification.

Determining, by the at least one processor, a priority level of the at least one notification may include determining, by the at least one processor, a priority level of the notification based on content of the at least one notification.

If the at least one processor determines that the user is interacting with another human, the method may further include: determining, by the at least one processor, an identity of the other human based on the user context data; and setting, by the at least one processor, the priority threshold based on the identity of the other human.

The method may further include continuously capturing, by the at least one user context sensor, the user context data.

The method may further include capturing, by the at least one user context sensor, the user context data only after identifying, by the at least one processor, that the system is to present content of at least one notification to a user of the system.

The method may further include: receiving, by the at least one processor, a user input to operate the system; and capturing, by the at least one user context sensor, the user context data only after receiving, by the at least one processor, the user input to operate the system.

According to another broad aspect, the description describes a system for presenting notification content to a user of the system, the system including: at least one processor; at least one user context sensor communicatively coupled to the at least one processor; and a non-transitory processor-readable medium communicatively coupled to the at least one processor, wherein the non-transitory processor-readable medium stores processor-executable instructions that, when executed by the at least one processor, cause the system to: identify, by the at least one processor, that the system is to present content of at least one notification to a user of the system; receive, by the at least one processor, user context data from the at least one user context sensor; and determine, by the at least one processor, whether the user of the system is interacting with another human based on the user context data; wherein if the at least one processor determines that the user is not interacting with another human, the processor-executable instructions when executed by the at least one processor further cause the system to present content of the at least one notification to the user of the system according to a first presentation format, and wherein if the at least one processor determines that the user is interacting with another human, the processor-executable instructions when executed by the at least one processor further cause the system to present content of the at least one notification to the user of the system according to a second presentation format different from the first presentation format.

The user context data may include at least one of: captured audio data from a microphone included in the at least one user context sensor; captured visual data from a camera included in the at least one user context sensor; captured user eye data from a user eye-tracking system included in the at least one user context sensor; and captured user motion data from an inertial measurement unit included in the at least one user context sensor.

The at least one user context sensor may include at least one microphone, the user context data may include captured audio data from the at least one microphone, and the processor-executable instructions which when executed by the at least one processor cause the at least one processor to determine whether a user of the system is interacting with another human based on the user context data may cause the at least one processor to: analyze at least one of a volume of the captured audio data, a source direction associated with the captured audio data, a source proximity associated with the captured audio data, a frequency spectrum of the captured audio data, emotion of a human represented in the captured audio data, or content of the captured audio data; and determine whether a user of the system is interacting with another human based on one or a combination of the volume of the captured audio data, the source direction associated with the captured audio data, the source proximity associated with the captured audio data, a frequency spectrum of the captured audio data, emotion of a human represented in the capture audio data, or the content of the captured audio data.

The at least one user context sensor may include at least one camera, the user context data may include captured visual data from the at least one camera, and the processor-executable instructions which when executed by the at least one processor cause the at least one processor to determine whether a user of the system is interacting with another human based on the user context data may cause the at least one processor to: determine that another human is represented in the captured visual data; determine at least one of a proximity of the other human to the user, a gaze direction of the other human, a facial expression of the other human, or movement patterns of the other human based on the captured visual data; and determine whether a user of the system is interacting with the other human based on one or a combination of the proximity of the other human to the user, a gaze direction of the other human, a facial expression of the other human, or movement patterns of the other human.

The at least one user context sensor may include at least one inertial measurement unit, the user context data may include captured user motion data from the at least one inertial measurement unit, and the processor-executable instructions which when executed by the at least one processor cause the at least one processor to determine whether a user of the system is interacting with another human based on the user context data may cause the at least one processor to: analyze at least one of head motions made by the user, head position of the user, head angle of the user, and body motions made by the user based on the captured user motion data; and determine whether a user of the system is interacting with the other human based on one or a combination of at least one of the head motions made by the user, the head position of the user, the head angle of the user, and the body motions made by the user based on the captured user motion data.

The at least one user context sensor may include a user eye-tracking system, the user context data from the at least one user context sensor may include captured user eye data from the user eye-tracking system, and the processor-executable instructions which when executed by the at least one processor cause the at least one processor to determine whether a user of the system is interacting with another human based on the user context data may cause the at least one processor to: analyze at least one of a blink frequency of the user, gaze direction of the user, movement patterns of at least one of the user's eyes, movement patterns of at least one of the user's eyelids, a facial expression of the user, and iris dilation patterns of at least one of the user's eyes based on the captured user eye data; and determine whether a user of the system is interacting with the other human based on one or a combination of the blink frequency of the user, gaze direction of the user, movement patterns of at least one of the user's eyes, movement patterns of at least one of the user's eyelids, facial expression of the user, and iris dilation patterns of at least one of the user's eyes based on the captured user eye data.

The user context data may include at least two of: captured audio data from a microphone included in the at least one user context sensor; captured visual data from a camera included in the at least one user context sensor; captured user eye data from a user eye-tracking system included in the at least one user context sensor; and captured user motion data from an inertial measurement unit included in the at least one user context sensor.

The system may further include a wearable heads-up display which carries the at least one processor and the non-transitory processor-readable medium. The wearable heads-up display may carry at least one user context sensor of the at least one user context sensor. The system may further comprise a peripheral device external to the wearable heads-up display, wherein the peripheral device carries at least one user context sensor of the at least one user context sensor.

The system may further include a display communicatively coupled to the at least one processor; the first presentation format may include a visual presentation format in which content of the at least one notification is to be displayed by the display; and the processor-executable instructions which when executed by the at least one processor cause the system to present content of the at least one notification to the user of the system according to a second presentation format may cause the system to: generate, by the at least one processor, a visual summary representative of content of the at least one notification, the visual summary smaller in display size than the visual presentation format when displayed by the display; and display, by the display, the visual summary representative of content of the at least one notification.

The system may further include a display communicatively coupled to the at least one processor; the first presentation format may include a visual presentation format in which content of the at least one notification is to be displayed by the display at a first position; and the processor-executable instructions which when executed by the at least one processor cause the system to present content of the at least one notification to the user of the system according to a second presentation format may cause the display to display content of the at least one notification at a second position different from the first position.

The system may further include a vibratory output interface communicatively coupled to the at least one processor; the first presentation format may include a vibratory presentation format in which content of the at least one notification is to be presented by the vibratory output interface; and the processor-executable instructions which when executed by the at least one processor cause the system to present content of the at least one notification to the user of the system according to a second presentation format may cause the system to: generate, by the at least one processor, an alternate vibratory representation of content of the at least one notification, the alternate vibratory representation having a vibration duration shorter than a vibration duration of the vibratory presentation format, having a vibration intensity lower than a vibration intensity of the vibratory presentation format, having a vibration pattern different from a vibration pattern of the vibratory presentation format, or having a vibration frequency different from a vibration frequency of the vibratory presentation format; and present, by the vibratory output interface, the alternate vibratory representation of content of the at least one notification.

The system may further include a vibratory output interface communicatively coupled to the at least one processor and a display communicatively coupled to the at least one processor; the first presentation format may include a visual presentation format in which content of the at least one notification is to be displayed by the display; and the processor-executable instructions which when executed by the at least one processor cause the system to present content of the at least one notification to the user of the system according to a second presentation format may cause the system to: generate, by the at least one processor, a vibratory representation of content of the at least one notification; and present, by the vibratory output interface, the vibratory representation of content of the at least one notification.

The system may further include a vibratory output interface communicatively coupled to the at least one processor and a display communicatively coupled to the at least one processor; the first presentation format may include a vibratory presentation format in which content of the at least one notification is to be presented by the vibratory output interface; and the processor-executable instructions which when executed by the at least one processor cause the system to present content of the at least one notification to the user of the system according to a second presentation format may cause the system to: generate, by the at least one processor, a visual representation of content of the at least one notification; and display, by the display, the visual representation of content of the at least one notification.

If the at least one processor determines that the user is interacting with another human, the processor-executable instructions when executed by the at least one processor may further cause the system to determine, by the at least one processor, a delay time; and the processor-executable instructions which when executed by the at least one processor cause the system to present content of the at least one notification to the user of the system according to a second presentation format may cause the system to present content of the at least one notification after the delay time has elapsed.

If the at least one processor determines that the user is interacting with another human, the processor executable instructions when executed by the at least one processor may further cause the system to: determine, by the at least one processor, a delay time; receive, by the at least one processor, further user context data from the at least one user context sensor after the delay time has elapsed; and determine, by the at least one processor, whether a user of the system is still interacting with another human after the delay time has elapsed based on the further user context data, wherein the processor-executable instructions which when executed by the at least one processor cause the system to present content of the at least one notification to the user of the system according to a second presentation format may cause the system to present content of the at least one notification if the at least one processor determines that the user is no longer interacting with another human after the delay time has elapsed based on the further user context data.

The processor-executable instructions which when executed by the at least one processor cause the system to identify, by the at least one processor, that the system is to present content of at least one notification to a user of the system may cause the system to: identify, by the at least one processor, that the system is to present content of a first notification to the user of the system at a first time; and identify, by the at least one processor, that the system is to present content of a second notification to the user of the system at a second time later than the first time, wherein if the at least one processor determines that the user is interacting with another human, the processor-executable instructions when executed by the at least one processor may further cause the system to determine, by the at least one processor, a delay time; and the processor-executable instructions which when executed by the at least one processor cause the system to present content of the at least one notification to the user of the system according to a second presentation format may cause the system to present content of the first notification and content of the second notification to the user of the system together after the delay time has elapsed.

If the at least one processor determines that the user is interacting with another human, the processor-executable instructions when executed by the at least one processor may further cause the system to determine, by the at least one processor, a priority level of the at least one notification, wherein the processor-executable instructions which when executed by the at least one processor cause the system to present content of the at least one notification to the user of the system according to a second presentation format may cause the system to: immediately present content of the at least one notification if the priority level exceeds a priority threshold; and present, after a delay time, content of the at least one notification if the priority level does not exceed the priority threshold.

The processor-executable instructions which when executed by the at least one processor cause the system to determine, by the at least one processor, a priority level of the at least one notification may cause the system to: determine, by the at least one processor, a source of content of the at least one notification, wherein the source of content of the at least one notification can include at least one of: an operating system installed on the non-transitory processor-readable medium, an application installed on the non-transitory processor-readable medium, a sensor carried by the system, or a content provider external to the system; and determine, by the at least one processor, a priority level of the notification based on the source of content for the at least one notification.

The processor-executable instructions which when executed by the at least one processor cause the system to determine, by the at least one processor, a priority level of the at least one notification may cause the system to determine, by the at least one processor, a priority level of the notification based on content of the at least one notification.

If the at least one processor determines that the user is interacting with another human, the processor-executable instructions when executed by the at least one processor may further cause the system to: determine, by the at least one processor, an identity of the other human based on the user context data; and determine, by the at least one processor, the priority threshold based on the identity of the other human.

The processor-executable instructions when executed by the at least one processor may further cause the system to continuously capture, by the at least one user context sensor, the user context data.

The processor-executable instructions when executed by the at least one processor may further cause the system to capture, by the at least one user context sensor, the user context data only after the at least one processor identifies that the system is to present content of at least one notification to a user of the system.

The processor-executable instructions when executed by the at least one processor may further cause the system to: receive, by the at least one processor, a user input to operate the system; and capture, by the at least one user context sensor, the user context data only after the at least one processor receives the user input to operate the system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIGS. 3E, 3F, 3G, and 3H are top plan views that respectively show several examples where at least one processor can analyze captured visual data from a camera to determine whether a user is interacting with another human, according to at least four respective illustrated implementations.

FIGS. 3I, 3J, 3K, 3L, 3M, and 3N are front elevational views that respectively show several examples where at least one processor can analyze captured visual data from a camera to determine whether a user is interacting with another human, according to at least five respective illustrated implementations.

FIGS. 3O and 3P are front elevational views that respectively show examples where at least one processor can analyze captured user motion data from an inertial measurement unit to determine whether a user is interacting with another human, according to at least two respective illustrated implementations.

FIG. 3AA is a front elevational view that shows an example where at least one processor can analyze captured data from a plurality of user context sensors to determine whether a user is interacting with another human, according to at least one illustrated implementation.

FIG. 3AB is an isometric view that shows an example where user context data can be obtained by sources or user context sensors other than sensors on a WHUD, such as peripheral device, according to at least one illustrated implementation.

FIG. 3AC is a table that shows an example where user context data can be obtained from sources other than sensors on a WHUD, such as a calendar, according to at least one illustrated implementation.

FIGS. 8A and 8B are isometric views that respectively show an example of generating a vibratory representation of notification content instead of a visual presentation format of the notification content, according to at least one illustrated implementation.

FIGS. 15A, 15B, 15C, and 15D are plan views that respectively show several examples of notification content which can be used to determine a priority level of at least one notification, according to at least four illustrated implementations.

DETAILED DESCRIPTION

In the following description, certain specific details are set forth in order to provide a thorough understanding of various disclosed implementations and embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for notification management and are particularly well-suited for use in wearable heads up displays. However, as is discussed later, the present systems, devices, and methods are not limited to wearable heads-up displays, but rather can be implemented an any suitable hardware as appropriate for a given application.

Figure 1:
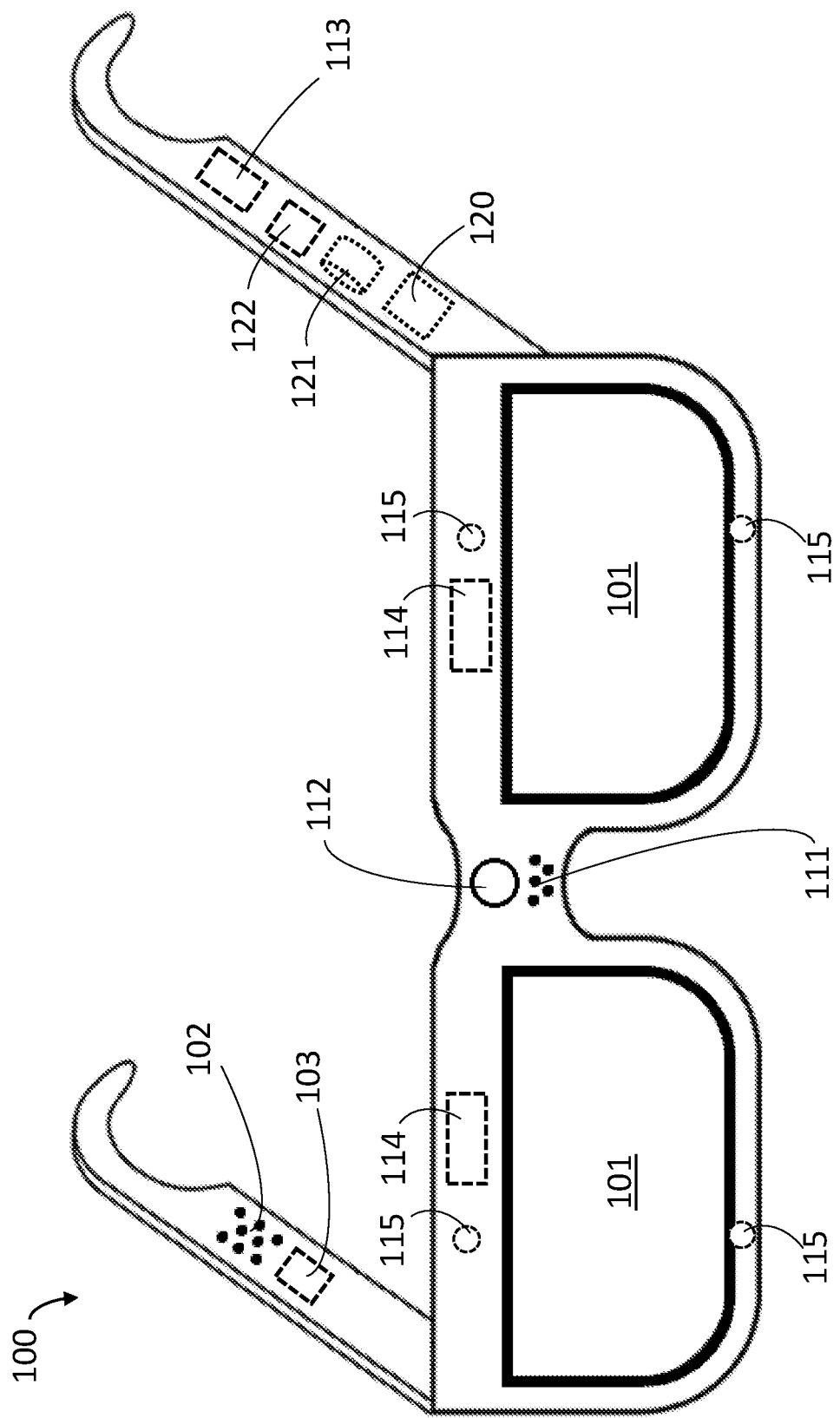
FIG. 1 is an isometric view of an exemplary wearable heads-up display ("WHUD") which can be used to determine whether a user is interacting with another human and control presentation of notifications according to the present systems, devices, and methods.

FIG. 1 illustrates an exemplary wearable heads-up display ("WHUD") 100 which can be used in the present systems, devices, and methods. FIG. 1 includes many structures which can be included on a WHUD as used in the present systems, devices, and methods, but one skilled in the art will appreciate that each of the illustrated structures in FIG. 1 is not required to achieve the present systems, devices, and methods, as will be discussed in more detail below. WHUDs as employed in the present systems, devices and method can be based on, for example, the WHUDs disclosed in U.S. Non-Provisional patent application Ser. No. 15/145,576, U.S. Non-Provisional patent application Ser. No. 15/167,458, or U.S. Non-Provisional patent application Ser. No. 15/046,254.

WHUD 100 as shown in FIG. 1 includes multiple output devices which can be used to present information such as a notification or notifications to a user. These output devices can include, for example, display 101, speaker 102, haptic output interface 103, and any other output device as appropriate for a particular application. A WHUD in accordance with the present systems, devices, and methods can optionally include a plurality, all, or a combination of these output devices as shown in FIG. 1, but only requires only a single output device, such as a single display 101, a single speaker 102, or a single haptic output interface 103. Further, a WHUD in accordance with the present systems, devices, and methods can also include a plurality of any or all of the described output devices, such as a plurality of displays 101, a plurality of speakers 102, and/or a plurality of haptic output interfaces 103.

WHUD 100 as shown in FIG. 1 includes multiple sensors, which can be used to capture input which can indicate a context of the user, and which can be used to capture input from the user which provides instructions to the WHUD 100. These sensors can include microphone 111, camera 112, inertial measurement unit ("IMU") 113, eye-tracking system 114, proximity sensors 115 and any other sensor as appropriate for a particular application. A WHUD in accordance with the present systems, devices, and methods can optionally include a plurality, all, or a combination of these sensors as shown in FIG. 1, but only requires a single sensor, such as a single microphone 111, a single camera 112, a single inertial measurement unit 113, a single eye-tracking system 114, or a single proximity sensor 115. Further, a WHUD in accordance with the present systems, devices, and methods can also include a plurality of any or all of the described sensors, such as a plurality of microphones 111, a plurality of cameras 112, a plurality of inertial measurement units 113, a plurality of eye-tracking systems 114, and/or a plurality of proximity sensors 115. Since the above described sensors can be used to capture and measure information indicating context of a user of the system, throughout this specification the term "user context sensor" can refer to any of the above described sensors, or any other sensors which can be carried by a WHUD in accordance with the present invention, as appropriate for a given application. However, one skilled in the art will appreciate that the above described sensors can be more than just "user context sensors", in that the above described sensors can perform functions beyond just capturing user context, such as capturing user instructions, for example.

WHUD 100 as shown in FIG. 1 also includes at least one processor 120 and a non-transitory processor-readable medium 121 communicatively coupled to the at least one processor 120. The at least one processor 120 can be any suitable component which can execute instructions or logic, including but not limited to a micro-controller, microprocessor, multi-core processor, integrated-circuit, ASIC, FGPA, programmable logic device, or any appropriate combination of these components. The non-transitory processor-readable medium 121 can be any suitable component which can store instructions, logic, or programs, including but not limited to non-volatile or volatile memory, read only memory (ROM), random access memory (RAM), FLASH memory, registers, magnetic hard disk, optical disk, or any combination of these components. The non-transitory processor-readable medium 121 can store processor executable instructions which, when executed by the at least one processor 120, cause the WHUD 100 to implement the present systems, devices, and methods. Further, each of the output devices and sensors can be communicatively coupled to the at least one processor 120. That is, the at least one processor 120 is communicatively coupled to at least display 101, speaker 102, haptic output interface 103, microphone 111, camera 112, inertial measurement unit 113, eye tracking system 114, and proximity sensors 115.

Optionally, WHUD 100 can include wireless communication hardware, such as a wireless receiver, a wireless transmitter, and/or a wireless transceiver, for communicating with peripheral devices and/or external servers and content providers. FIG. 1 illustrates an exemplary wireless transceiver 122.

Certain elements of FIG. 1 are drawn in dashed lines, to indicate that these devices or structures are not normally visible at the current perspective of WHUD 100 as shown in FIG. 1, because the dashed elements are enclosed within a housing of the WHUD 100, or are occluded by other features such as the support structure or housing of WHUD 100. However, one skilled in the art will appreciate that these devices or structures do not necessarily have to be enclosed in the housing or behind other features of WHUD 100, but can be carried external to the housing or partially external as appropriate for a given application. Further, one skilled in the art will appreciate that although the output devices and sensors are shown at certain locations of the support structure of WHUD 100, one skilled in the art will appreciate that any of the output devices and sensors can be relocated to any location on the support structure as appropriate for a particular application.

In many implementations discussed herein, data is captured which may include representations of other humans, such as visual representations of the other human's appearance and/or audio representations of their voice. For ethical, moral, and legal reasons, considerations for the privacy of other humans can be implemented. In one example, external feedback can be provided which informs other humans that they are being recorded and/or analyzed. As examples, at least one light indicator such as a flashing light, and/or an audio indicator such as a beep or camera shutter sound can be output by a WHUD when data which might include another human is being captured, so as to be clearly perceptible by other humans. Functionality could be provided which allows the other human to immediately decline to be recorded. For example, at least one processor 120 of a WHUD 100 may be capturing audio data, and another human may say "I don't want to be recorded". In response, the at least one processor 120 may immediately cease recording activities and delete any recently recorded data and/or any recent analysis results which may include identifying information. As one example, the at least one processor 120 may immediately disable all sensors and delete all data captured by all sensors in the last 10 minutes. As another example, the at least one processor 120 may immediately cease capturing visual data and audio data, and delete any recorded visual or audio data, but the at least one processor 120 may continue to capture and record user motion data from an IMU 113, since this user motion data will not contain any information which identifies another human. Deletion of data could be based on defined time frames such as 1 minute, 5 minutes, or 10 minutes (for example), but could also involve the at least one processor 120 analyzing the captured data to determine when the interaction started, and delete data from the time at which the interaction started. Additionally, the WHUD 100 could provide feedback to other humans indicating that recording has ceased and data has been deleted. For example, a speaker of the WHUD 100 may announce "Recording stopped; recorded data deleted."

Additionally, identification of other humans could be deliberately limited to only those who have previously given explicit consent, such as humans who have signed up to be included in an identification database as will be discussed in more detail below. In some implementations, explicit consent may be required before substantive data capture can commence. For example, a microphone 111 of a WHUD 100 may be listening for very specific cues, such as the user asking "May I record you?". The microphone could then listen for a consenting response such as "Yes" or "Okay".

Further, when data is captured which includes a representation of another human and/or private/personal information, this data and any analysis results based on the data can be encrypted to prevent unauthorized third party access.

Figure 2:
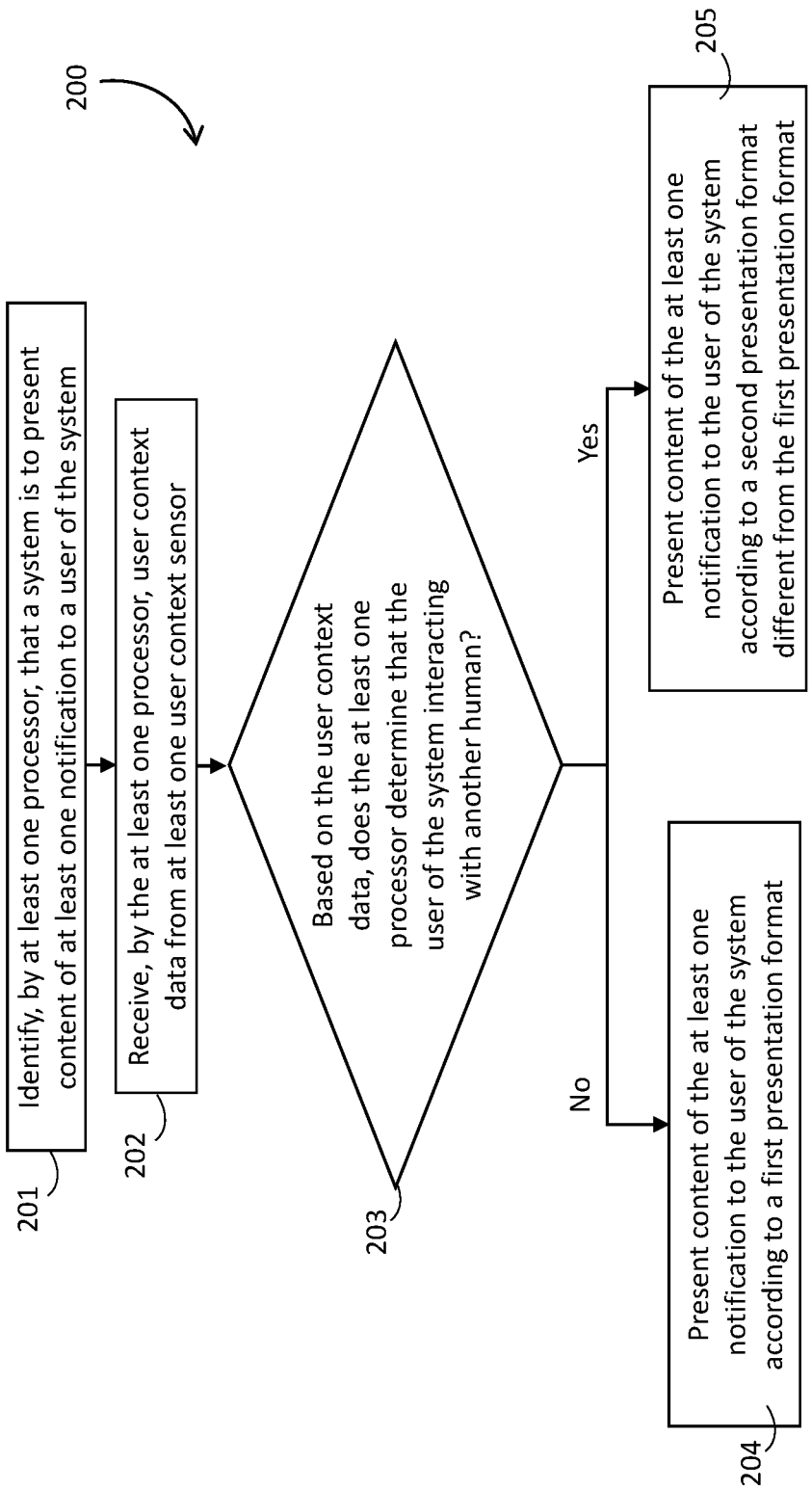
FIG. 2 is a flow diagram showing an exemplary method of determining whether a user is interacting with another human and controlling presentation of notifications, according to at least one illustrated implementation.

FIG. 2 is a flow diagram showing a method 200 of controlling notifications in accordance with the present systems, devices, and methods. Method 200 may be implemented using WHUD 100 as illustrated in FIG. 1, and reference numerals below refer to hardware components of WHUD 100 for ease of discussion, but one skilled in the art will appreciate that method 200 may also be implemented on any hardware as appropriate for a given application. Method 200 includes acts 201, 202, 203, 204, and 205, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

At 201, at least one processor 120 identifies that WHUD 100 is to present content of at least one notification to a user of WHUD 100. Non-limiting examples of this include: WHUD 100 could receive a new message, and the at least one processor 120 could identify that a notification should be presented to a user of WHUD 100 informing the user of the new message; the at least one processor 120 could identify that a battery level of WHUD 100 is low, and identify that a notification should be presented to a user of WHUD 100 to notify the user of the low battery; the at least one processor 120 could identify that a user of WHUD 100 has an event stored in a calendar, and identify that a notification should be presented to the user regarding the event; the at least one processor 120 could identify that a temperature of WHUD 100 is too high, and identify that a notification should be presented to a user of WHUD 100 to warn them of the high temperature; the at least one processor 120 could identify that an application on WHUD 100 just finished updating, and that a notification should be presented to a user to inform them of the update; or the at least one processor 120 could identify that a subscription service to which the user of WHUD 100 subscribes just released an update, and that a notification should be presented to the user of WHUD 100 informing them of the update. One skilled in the art will appreciate that the above examples are merely illustrative, and that notifications in the present systems, devices, and methods could be generated based on any suitable content as is appropriate for a given application.

At 202, the at least one processor receives user context data from at least one user context sensor, such as microphone 111, camera 112, IMU 113, eye tracking system 114, and/or proximity sensors 115. At 203, the at least one processor 120 determines whether the user of WHUD 100 is interacting with another human based on the user context data. "User context data" in the present systems, devices, and method refers to data which indicates a context of a user or can be analyze to determine a context of a user. Further, "data" can include many data points, i.e., a plurality of data, but can also encompass a single point of data, i.e., datum. Acts 202 and 203 are discussed in more detail below with reference to FIGS. 3A-3Y. In the context of the present systems, devices, and methods, "interacting with another human" generally refers to interacting or engaging with another human in the real world. Alternative terminology which could be used to express this concept could include interacting or engaging face-to-face with another human, interacting or engaging with another human in person, interacting or engaging physically with another human, interacting or engaging directly with another human, and engaging in human-to-human interaction. However, the present systems, devices, and methods could also be implemented in situations where the user is interacting with another human virtually, such as over a telephone, over the Internet, over a direct communication line, or over some other kind of communications network as appropriate for a given application. Such virtual interaction could include a voice call or a video call, as non-limiting examples.

Based on the outcome of act 203, the method proceeds to either act 204 or 205. If the at least one processor 120 determines that that the user is not interacting with another human, act 204 is performed, in which WHUD 100 presents content of the at least one notification to the user of the system according to a first presentation format. If the at least one processor 120 determines that the user is interacting with another human, act 205 is performed, in which WHUD 100 presents content of the at least one notification to the user according to a second presentation format different from the first presentation format. In summary, method 200 essentially involves WHUD 100 determining whether a user is interacting with another human based on user context data, and changing the presentation format of content of at least one notification if the user is interacting with another human. This change in presentation format can involve at least one or a combination of reducing the size of a visual notification presented by display 101, changing a location of a visual notification presented by display 101, reducing the vibration intensity or duration of a vibratory notification presented by speaker 102 or haptic output interface 103, changing the output device by which the notification is presented, delaying the notification by a preset time or until the user is no longer interacting with another human, and/or grouping multiple notifications together for simultaneous presentation, as are discussed in more detail below with reference to FIGS. 5A-5D, 6A-6E, 7A-7D, 8A-8B, 9A-9B, 10, 11, 12, 13, 14, 15A-15D, and 16. Advantageously, presenting the at least one notification according a second presentation format different from the first presentation format when the at least one processor 120 determines that the user is interacting with another human allows notifications to be controlled such that the notifications are less distracting, and allow the user to stay involved in and focused on the human-to-human interaction.

Detecting Human-to-Human Interaction

Figure 3B:
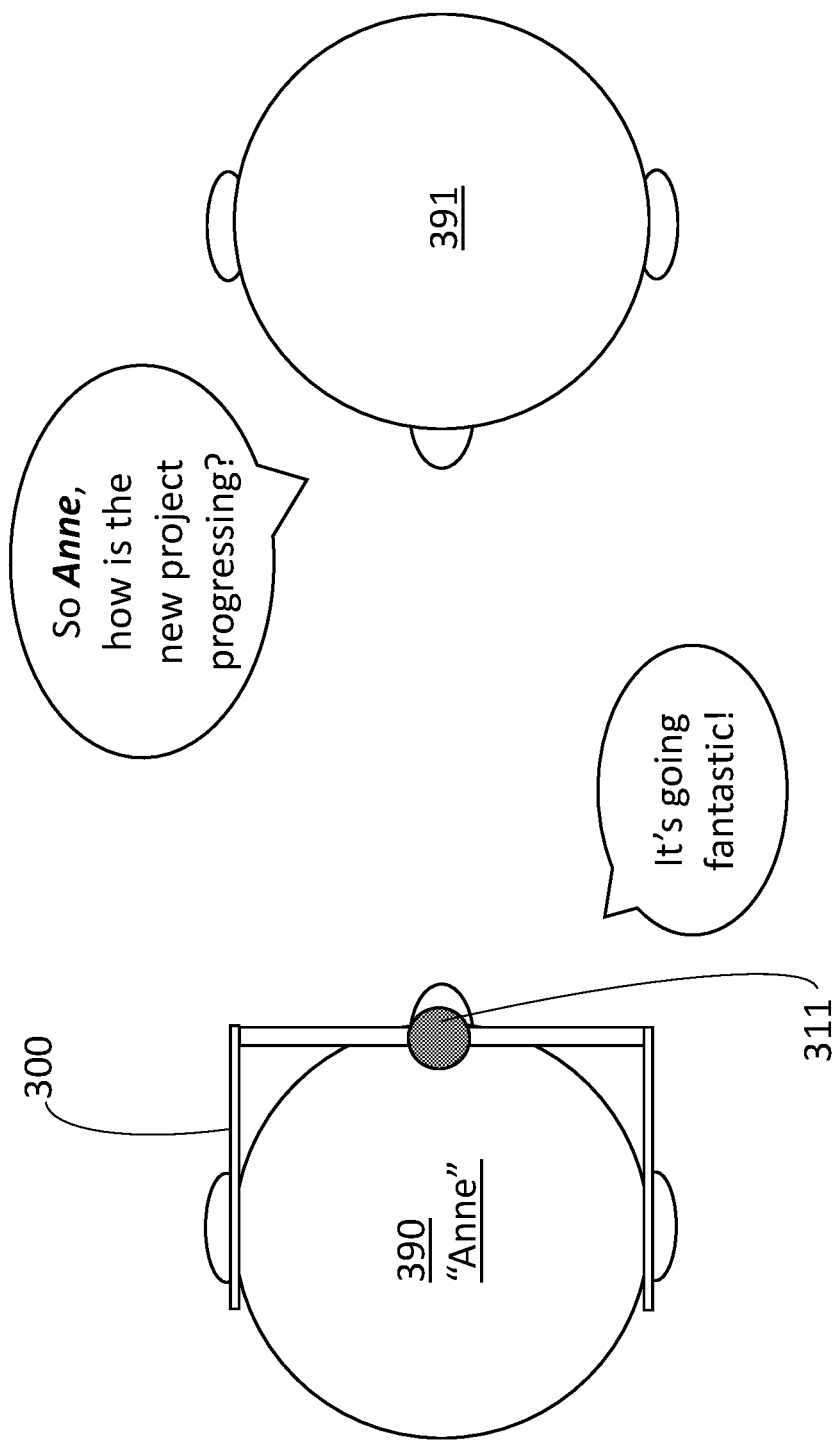
FIGS. 3A, 3B, 3C, and 3D are top plan views that respectively show several examples where at least one processor can analyze captured audio data from a microphone to determine whether a user is interacting with another human, according to at least four respective illustrated implementations.
Figure 3C:
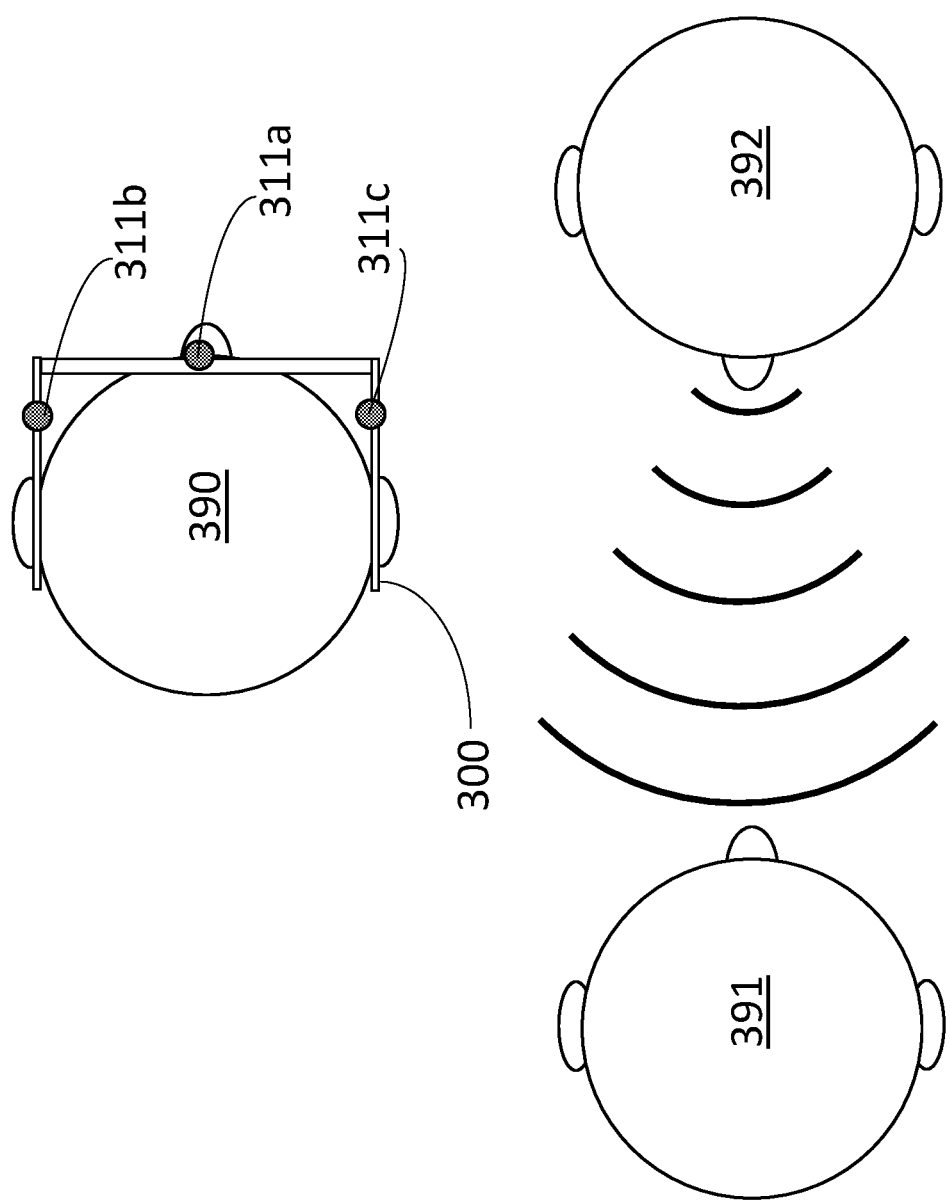
Figure 3D:
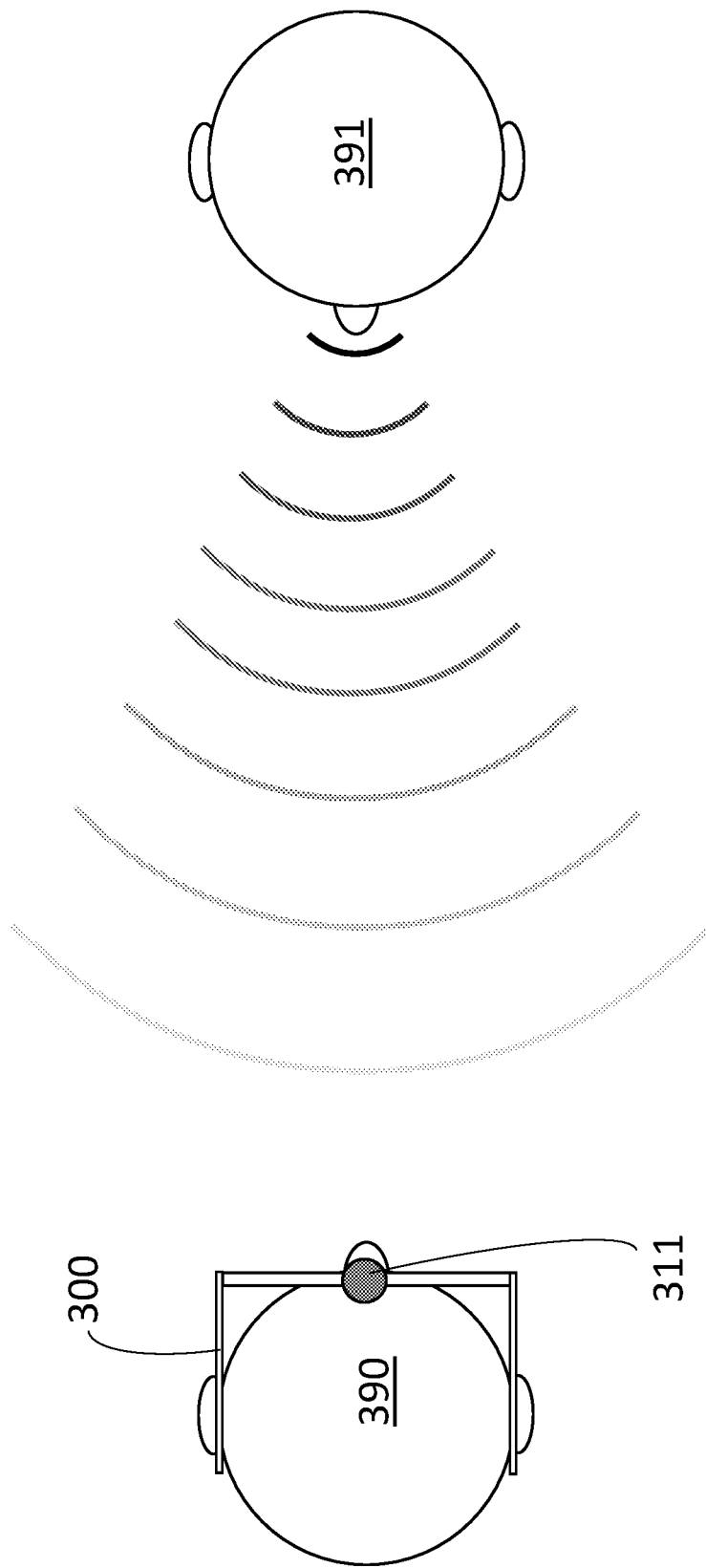
Figure 3E:
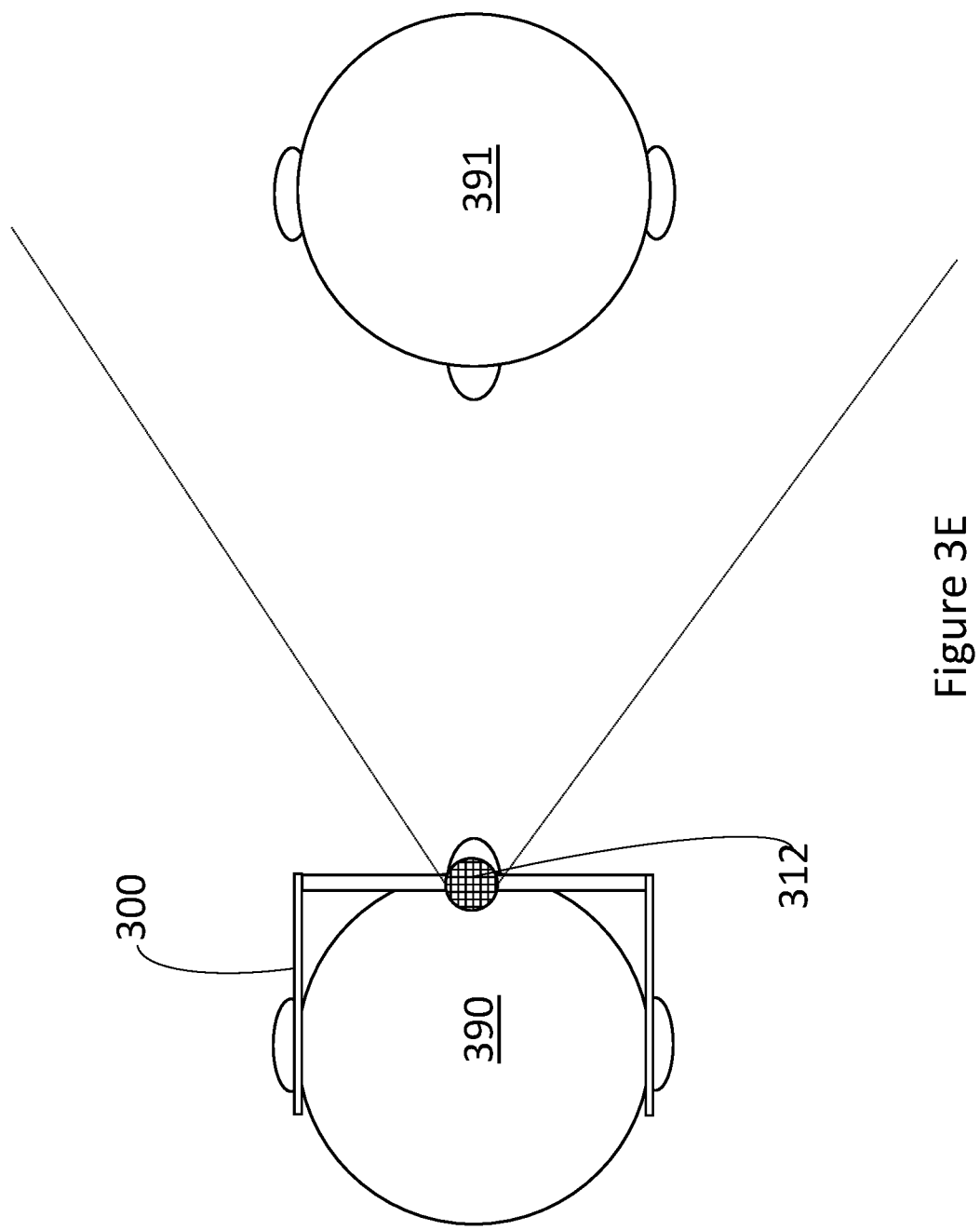
Figure 3F:
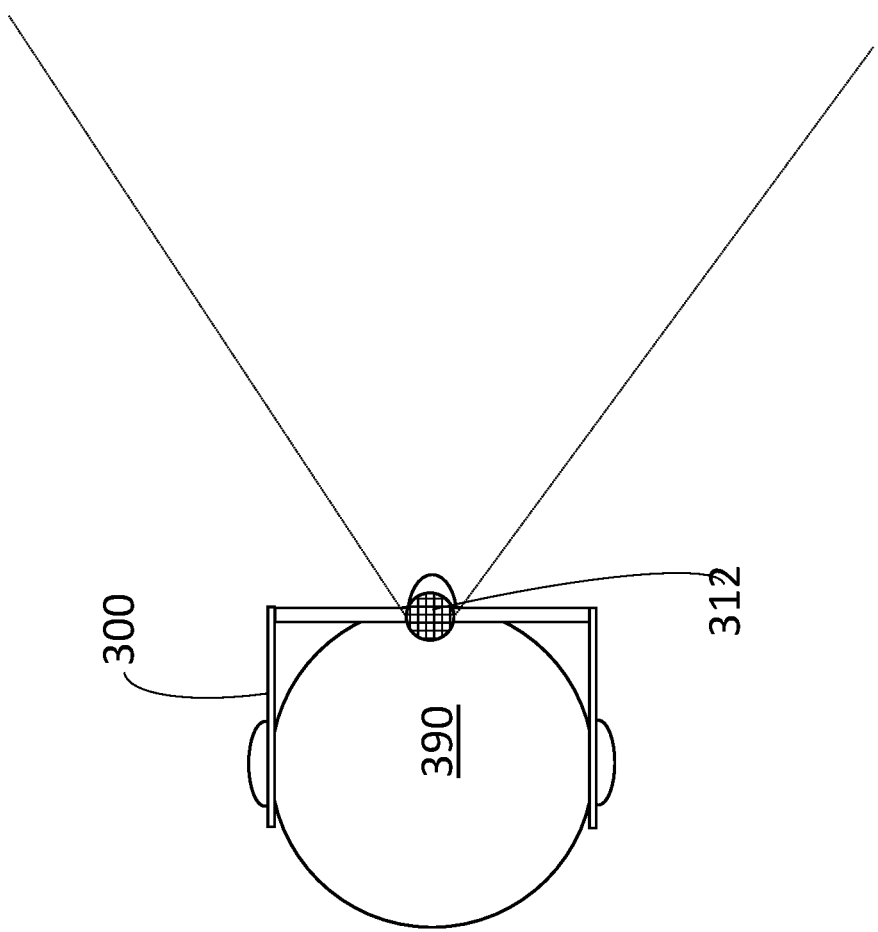
Figure 3G:
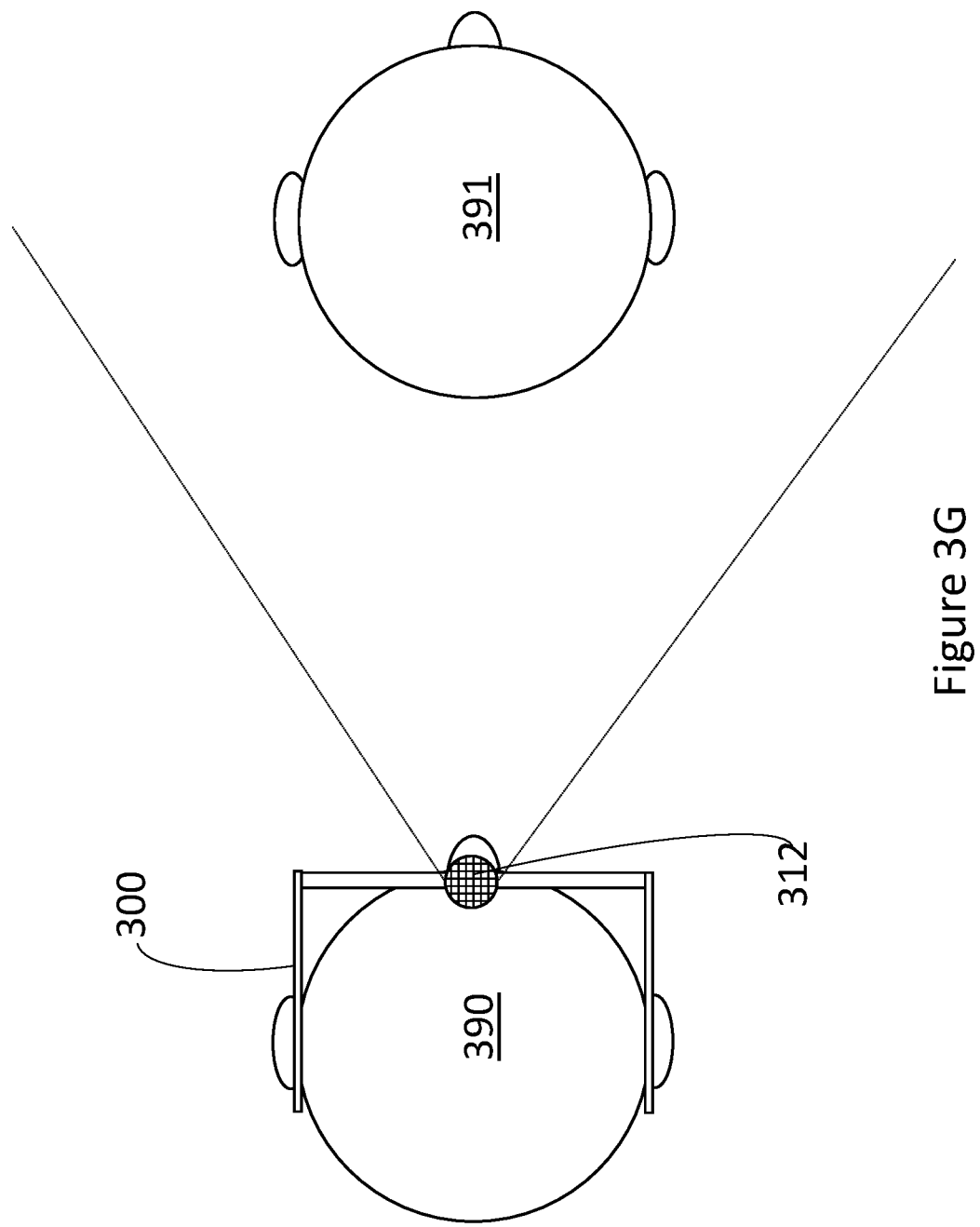
Figure 3J:
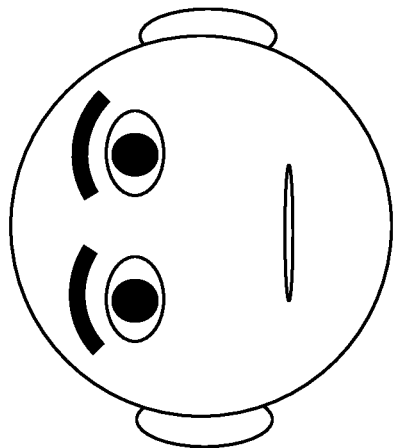
Figure 3L:
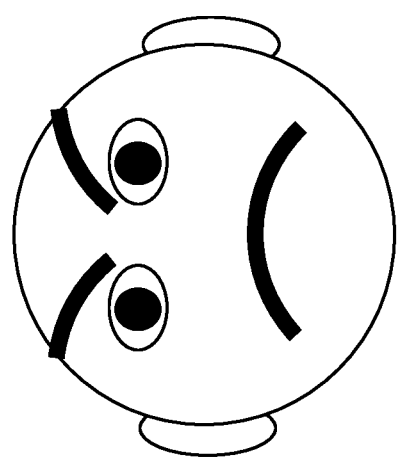
Figure 3I:
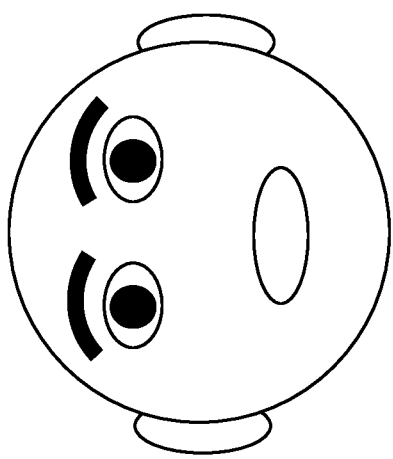
Figure 3K:
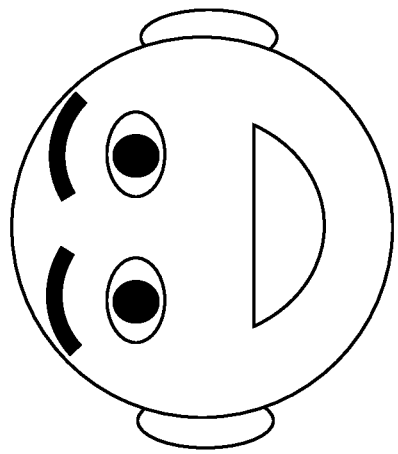
Figure 3R:
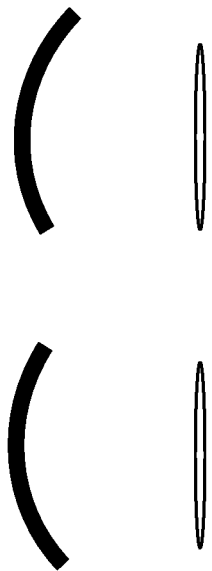
FIGS. 3Q, 3R, 3S, 3T, 3U, 3V, 3W, and 3X are front elevational views that respectively show several examples where at least one processor can analyze captured user eye data from an eye tracking system to determine whether a user is interacting with another human, according to at least eight respective illustrated implementations.
Figure 3T:
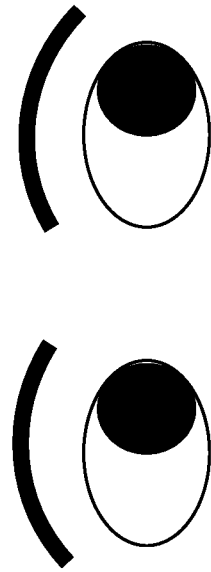
Figure 3Q:
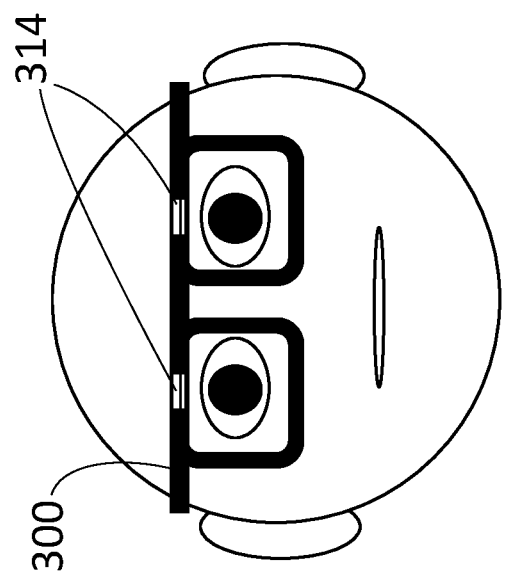
Figure 3S:
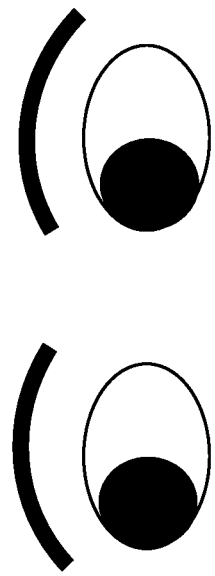
Figure 3V:
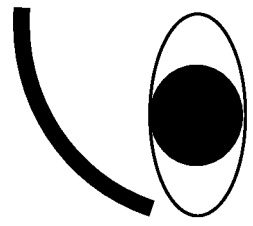
Figure 3X:
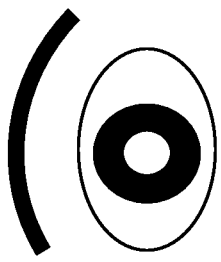
Figure 3U:
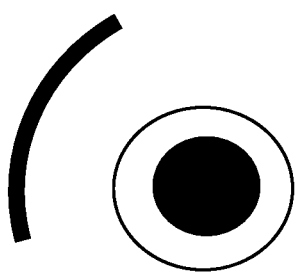
Figure 3W:
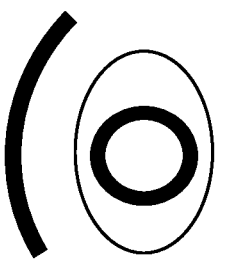
Figure 3Z:
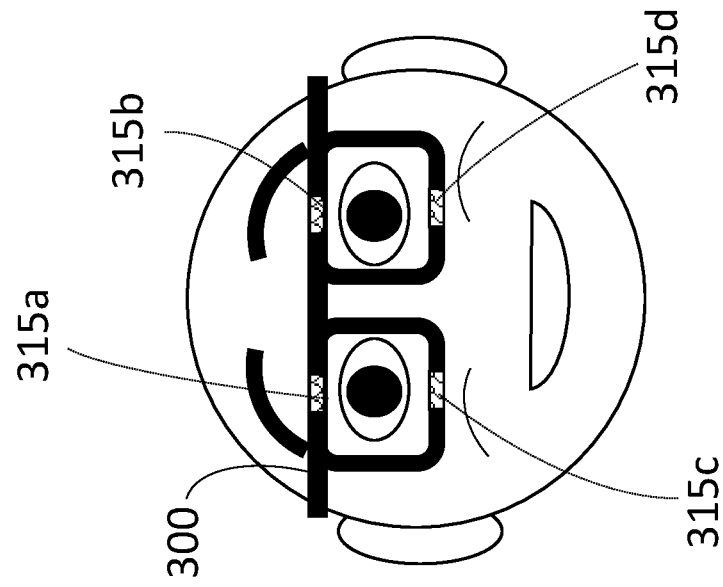
FIGS. 3Y and 3Z are front elevational views that respectively show examples where at least one processor can analyze captured user facial proximity data from proximity sensors to determine whether a user is interacting with another human, according to at least two respective illustrated implementations.
Figure 3Y:
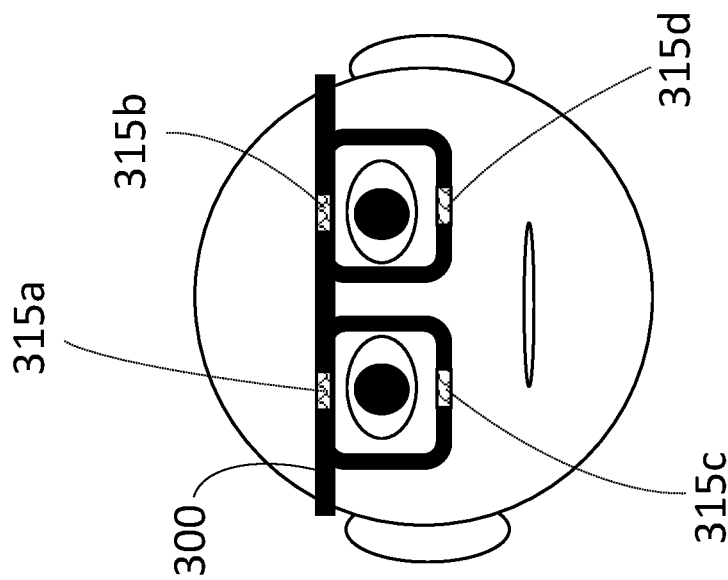
Figure 3A:
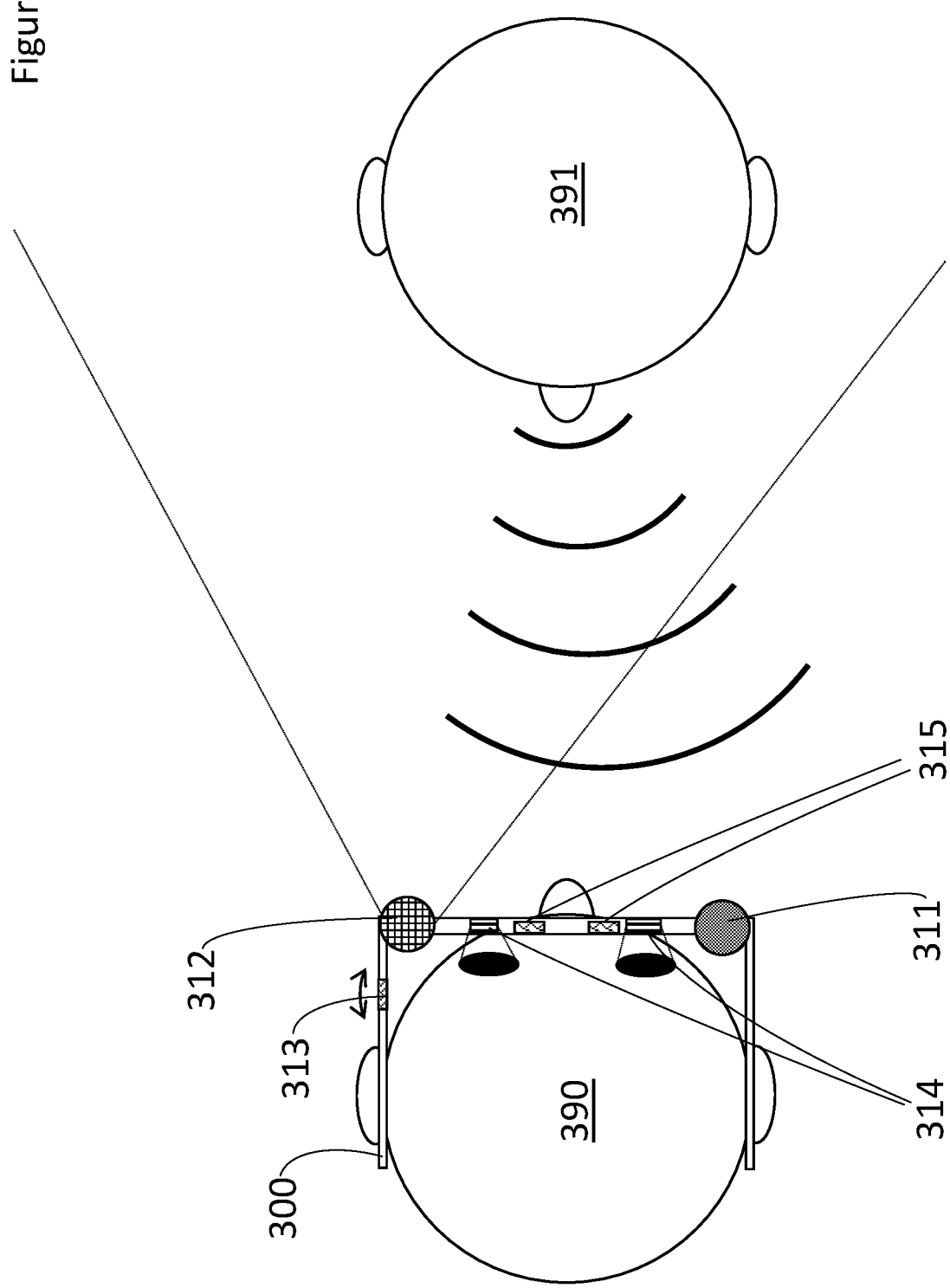
Figure 3A:
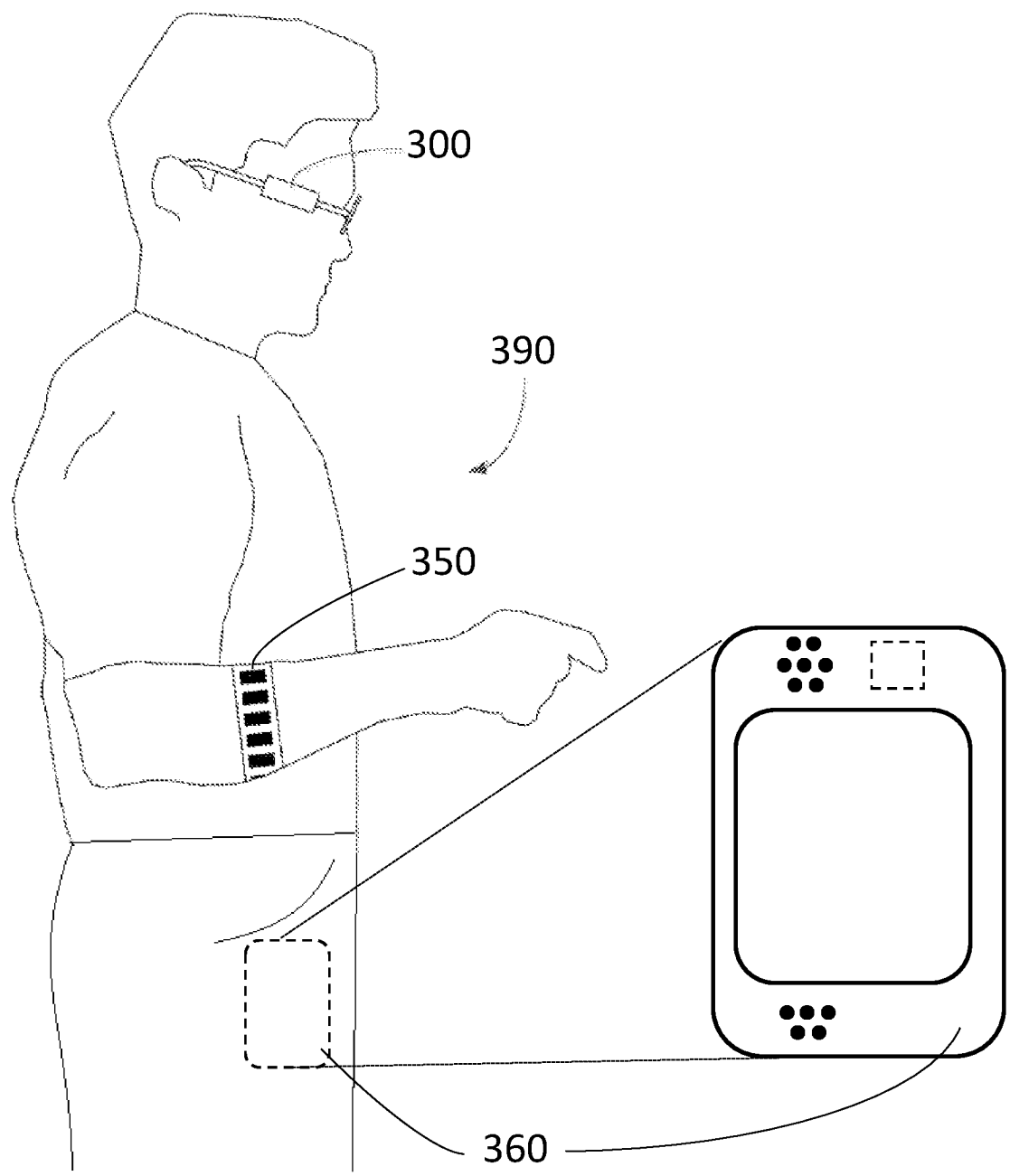
Figure 3A:

FIGS. 3A-3AC show many exemplary techniques for determining whether a user is interacting with another human. FIGS. 3A-3AC make reference to a WHUD 300, which can be substantially the same as WHUD 100 illustrated in FIG. 1 and described above. Similar to WHUD 100, one skilled in the art will appreciate that WHUD 300 need not include each of the output devices or sensors shown in FIG. 1, but can include only a single output device, a plurality of output devices, a single sensor, a plurality of sensors, or any combination thereof as appropriate for a given application. Further, although not specifically shown in FIGS. 3A-3AC to reduce clutter, WHUD 300 can also include at least one processor communicatively coupled to each of the user context sensors shown in FIGS. 3A-3AC. Optionally, WHUD 300 can also include wireless communication hardware, such as a wireless receiver, a wireless transmitter, and/or a wireless transceiver, for communicating with peripheral devices and/or external servers and content providers. One skilled in the art will appreciate that even though FIGS. 3A-3AC generally discuss determining whether a user is interacting with a single other human, each of these implementations is also fully applicable to situations in which there are multiple other humans around the user, such that determination of whether the user is interacting with another human can be performed for each other human around the user.

FIG. 3A shows a user 390 interacting with another human 391. User 390 is using WHUD 300 which includes microphone 311. In this case, microphone 311 captures user context data in the form of captured audio data, which can be analyzed by the at least one processor to determine whether the user is interacting with another human. FIGS. 3B-3D illustrate example techniques that can be used to analyze the captured audio data.

When analyzing captured audio data, the at least one processor can optionally first determine whether content of the captured audio data exceeds a volume threshold. As one example, such a threshold could be a minimum volume at which meaningful analysis could be performed on the captured audio data. As another example, such a threshold could be a minimum volume at which human-to-human interactions are likely to be conducted. That is, if the captured audio data is too quiet for a typical interaction, the at least one processor can pre-emptively determine that the user is not interacting with another human, and thus avoid expending power performing further analysis. Further, such a determination can be made based on a small amount of captured audio data. In this way, a small amount of audio data can be captured, and the at least one processor can determine whether the captured audio data exceeds a volume threshold. If the volume threshold is exceeded, the system can capture additional audio data, and further processing can be performed on the additional captured audio data. This further processing can determine with greater confidence whether the user is interacting with another human. On the other hand, if the at least one processor determines that the initially captured audio data does not exceed the volume threshold, the at least one processor can pre-emptively determine that the user is not interacting with another human, and no additional audio data needs to be captured or processed. Thus, power can be saved. Such an arrangement could allow for a cursory determination as to when the user might be interaction with another human, followed by additional capturing of data as needed to confidently determine when the use is interacting with another human.

The techniques discussed below can be performed after comparing volume of the captured audio data to a volume threshold, or can be performed without such a comparison, as appropriate for a given application.

FIG. 3B illustrates an example wherein the at least one processor can analyze the captured audio data to determine whether human speech is represented in the captured audio data. This can be accomplished by the at least one processor analyzing a frequency spectrum of the captured audio data, to determine whether the captured audio data includes frequencies of sound typically generated by humans when speaking. If the captured audio data includes frequencies typically generated by humans when speaking, the at least one processor could determine that the user is interacting with another human. Further, the at least one processor can analyze the captured audio data to detect a particular frequency range and/or frequency pattern corresponding to the voice of the user, thus improving accuracy of the determination of whether the user is interacting with another human, since the user will typically be speaking at least some of the time when interacting with another human. Additionally, the at least one processor could detect presence of a frequency spectrum or frequency patterns representing the user's voice, and a frequency spectrum or frequency patterns representing at least one other voice, to determine that the user is interacting with at least one other human. The system may utilize machine learning to learn a frequency range and/or particular frequency patterns of the user's speech over time. Additionally or alternatively, the system may learn temporal patterns of the user's speech, such as speaking speeds and pause patterns. These learned temporal patterns can then be used to identify when the user is speaking.

Further still, the at least one processor may analyze a pattern of the captured audio data to detect "turn-taking", which can be indicative of the user interacting with another human. "Turn-taking" refers to one human speaking, then another human speaking. There may be some overlap when multiple humans are speaking at the same time, but generally humans will take turns when interacting with each other. The at least one processor could detect turn-taking by detecting at least two different frequency spectrums or patterns representing at least two different voices, which tend to alternate. One of said frequency patterns could be detected as representing the user's voice. The at least one processor could also detect temporal patterns, like pauses between speech, in order to detect turn-taking.

Further still, the at least one processor may analyze the frequency spectrum of the captured audio data to determine whether the captured audio data includes frequencies which typically correspond to emotions expressed by humans. Since humans typically express emotion to other humans when interacting with them, the presence of emotional frequencies in the captured audio data can indicate that the user may be interacting with another human. In the example of FIG. 3B, user 390 says "It's going fantastic!", with heartfelt enthusiasm and excitement, which will result in certain frequencies being represented in the captured audio data. The at least one processor can identify these frequencies to determine that the user 390 is expressing emotion, and thus is likely interacting with another human.

Additionally, the at least one processor can also analyze content of the captured audio data to determine whether user 390 is interacting with another human. In the example of FIG. 3B, user 390, named "Anne", is interacting with another human 391 who says "So Anne, how is the new project going". The microphone 311 captures audio data of the other human 391 speaking and the at least one processor analyzes the content of the captured audio data. The at least one processor can determine that the other human 391 spoke user 390's name and can thus determine that user 390 is interacting with the other human 391. One skilled in the art will appreciate that analyzing content of the captured audio data is not limited to just listening for the user's name, but can include any content analysis as is appropriate for a given application. For example, the at least one processor could analyze the captured audio data for names and keywords related to a project the user is working on, events the user is scheduled to attend, names of family members and friends of the user, or any other suitable content related to the user.

FIG. 3C illustrates another example wherein the at least one processor can analyze source direction and/or source proximity of the captured audio data to determine whether user 390 is interacting with another human. In this example, a user 390 is wearing WHUD 300 which comprises a plurality of microphones 311a, 311b, and 311c, which can function as a microphone array. Microphones 311a, 311b, and 311c are capable of capturing audio data which indicates direction and position of a sound source, such that the at least one processor can determine whether user 391 is interacting with another human based on the direction, position, and proximity of a sound source. For example, as shown in FIG. 3C, two other humans 391 and 392 are interacting with each other, but are not interacting with user 390 who is nearby. The microphones 311a, 311b, and 311c capture audio data, and the at least one processor can determine the direction and position of the talking human 392 based on the captured audio data. The at least one processor can then determine that since the talking human 392 is not in front of or facing user 390, the user 390 is not interacting with talking human 392, and thus the user 390 is not interacting with another human. As an alternative example, if the at least one processor were to determine that a human is making sound directly in front of the user, the at least one processor may determine that the user is interacting with the other human. Additionally, one skilled in the art will appreciate that microphone 311 does not necessarily need to include a microphone array, but can instead include any other hardware capable of capturing audio data which indicates direction and position of a sound source.

Additionally, microphones 311a, 311b, and 311c may be a front-facing microphone 311a, a user-facing microphone 311b, and an ambient noise microphone 311c. The front-facing microphone 311a can be a microphone which captures audio data representing sound in front of the user, and can capture audio data from another human or other humans in front of the user. Further, although front-facing microphone 311a can be a narrow angle microphone which captures audio data representing sound originating in front of the user, front-facing microphone 311a can also be a wide-angle microphone which captures audio data representing sound originating in front of the user as well as at the user's periphery. Front facing microphone 311a can be used to capture sound originating from another human in front of or at the periphery of user 390, such as in each of the examples shown in FIG. 3A-3D, among any other suitable scenario. The user-facing microphone 311b can capture audio data representing sound originating from the user, such as the user's speech or voice commands. User-facing microphone 311b is particularly useful for the example shown in FIG. 3B, in which the user's speech represented in the captured audio data can be analyzed. Ambient noise microphone 311c can be a wide-angle or omnidirectional microphone which captures audio data representing the ambient environment of the user. This captured ambient audio data can be useful for determining the likelihood that the user is interacting with another user. For example, if the captured ambient audio data has a high volume, indicating that the ambient environment is quite loud, then the audio data captured by the other microphones 311a and 311b will be less indicative of whether the user is interacting with another human, since front-facing microphone 311a and user-facing microphone 311b will also capture the ambient noise. In such a case, WHUD 300 may choose to rely more on data from other user context sensors such as a camera, eye tracking system, IMU, or proximity sensors as discussed below.

One skilled in the art will appreciate that the positioning of front-facing microphone 311a, user-facing microphone 311b, and ambient noise microphone 311c is merely exemplary, and that each of these microphones could be repositioned to any suitable location on WHUD 300 as appropriate for a given application. For example, each of microphones 311a, 311b, and 311c could be positioned close together in a cluster, to form a tight microphone array. Additionally, each of microphones 311a, 311b, and 311c can include a plurality of microphones.

FIG. 3D illustrates another example wherein the at least one processor can analyze volume and/or source proximity of the captured audio data to determine whether user 390 is interacting with another human. In this example, user 390 is wearing WHUD 300 which includes microphone 311. Microphone 311 captures user context data in the form of captured audio data, and the at least one processor analyzes the volume of the captured audio data to determine whether user 390 is interacting with another human 391. If the volume of the captured audio data is too low, the at least one processor can determine that the user 390 is not interacting with another human 391, because the other human 391 is not speaking loud enough or is too far away to be interacting with user 390. This analysis could be reinforced if microphone 311 includes a microphone array or other hardware which can determine proximity of a sound source, and the at least one processor can analyze both the volume of the captured audio data and the proximity of the sound source to determine if user 390 is interacting with another human 391.

FIGS. 3E-3N illustrate cases where WHUD 300 includes camera 312. In these examples, camera 312 captures user context data in the form of captured visual data, which can be analyzed by the at least one processor to determine whether the user is interacting with another human.

FIG. 3E shows a user 390 interacting face-to-face with another human 391. Camera 312 captures visual data including a representation of the other human 391. The at least one processor then analyzes the captured visual data, determines whether there is another human represented in the visual data, and subsequently determines whether the user 390 is interacting with the other human. The at least one processor could determine that the user 390 is interacting with the other human 391 simply because the other human 391 is represented in the captured visual data. Alternatively, the at least one processor could take a more refined approach, such as determining based on the captured visual data whether the other human 391 is in close proximity to the user 390 and whether the other human 391 is facing the user 390. This refined approach is discussed in more detail below with regards to FIGS. 3F-3M below.

FIG. 3F shows a case where although the captured visual data includes a representation of another human 391, the other human 391 is far away from user 390. The at least one processor may analyze the captured visual data from the camera 312, and determine that even though another human 391 is represented in the captured visual data, the other human 391 is not in close proximity to user 390, which implies that the user 390 is not interacting with the other human 391. The at least one processor may thus determine that the user 390 is not interacting with another human.

FIG. 3G shows a case where although the captured visual data includes a representation of another human 391, the other human 391 is facing away from user 390. The at least one processor may analyze the captured visual data from the camera 312, and determine that even though another human 391 is represented in the captured visual data, the other human 391 is gazing in a direction which implies that the user 390 is not interacting with the other human 391. The at least one processor may thus determine that the user 390 is not interacting with another human.

FIG. 3H shows a case where although the captured visual data includes a representation of another human 391, the other human 391 is facing away from user 390 and is moving across user 390's field of view. The at least one processor may analyze the captured visual data from the camera 312, and determine that even though another human 391 is represented in the captured visual data, the other human 391 has a movement pattern which implies that the user 390 is not interacting with the other human 391. The at least one processor may thus determine that the user 390 is not interacting with another human.

FIGS. 3I-3N show examples where captured visual data may also be analyzed to determine a facial expression, facial expressions, gaze direction, a gesture, or gestures made by another human in order to determine whether user 390 is interacting with another human. As an example scenario, a user 390 could be riding a train where another passenger is directly in front of and facing the user 390, but is not interacting with the user 390. In such a case, facial analysis can be helpful to determine whether the other human is actually interacting with the user 390. FIGS. 3I and 3J show a case where the at least one processor can determine whether the other human is speaking by analyzing the captured visual data to determine if the other human's mouth is opening and closing. By determining whether the other human is speaking, the at least one processor can determine whether the user 390 is interacting with the other human. FIGS. 3K and 3L show cases where the other human is displaying emotion through facial expression, which implies that the other human may be interacting with someone, since facial expressions are used to convey emotion between humans. The at least one processor can analyze the captured visual data to determine if the other human is displaying emotion through facial expression, or through multiple changing facial expressions, and can thus determine whether the user 390 is interacting with the other human. Analysis of whether the other human is making an emotional facial expression can be based on at least one of an eye shape of the other human, eyebrow shape and position of the other human, eyelid movement patterns of the other human, mouth shape and position of the other human, and any other suitable characteristic as appropriate for a given application. Further, in each of FIGS. 3I-3L, the other human is gazing straight ahead, making eye contact with the user 390. The at least one processor can analyze this gaze direction of the user to determine whether the user is interacting with the other human, based on whether the other human is making eye contact with the user. If the other human were to be gazing away from the user 390, the at least one processor could determine that the user 390 may not be interacting with the other human. Further, the at least one processor could analyze gaze direction patterns of the other human over time to improve accuracy. For example, if the other human keeps looking at the user's eyes, even if their gaze regularly strays elsewhere, the at least one processor may determine that the user is interacting with the other human because the other human keeps making brief eye contact with the user. FIG. 3M shows a case where the at least one processor can determine whether the other human is making gestures, such as nodding or shaking the head, which implies that the other human is interacting with someone, since it is typical to make gestures and use body language when in a conversation with someone. By determining whether the other human is making gestures, the at least one processor can determine whether the user 390 is interacting with the other human. FIG. 3N shows a case where the at least one processor can analyze the captured visual data to determine a blink frequency of the other human. Humans tend to blink less frequently when they are focused in conversation, and thus a low blink frequency implies that a human is interacting with someone. In this regard, if the at least one processor can determine that the other human has a relatively low blink frequency, the processor can determine that the user 390 is likely interacting with the other human.

FIGS. 3O and 3P show a case where WHUD 300 includes IMU 313. In this example, the IMU 313 captures user motion data relating to movements, positions, and angles of the user. The IMU 313 provides this captured motion data to at least one processor. In turn, the at least one processor analyzes the captured motion data to determine if the user 390 is making gestures. Since humans typically make gestures while interacting with another human, such as nodding, shaking the head, and leaning as shown in FIGS. 3O and 3P, among many other types of gestures, by determining that the user 390 is making gestures, the at least one processor can determine that the user 390 is likely interacting with another human.

FIG. 3Q illustrates a case where WHUD 300 includes an eye tracking system 314. The eye tracking system 314 captures user eye data and provides this user eye data to the at least one processor, which in turn analyzes the user eye data to determine whether the user is interacting with another human. Although FIG. 3Q shows eye tracking system 314 as including an eye tracking component for each eye, one skilled in the art will appreciate that only a single eye tracking component which tracks movement of a single eye is necessary. Exemplary configurations for eye tracking can be found in for example U.S. Non-Provisional patent application Ser. No. 15/167,458, U.S. Non-Provisional patent application Ser. No. 15/827,667, and U.S. Provisional Patent Application Ser. No. 62/658,436. FIGS. 3R-3X describe determining whether a user is interacting with another human based on captured user eye data in more detail.

FIG. 3R shows a user 390's eyes when in a blinked state. Based on the captured user eye data provided to the at least one processor by the eye tracking system 314, the at least one processor can determine a blink frequency of user 390. Generally, when humans interact with each other, the humans will be more focused and tend to blink less than when they are not interacting. Thus, by determining that user 390 has a relatively low blink frequency, the at least one processor can determine that the user 390 is likely interacting with another human.

FIGS. 3S and 3T show a user 390's eyes in different positions, as in the case when the user 390 is looking around, and not focusing on something. Typically, when a user is interacting with another human, their eyes will be focused on the other human. On the other hand, if the user is not interacting with another human, they will often be looking around, not focused on anything in particular. Thus, based on the captured user eye data provided by the eye tracking system, if the at least one processor determines that the user 390's eyes are directed towards the same direction for an extended period of time, the at least one processor can determine that the user 390 may be interacting with another human. Conversely, if the at least one processor determines that the user 390's eyes are not focused in one direction for an extended period of time, the at least one processor can determine that the user is not likely interacting with another human. Further, the at least one processor could analyze gaze direction patterns of the user over time to improve accuracy. For example, if the user keeps looking at another human's eyes, even if their gaze regularly strays elsewhere, the at least one processor may determine that the user is interacting with the other human because the user keeps making brief eye contact with the other human.

FIGS. 3U and 3V show cases where user 390 is displaying emotion through facial expressions. A user making emotional facial expressions often implies that the user is interacting with another human, since humans typically use facial expression to communicate their feelings and emotions to other humans. Thus, the at least one processor can analyze the captured user eye data provided by the eye tracking system 314 in order to determine whether the user 390 is making an emotional facial expression, based on at least one of eye shape of at least one of the user's eyes, eyebrow shape and position of at least one of the user's eyebrows, eyelid movement patterns of at least one of the user's eyelids, or any other suitable characteristic as appropriate for a given application. If the at least one processor determines that the user is making an emotional facial expression or changing between multiple emotional facial expressions, the at least one processor can determine that the user 390 is likely interacting with another human. Conversely, if the at least one processor determines that the user 390 is not making an emotional facial expression, the at least one processor can determine that the user 390 is likely not interacting with another human.

FIGS. 3W and 3X show cases where user 390's irises are in different states of dilation. Generally, dilation of a human's irises will increase when the human is in a state of emotional arousal. This can include the human being excited, surprised, scared, thrilled, happy, among many other emotions. Thus, dilation of a human's irises can be an indicator that the user is experiencing emotional responses, which are often experienced in human-to-human interactions. Thus, the at least one processor can analyze the captured user eye data provided by the eye tracking system 314 to determine whether the user is experiencing emotion based on dilation patterns of the user.

FIGS. 3Y and 3Z show an implementation where WHUD 300 includes a plurality of proximity sensors 315a, 315b, 315c, and 315d which capture user facial proximity data and provide this captured user facial proximity data to the at least one processor, which in turn analyzes the captured user facial proximity data to determine whether the user is interacting with another human. Each proximity sensor can measure the distance between a portion of the user's face and the WHUD 300, in order to determine facial expressions made by the user. Specifically, when a user makes different facial expressions, the user's cheeks tend to raise, lower, or change shape depending on the facial expression, and the user's eyebrows tend to raise, lower, or change angle and shape depending on the facial expression. Each of the proximity sensors can measure a distance between the WHUD 300 and a feature on the user's face, in order to determine a facial expression made by the user. In the example of FIGS. 3Y and 3Z, proximity sensor 315a measures the distance between the top of WHUD 300 and the user's right eyebrow, proximity sensor 315b measures the distance between the top of WHUD 300 and the user's left eyebrow, proximity sensor 315c measures the distance between the bottom of WHUD 300 and the user's right cheek, and proximity sensor 315d measures the difference between the bottom of WHUD 300 and the user's left cheek. In the example shown in FIG. 3Z, the at least one processor can determine that the user is smiling if the proximity sensors 315a and 315b indicate that the user's eyebrows are raised away from the top of the WHUD and if the proximity sensors 315c and 315d indicate that the user's cheeks are raised towards WHUD 300. One skilled in the art will appreciate that the placement of the proximity sensors and the specific features which they measure as discussed above and as shown in FIGS. 3Y and 3Z are merely exemplary, and one skilled in the art could reposition the proximity sensors and measure different facial features as appropriate for a given application.

FIG. 3AA shows an implementation which combines the above described hardware and techniques shown in FIGS. 3A-3Z onto WHUD 300. In FIG. 3AA, WHUD 300 includes microphone 311, camera 312, IMU 313, eye tracking system 314, and proximity sensors 315, any or all of which can be used to capture user context data and provide the captured user context data to at least one processor carried by WHUD 300. Although FIG. 3AA shows WHUD 300 as carrying user context sensors including all of microphone 311, camera 312, IMU 313, eye tracking system 314, and proximity sensors 315, one skilled in the art will appreciate that this is merely to illustrate that each of these sensors can be implemented on a single WHUD in combination, but that not each of these sensors is necessary to achieve the present systems, devices, and methods. For example, WHUD 300 could carry the following sensors: only a microphone and a camera; only a microphone and an IMU; only a microphone and an eye tracking system; only a microphone and proximity sensors; only a camera and an IMU; only a camera and an eye tracking system; only a camera and proximity sensors; only an IMU and an eye tracking system; only an IMU and proximity sensors; only a microphone, a camera, and an IMU; only a microphone, a camera, and an eye tracking system; only a microphone, a camera, and proximity sensors; only a microphone, an IMU, and an eye tracking system; only a microphone, an IMU, and proximity sensors; only a microphone, an eye tracking system, and proximity sensors; only a camera, an IMU, and an eye tracking system; only a camera, an IMU, and proximity sensors; only a camera, an eye tracking system, and proximity sensors; only an IMU, an eye tracking system, and proximity sensors; only a microphone, a camera, an IMU, and an eye tracking system; only a microphone, a camera, an IMU, and proximity sensors; only a microphone, a camera, an eye tracking system, and proximity sensors; only a microphone, an IMU, an eye tracking system, and proximity sensors; only a camera, an IMU, an eye tracking system, and proximity sensors; and each of a microphone, a camera, an IMU, an eye tracking system, and proximity sensors.

FIG. 3AB illustrates an implementation in which user context data can be received from sources other than sensors on a WHUD, such as peripheral devices external to the WHUD. In the example of FIG. 3AB, a user 390 is wearing a WHUD 300 and a gesture recognition armband 350, and is carrying a portable electronic device 360 in his pocket. In addition to receiving user context data from these other sources, the present systems, devices, and methods also include implementations in which some or all of the processing is performed by processors on devices external to the WHUD. For example, some of the processing to determine whether user 390 is interacting with another human can be performed by at least one processor on WHUD 300, gesture recognition armband 350, and/or portable electronic device 360. Alternatively, it is possible to perform all of the processing on a peripheral device external to the WHUD 300, such that the WHUD 300 does not require a processor. Instead, processed display information can be sent to a wireless receiver on the WHUD, to be directly displayed by the WHUD. In the context of implementations which include a WHUD and at least one peripheral device, such as FIG. 3AB, reference to "at least one processor" can refer to any processor or processors on the WHUD alone, any processors on the at least one peripheral device, or a combination of processors on the WHUD and on the at least one peripheral device. In the example of FIG. 3AB, "at least one processor" can refer to at least one processor on the WHUD 300 alone, gesture recognition armband 350 alone, or portable electronic device 360 alone, and can also refer to any processors on a combination of two or more of WHUD 300, gesture recognition band 350, and portable electronic device 360.

In the implementation of FIG. 3AB, WHUD 300 can include any or all of the features of the WHUDs described above with regards to FIGS. 3A-3AA, and determination of whether a user is interacting with another human can be performed using any or all of the techniques discussed above with regards to FIGS. 3A-3AA. Gesture recognition armband 350 can include at least one or a plurality of electromyography sensors, mechanomyography sensors, IMUs, or any other suitable sensor which can be used to recognize gestures. Exemplary gesture recognition bands are described in at least U.S. Pat. Nos. 9,299,248, 9,299,248, 9,367,139, 9,389,694. Gesture recognition armband 350 is communicatively coupled with WHUD 300, preferably wirelessly, but a wired connection is also possible. Gesture recognition armband 350 can provide user context data which can be used to determine whether user 390 is interacting with another human, since humans typically use gestures to communicate with each other, and thus the use of gestures can indicate that a user is interacting with another human. More specifically, gesture recognition band 350 can provide user context data which indicates whether user 390 is making gestures, and can also indicate what gestures user 390 is making and how strongly and emphatically the gestures are being made. Each of these attributes can be used to determine whether user 390 is interacting with another human. For example, if gesture recognition armband 350 determines that user 390 is making strong, emotional pleading gestures, at least one processor can determine that the user 390 is likely interacting with another human, since a direct, communicative gesture is being made strongly. On the other hand, if gesture detection armband 350 determines that the user's arm is simply swinging back and forth, indicating that user 390 is walking, at least one processor can determine that the user 390 is likely not interacting with another human. Portable electronic device 360 can for example be a smartphone, PDA, tablet, cellular telephone, or any other suitable portable electronic device, such as device 1700 as discussed with regards to FIG. 17 below. Portable electronic device 360 is communicatively coupled with WHUD 300, preferably wirelessly, but a wired connection is also possible. Portable electronic device 360 can include at least one or a plurality of sensors, such as at least one microphone, IMU, GPS sensor, or any other suitable sensor. User context data from these sensors can be used to determine whether a user is interacting with another human. For example, a microphone of portable electronic device 360 could be used in a similar manner to the microphones discussed with regards to FIGS. 3A-3D above. As another example, either or both of the IMU and the GPS sensor could be used to determine whether user 390 is moving, which indicates that the user 390 is likely not interacting with another human. Additionally, the movement speed of the user 390 could be determined, in order to determine what means the user is moving by. For example, if the user is moving at less than 30 kilometers per hour, at least one processor could determine that the user is walking, running, or biking, and is thus not likely interacting with another human. On the hand, if the user 390 is moving above 30 kilometers per hour, at least one processor can determine that the user could be in a car, train, or other motorized transport, and thus may still be interacting with another human.

FIG. 3AC illustrates another example source of user context data, namely a user's calendar 370. A calendar can be stored on a processor-readable medium of WHUD 300; a processor-readable medium of a peripheral device such as gesture recognition band 350 or portable electronic device 360; a processor-readable medium on a remote server accessed through a communications network such as the Internet; or any other suitable storage medium and location as appropriate for a given application. By analyzing a user's calendar, at least one processor can determine whether the user is currently in a scheduled meeting or event, the nature of the event, how many people are attending the event, and who is attending the event. This information can be used to determine the likelihood that the user is interacting with another human. For example, in FIG. 3AC, the user has a picnic with family scheduled from 9:00 AM to 12:00 PM on Sunday. The at least one processor may determine that during this time period, the user is at an intimate social event with a small group of important people, and thus the at least one processor can determine that the user will likely be interacting with at least one other human a lot during this meeting. As another example, the user has a 1 on 1 meeting or call with their boss scheduled from 12:00 PM to 3:00 PM on Monday. The at least one processor may determine that since the user has an intimate meeting scheduled with a single important person, the user will almost certainly be interacting with another human for the entirety of this event. As another example, the user has relaxing time alone scheduled from 6:00 PM to 9:00 PM on Tuesday. The at least one processor may determine that since the user is scheduled to be alone, the user will most likely not be interacting with another human during this time period. As another example, the user has a potluck dinner scheduled from 6:00 PM to 9:00 PM on Thursday. The at least one processor may determine that since the user is scheduled to be at a casual event with a large amount of people, the user may not be interacting with other humans for the entirety of the event. As another example, the user has a company-wide meeting scheduled from 9:00 AM to 12:00 PM on Friday. The at least one processor may determine that since there are so many people attending the meeting, the user will probably not be interacting directly with another human during the meeting. One skilled in the art will appreciate that the calendar format and timeslots shown in FIG. 3AC are merely exemplary, and that a calendar could use any suitable format and timeslots as appropriate for a given application.

Determination of whether a user is interacting with another human is not limited to analyzing a single property of the user context data, nor limited to analyzing user context data from a single user context sensor. Rather, determining whether a user is interacting with another human can involve the at least one processor analyzing a combination of any or all of the properties of the user context data, as well as a combination of user context data from any or all of the user context sensors. Several exemplary combinations are discussed below, but one skilled in the art will appreciate that these combinations are only exemplary, and that the present systems, devices, and methods encompass any combined analysis of the above described properties of the user context data, as well as any combination of user context data provided from any of the different types of user context sensors, as appropriate for a given application.

In one exemplary combination, the at least one processor may analyze captured audio data provided by microphone 311 to determine whether another human 391 is positioned directly in front of and in close proximity to user 390, that the content spoken by the other human 391 is related to user 390, and that the volume of the captured audio data is above a threshold, in order to determine whether the user 390 is interacting with the other human 391.

In another exemplary combination, the at least one processor may analyze captured audio data provided by microphone 311 to determine whether another human 391 is in close proximity to user 390 and that the volume of the captured audio data is above a threshold, and the at least one processor may analyze captured user motion data provided by the IMU to determine whether the user 390 is making head motions, in order to determine whether the user 390 is interacting with the other human 391.

In another exemplary combination, the at least one processor may analyze captured audio data to determine whether another human 391 is positioned directly in front of and in close proximity to user 390, and the at least one processor may analyze captured visual data to determine whether the other human 391 is represented in the captured visual data, is facing the user, and is opening and closing their mouth to speak, in order to determine whether the user 390 is interacting with the other human 391.

In another exemplary combination, the at least one processor may analyze captured visual data to determine whether the other human 391 is making emotional facial expressions, and the at least one processor may analyze captured user eye data to determine whether the user is making emotional facial expressions, in order to determine whether the user 390 is interacting with the other human 391.

In another exemplary combination, the at least one processor may analyze the following to determine whether a user is interacting with another human: captured audio data from microphone 311 to determine whether the user is speaking and whether there are emotions expressed in the user's voice based on the frequency spectrum of the captured audio data; captured user motion data from IMU 313 on WHUD 300 to determine whether a head of the user is still or not; captured user motion data from an IMU of a peripheral device to determine whether a user is moving; and user schedule data from a calendar to determine whether a user is currently attending a scheduled meeting or event.

In another exemplary combination, the at least one processor may analyze the following to determine whether a user is interacting with another human: captured audio data from microphone 311 or a plurality of microphones 311a, 311b, and 311c to determine whether the user is speaking or another human is speaking and whether there are emotions expressed in the user and other human's voice based on the frequency spectra of the captured audio data, and to determine a level of ambient background noise present in the captured audio data; captured visual data from a camera 312 of WHUD 300 to determine whether another human is in front of the user, whether the other human is facing the user, whether the other human's mouth is moving, and a facial expression of the other human; captured user motion data from IMU 313 on WHUD 300 to determine whether a head of the user is making gestures such as nodding and shaking of the user's head; captured user motion data from an IMU of a peripheral device to determine whether a user is moving and at what speed; captured user eye data from an eye tracking system 314 to determine a blink frequency of a user, eye movement patterns of a user, and gaze direction of a user; and user schedule data from a calendar to determine whether a user is currently attending a scheduled meeting or event.

The present systems, devices, and methods can encompass a number of implementations for combining analysis of multiple properties of the user context data, and for combining analysis of user context data from multiple user context sensors. For convenience, the terminology "properties" of the user context data as discussed herein should be interpreted broadly, to include not only properties of user context data from a single sensor (such as volume of captured audio data or source direction of captured audio data, for example), but also to include user context data from different user context sensors (such as user blink frequency in the captured user eye data or facial expression of another human in the captured visual data). Several exemplary implementations of how to perform this combined analysis are discussed below, with reference to a combination wherein the at least one processor may analyze captured audio data provided by microphone 311 to determine that another human 391 is in close proximity to user 390 and that the volume of the captured audio data is above a threshold, and the at least one processor may analyze captured user motion data provided by the IMU to determine that the user 390 is making head motions. This combination is referred to for convenience, and one skilled in the art will appreciate that the below discussed implementations for combined analysis are fully applicable to any combination of analysis of properties of the user context data and analysis of user context data from multiple user context sensors.

In a first implementation, the combined analysis can be structured such that if any one individual property of the user context data provided by any one sensor indicates that the user may be interacting with another human, the at least one processor determines that the user 390 is interacting with another human. For example, in the combination mentioned above, if any one of: another human 391 is in close proximity to user 390; the volume of the captured audio data is above a threshold; or the user is making head motions, the at least one processor may determine that the user 390 is interacting with another human 391. This implementation is advantageously very efficient, in that the at least one processor needs to perform a minimal amount of work to determine whether a user is interacting with another human. However, this implementation can be prone to false positives, in which the at least one processor determines that the user is interacting with another human even if they aren't, since the determination can be based on a single property of the user context data.

In a second implementation, the combined analysis can structured as a checklist, such that each property of a selected set of properties must indicate that a user is interacting with another human in order for the at least one processor to conclusively determine that the at least one user is interacting with another human. For example, in the combination mentioned above, if each of: another human 391 is in close proximity to user 390; the volume of the captured audio data is above a threshold; and the user is making head motions, the at least one processor may determine that the user 390 is interacting with another human 391. This implementation advantageously mitigates false positives, by requiring a number of criteria to be fulfilled before the at least one processor will conclusively determine that the user is interacting with another human. However, if too many properties are required to indicate that the user is interacting with another human, this implementation may fail to identify many cases where a user is interacting with another human.

In a third implementation, the combined analysis can be structured such that a threshold number of properties of a selected set of properties must indicate that a user is interacting with another human in order for the at least one processor to conclusively determine that the at least one user is interacting with another human. For example, in the combination mentioned above, the threshold number of properties could be set as two, such that if any two of: another human 391 is in close proximity to user 390; the volume of the captured audio data is above a threshold; and the user is making head motions, the at least one processor may determine that the user 390 is interacting with another human 391. This implementation advantageously mitigates false positives, by requiring a number of criteria to be fulfilled before the at least one processor will conclusively determine that the user is interacting with another human, while also allowing some flexibility but not requiring that each and every property indicate that a user is interacting with another human. One skilled in the art will appreciate that the threshold number of properties could be set at any value, and the exemplary value of two is merely for illustrative purposes. For example, if ten different properties were being analyzed by the at least one processor, the threshold could be set at any number between 1 and 10.

In a fourth implementation, confidence scoring can be used to weight each property of a selected set of properties, to determine a level of confidence that the user 390 is interacting with another human 391. Specifically, the at least one processor may calculate a confidence score, which is increased for each analyzed property that indicates a user may be interacting with another human. The at least one processor may also lower the confidence score for each analyzed property which indicates that the user may not be interacting with another human. The at least one processor may not adjust the confidence score for each analyzed property which does not indicate either that the user is interacting with another human or is not interacting with another human. Further, increases and decreases to the confidence score do not need to be balanced between different properties. Instead, the at least one processor may weight certain properties higher than others, such that an adjustment to the confidence score based on a first property can be of greater magnitude than an adjustment to the confidence score based on a second property different from the first property. As an example, the at least one processor could assign a high weight to the properties which indicate that another human is directly in front of the user, and could assign a lower weight to the properties which indicate that the user is making an emotional facial expression, such that the magnitude of adjustment to the confidence score based on the properties which indicate that another human is directly in front of the user will be higher than the magnitude of adjustment to the confidence score based on the properties which indicate that the user is making an emotional facial expression. As a result, if the at least one processor were to determine that another human is directly in front of the user, but the user is not making an emotional facial expression, the at least one processor may still increase the confidence score that the user is interacting with the other human, since the properties indicating the other human is directly in front of the user are weighted higher than the properties which indicate that the user is making an emotional facial expression. Further still, adjustments to the confidence score can be roughly weighted, or can be weighted based on a gradient.

In implementations where rough weighting is used, the at least one processor can make a simple determination for each property of whether the property indicates that the user is interacting with another human, indicates that the user is not interacting with another human, or indicates neither. Based on this determination, the at least one processor can either increase the confidence score by a set amount if the property indicates that the user is interacting with another human, decrease the confidence score by a set amount if the property indicates that the user is not interacting with another human, or leave the confidence score unchanged if the property indicates neither. Alternatively, in implementations where a gradient used, the at least one processor can make a determination of how strongly a given property implies that a user is interacting with another human. For example, if there is another human in front of the user, at least one processor could determine that the strongest possibility that the user is interacting with the other human, and thus the highest confidence score weight, occurs if the other human is directly in front of the user. The further away from directly in front of the user the other human is, the less strong the possibility that the user is interacting with the other human, and thus the less high the confidence score. Further, the at least one processor can also decrease the confidence score using a gradient, by determining how strongly a given property implies that a user is not interacting with another human. For example, the at least one processor could determine that the quieter the captured audio data, the less likely it is that the user is interacting with another human, and thus the at least one processor could decrease the confidence score based on how low the volume of the captured audio data is. By using rough weighting wherein a given property is determined as increasing the confidence score, decreasing the confidence score, or not changing the confidence score, and adjusting the confidence score by a set value accordingly, is simple and requires less processing power. On the other hand, weighting the confidence score using gradients is more processor intensive, but will also provide more accurate determinations.

Figure 4B:
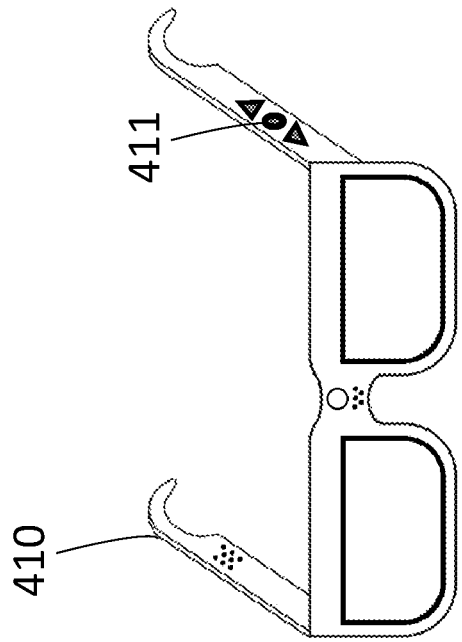
FIGS. 4A and 4B are isometric views that respectively show examples of WHUDs having user input mechanisms, according to at least two illustrated implementations.
Figure 4A:
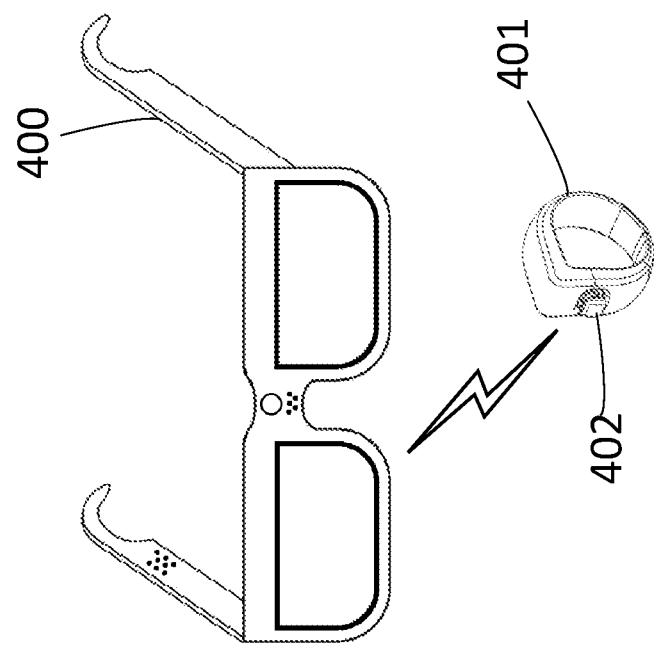

Ideally, all of the user context sensors of WHUD 100 can capture user context data continuously and provide this continuous user context data to the at least one processor, such that the at least one processor can make the most informed determinations possible. However, on many devices, this will not be practical, because continuously capturing and analyzing the user context data will consume battery life very quickly, thus reducing operational time of the device as well as potentially causing the device to become hot and uncomfortable for the user. To address this issue, it would be helpful to have the user context sensors of WHUD 100 selectively active at appropriate times, to minimize operation time, thus reducing power consumption. One solution in this regard is to have one, all, or a set of the user context sensor activate and capture data in response to the at least one processor identifying that content of a notification is to be presented to a user. Alternatively or additionally, one, all, or a set of the user context sensors can activate and capture data in response to the at least one processor receiving user input. In this regard, FIGS. 4A and 4B illustrate exemplary user input mechanisms that could be used in the present systems, devices, and methods. FIG. 4A shows a control ring 401 having a user input mechanism 402, which can include for example a joystick, a button, buttons, or a touch-sensitive area, among any other type of input mechanism as appropriate for a given application. Control ring 401 receives user input through user input mechanism 402, and transmits this user input to WHUD 400.

Control ring 401 could for example be one of the rings disclosed in U.S. Provisional Patent Application Ser. No. 62/607,816, U.S. Provisional Patent Application Ser. No. 62/607,819, or U.S. Provisional Patent Application Ser. No. 62/671,248. FIG. 4B shows a WHUD 410 having a user input mechanism 411 carried directly thereon. User input mechanism 411 can include for example a joystick, a button, buttons, or a touch-sensitive area, among any other type of input mechanism as appropriate for a given application. Further, user input could also be provided by a gesture recognition system, such as an EMG armband, which reads electrical signals in the arm of a user, and determines user gestures based on the electrical signals. Exemplary EMG armband and gesture identification systems are described in at least U.S. Pat. Nos. 9,299,248, 9,367,139, 9,389,694. Further still, user input in the context of the present systems, devices, and methods can also be provided via speech commands captured by microphone 111 in FIG. 1.

As examples of the above, upon the at least one processor 120 identifying that at least one notification is to be presented to a user, or upon the at least one processor 120 receiving a user input, each of microphone 111, camera 112, IMU 113, eye tracking system 114, and proximity sensors 115 can activate and capture 1 second of data. The at least one processor 120 can analyze this 1 second of data from each sensor to determine whether a user is interacting with another human. Further, each sensor does not need to capture the same amount of data. For example, microphone 111 could capture 2 seconds of audio data, camera 112 could capture a single instant of visual data as a still image, IMU 113 could capture 5 seconds of user motion data, eye tracking system 114 could capture 3 seconds of user eye data, and proximity sensors 115 could capture 0.5 seconds of user facial proximity data. The above described amounts of captured data are merely exemplary, and any amount of data could be captured as is appropriate for a given application. In general, the exact amount of data to capture should strike a balance between optimizing accuracy of the at least one processor 120 determining whether the at least one user is interacting with another human, and obtaining a desirable operational battery life of WHUD 100.

For convenience, the above discussion points specifically to the features of WHUD 100, but one skilled in the art will appreciate that the discussion is also fully applicable to WHUD 300 and the corresponding features thereof, or to any other suitable device which could be used to achieve the above features.

Controlling Notifications

With reference to the method of FIG. 2, determining whether a user is interacting with another human, as in act 203, determines how to present notifications to a user. For illustrative purposes, the hardware referred to below corresponds to the WHUD 100 shown in FIG. 1, but one skilled in the art will appreciate that the present systems, devices, and methods can be implemented on any suitable hardware arrangement as is appropriate for a given application. If the at least one processor determines that the user is not interacting with another human, method 200 proceeds to act 204, presenting content of at least one notification to a user of WHUD 100 according to a first presentation format, i.e., presenting the at least one notification to the user as per the normal notification presentation format of WHUD 100. If, however, the at least one processor 120 determines in act 203 that the user is interacting with another human, method 200 proceeds to act 205, presenting content of the at least one notification to the user of WHUD 100 according to a second presentation format different from the first presentation format. Thus, controlling presentation of notifications as in the present systems, devices, and methods pertains to modifying how notifications are presented based on whether a user is interacting with another human. This advantageously allows notifications to be less intrusive and distracting, which allows users to focus on human-to-human interactions and stay in touch with the real world. Alternatively, in some implementations, the at least one processor 120 can determine whether the user is interacting with another human, and whether the user is the one talking. WHUD 100 can present content of the at least one notification to the user according to either the first presentation format or the second presentation format based on whether the user is the one talking. For example, WHUD 100 could present content of the at least one notification to the user if the user is the one talking, but delay presentation of content of the notification if the user is not talking, or vice-versa. Several examples of acts 204 and 205 are described in detail below and are illustrated in FIGS. 5A-5D, 6A-6E, 7A-7D, 8A-8B, 9A-9B, 10, 11, 12, 13, 14, 15A-15D, and 16. For illustrative purposes, the hardware referred to below with regards to FIGS. 5A-5D, 6A-6E, 7A-7D, 8A-8B, 9A-9B, 10, 11, 12, 13, 14, 15A-15D, and 16 corresponds to the WHUD 100 shown in FIG. 1. However, one skilled in the art will appreciate that the present systems, devices, and methods can be implemented on any suitable hardware arrangement as is appropriate for a given application.

Figure 5A:
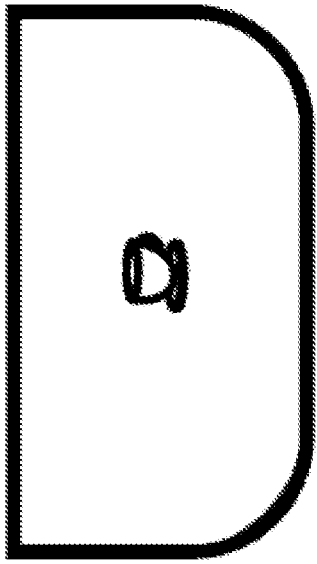
FIGS. 5A, 5B, 5C, and 5D are plan views that respectively show examples of generating visual summaries of notification content with reduced display sizes, according to at least two illustrated implementations.
Figure 5B:
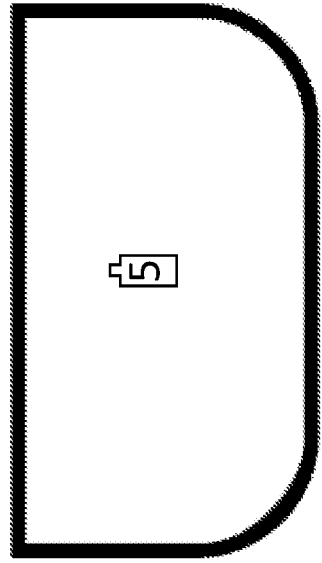
Figure 5C:
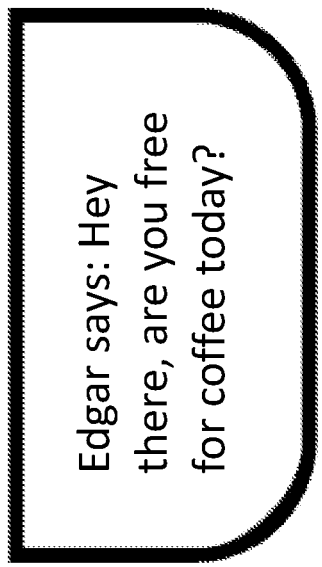
Figure 5D:

FIGS. 5A-5D illustrate implementations in which the first presentation format is a visual presentation format, such that content of at least one notification will be presented on display 101. FIG. 5A illustrates an example of presentation of content of a notification according to a first presentation format: a text message is received, and display 101 presents the sender and the full text content of the message to a user of WHUD 100. The presentation in FIG. 5A is large and intrusive. FIG. 5B illustrates the same example, but with content of the notification presented in a second format different from the first format. In the case of FIG. 5B, the at least one processor 120 generates a convenient visual summary representative of the content of the message, but smaller in display size and easier for the user to quickly interpret, and display 101 displays the visual summary. Similar to FIG. 5A, FIG. 5C also illustrates an example of presentation of content of a notification according to a first presentation format: the at least one processor 120 identifies that a notification should be presented warning the user that the battery of WHUD 100 is low, and display 101 presents a large and intrusive full text warning to the user. FIG. 5D illustrates the same example, but with the content of the notification presented in a second format different from the first format. In the case of FIG. 5D, the at least one processor 120 generates a convenient visual summary representative of the content of the battery level warning notification, but smaller in display size and easier for the user to quickly interpret, and display 101 displays the visual summary. Exemplary systems, devices, and methods for generating visual summaries of notifications are described in at least U.S. Provisional Patent Application No. 62/577,081. Essentially, the examples of FIGS. 5A and 5C show cases where content of a notification is presented to a user by display 101 according to a first presentation format when the at least one processor 120 determines that the user is not interacting with another human, and the examples of FIGS. 5B and 5D show cases where content of a notification is presented to a user by display 101 according to a second presentation format different from the first presentation format (i.e., a visual summary of content of the notification) when the at least one processor 120 determines that the user is interacting with another human.

Figure 6A:
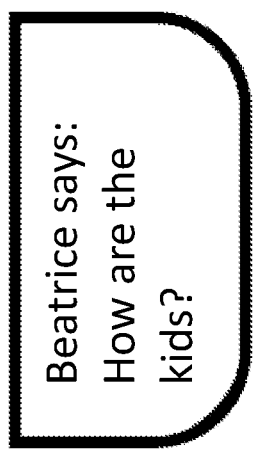
FIGS. 6A, 6B, 6C, 6D, and 6E are plan views that respectively show examples of changing a display position of notification content, according to at least three illustrated implementations.
Figure 6B:
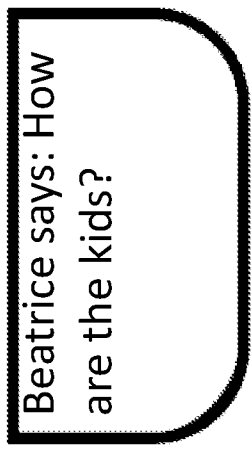
Figure 6C:
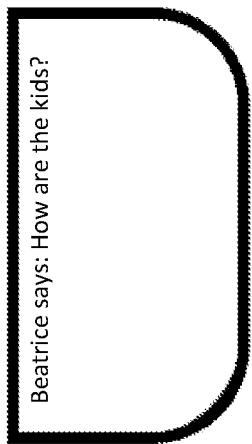
Figure 6D:
Figure 6E:
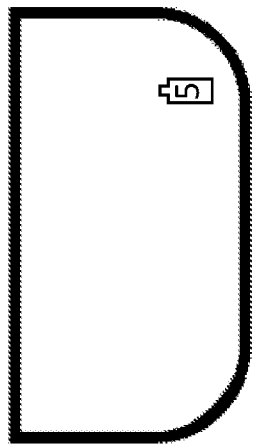

FIGS. 6A-6E show implementations of the present systems, devices, and methods for reducing distraction caused by visual presentation of notifications. FIG. 6A shows a presentation of content of a notification according to a first presentation format as in act 204 of method 200 of FIG. 2. In FIG. 6A, the at least one notification is presenting in a somewhat obtrusive manner: large and in the middle of the display. FIG. 6B shows an exemplary second presentation format different from the first presentation format. In FIG. 6B, the at least one notification is presented at the top of the display, in order to be less obtrusive to the user. FIG. 6C further expands on this concept, by also reducing the display size of the at least one notification. FIG. 6D shows another exemplary notification presented according to a first presentation format, wherein the content of the notification is presented in the middle of the display with a large display size. FIG. 6E shows an exemplary second presentation format different from the first presentation format of FIG. 6D, wherein the displayed content of the notification is not only moved to a different position on the display, but the content of the notification is also summarized into a convenient visual summary, similar to as discussed above with regards to FIGS. 5A-5D.

Advantageously, by moving the displayed notification to a different portion of the display, shrinking the display size of the notification, and/or generating a visual summary of the notification allows notifications to be presented in a less obtrusive manner, thereby causing less distraction to the user when the user is interacting with another human. Further, although FIGS. 6B, 6C, and 6E illustrate that content of the at least one notification can be displayed at the top and bottom-right of the display, one skilled in the art will appreciate that that the content of the at least one notification can be displayed at any region of the display, as appropriate for a given application, on a given set of hardware, for a given user. The specific location at which content of the at least one notification is presented could even be determined by a user setting, if appropriate.

Figure 7C:
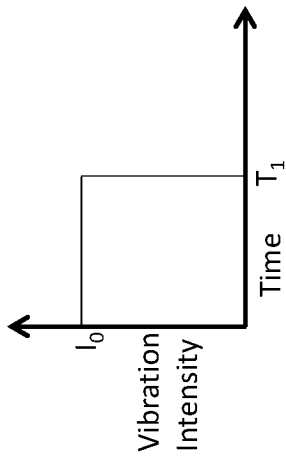
FIGS. 7A, 7B, 7C, 7D, and 7E are graphs that respectively show examples of generating alternate vibratory representations of notification content, according to at least four illustrated implementations.
Figure 7B:
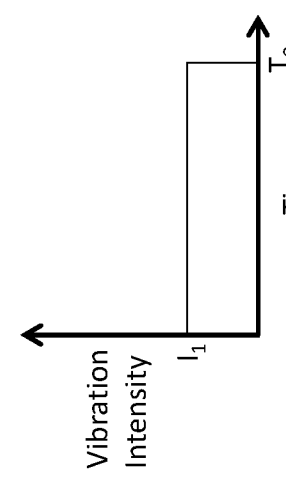
Figure 7E:
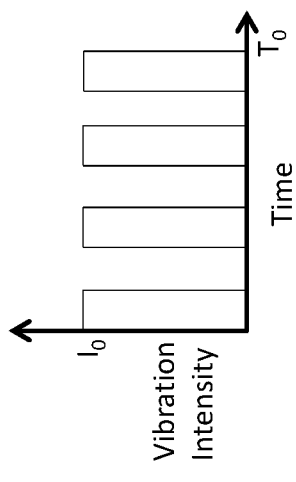
Figure 7A:
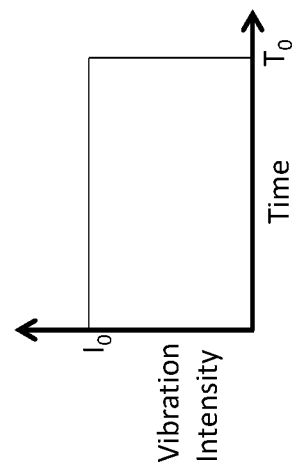
Figure 7D:
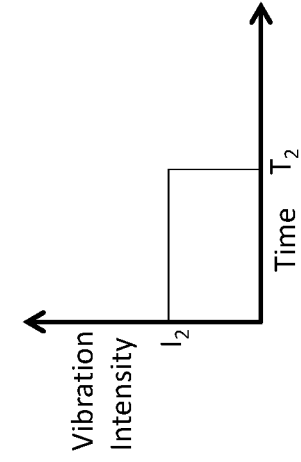

FIGS. 7A-7E illustrate implementations in which the first presentation format is a vibratory presentation format. In these examples, content of a notification is presented to a user of WHUD 100 by either speaker 102 or haptic output interface 103. The term vibratory output interface used herein encompasses at least one or both of speaker 102 and haptic output interface 103. In FIG. 7A, content of a notification is presented by one of the vibratory output interfaces according to a first presentation format as in act 204 of method 200 in FIG. 2, the first presentation format being a vibration having a vibration intensity $I_0$ and a duration $T_0$. In the present systems, devices, and methods, "vibration intensity" refers to the amount of force or strength involved in a vibration. A higher vibration intensity means that a vibration will be stronger or more aggressive, and thus be felt or heard more strongly by a user. Conversely, a lower vibration intensity means that a vibration will be weaker and less aggressive, and thus will be heard or felt less strongly by a user. FIGS. 7B-7E illustrate examples of a second presentation format different from the first presentation format, as in act 205 of method 200 in FIG. 2. In each of FIGS. 7B-7E, the second presentation format is an alternate vibratory representation having a shorter duration than the first presentation format, having a vibration intensity less than the first presentation format, or having a vibration pattern different from the first presentation format. FIG. 7B illustrates an alternate vibratory representation having a vibration intensity $I_1$ which is less than vibration intensity $I_0$ of the first presentation format, and having a vibration duration $T_0$ which is the same as the vibratory duration $T_0$ of the first presentation format. FIG. 7C illustrates an alternate vibratory representation having a vibration intensity $I_0$ which is the same as the vibration intensity $I_0$ of the first presentation format, and having a vibration duration $T_1$ which is shorter than the vibration duration $T_0$ of the first presentation format. FIG. 7D illustrates an alternate vibratory representation having a vibration intensity $I_1$ which is less than vibration intensity $I_0$ of the first presentation format, and having a vibration duration $T_1$ which is shorter than the vibration duration $T_0$ of the first presentation format. FIG. 7E illustrates an alternate vibratory representation having a pattern which is a series of pulsed vibrations, as opposed to the continuous vibration of FIG. 7A. Additionally, if the first presentation format is a haptic presentation format, the alternate vibratory representation can be an audio sound. Conversely, if the first presentation is an audio presentation format, the alternate vibratory representation can be haptic. Further still, if the first presentation format is an audio jingle, the alternate vibratory representation can be an alternative jingle. Additionally, the alternate vibratory representation can be a different frequency from the first presentation format. By altering the intensity, duration, pattern, and/or frequency of a vibratory output interface, a notification can be made less intrusive and less distracting to the user, while still presenting content of the notification to the user.

FIGS. 8A, 8B, 9A, and 9B illustrate implementations in which the output device which presents content of the at least one notification according to the first presentation format is different from the output device which presents content of the at least one notification according to the second presentation format different from the first presentation format, as discussed in detail below.

FIG. 8A shows an implementation in which the first presentation format is a visual presentation format, such that WHUD 100 presents content of a notification using display 101. FIG. 8B shows a second presentation format, in which the at least one processor 120 generates a vibratory representation of content of the at least one notification, and the speaker 102 and/or haptic output interface 103 present the vibratory representation of content of the at least one notification. In summary, if the at least one processor 120 determines that the user is interacting with another human at act 203 in method 200 in FIG. 2, WHUD 100 can change the presentation format, such that content of the notification will be presented with vibratory output interfaces speaker 102 and/or haptic output interface 103 instead of display 101. Presenting a visual notification could draw the viewers gaze, distracting them from the human they are interacting with, as well as potentially alerting the other human that the user is checking notifications, thereby offending them. The implementation of FIGS. 8A and 8B avoids this, by preventing the notification from being presented by display 101, but still allows the user to know when they receive notifications, so that they can try to leave the interaction politely at an appropriate moment to handle the notifications.

Figure 9B:
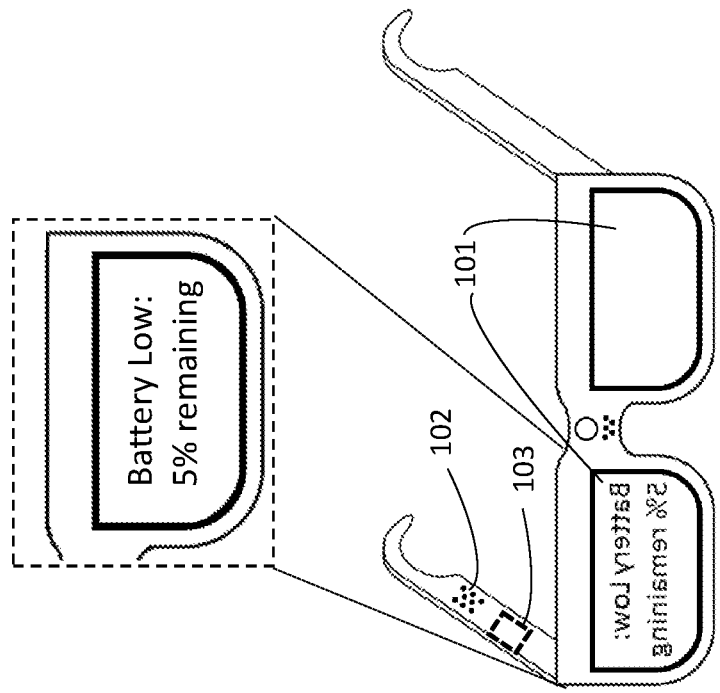
FIGS. 9A and 9B are isometric views that respectively show an example of generating a visual representation of notification content instead of a vibratory presentation format of the notification content, according to at least one illustrated implementation.
Figure 9A:
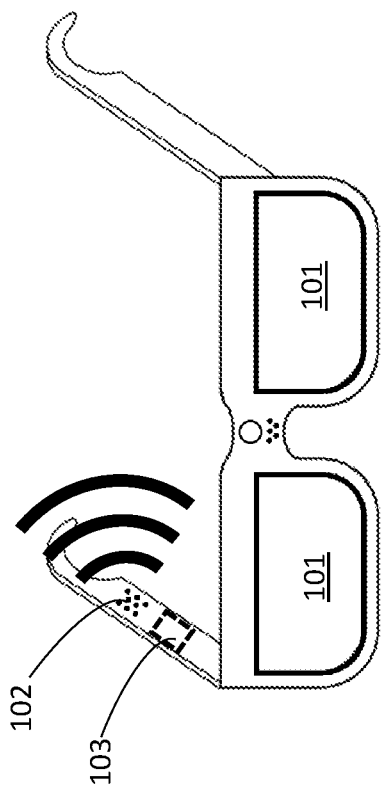

FIG. 9A shows an implementation in which the first presentation format is a vibratory presentation format, such that WHUD 100 presents content of a notification using one or both of the vibratory output interfaces: speaker 102 and/or haptic output interface 103. FIG. 9B shows a second presentation format, in which the at least one processor 120 generates a visual representation of content of the at least one notification, and the display 101 presents the visual representation of content of the at least one notification. In summary, if the at least one processor 120 determines that the user is interacting with another human at act 203 in method 200 in FIG. 2, WHUD 100 can change the presentation format, such that content of the notification will be presented with display 101 instead of vibratory output interfaces speaker 102 and/or haptic output interface 103. Presenting a vibratory notification could potentially be audible to the other human with which the user is interacting, thus alerting them that the user is receiving notifications. Further, vibratory notifications could cause the user to have difficulty hearing what the other human is saying, because the vibrations could "drown out" or add significant noise to the sound which the user hears. The implementation of FIGS. 9A and 9B avoids these issues, by preventing the notification from being presented by vibratory output interfaces, but still allows the user to receive their notifications by display 101.

Although the implementation of FIGS. 8A and 8B appears to be in opposition to the implementation of FIGS. 9A and 9B, one skilled in the art will appreciate that each of these implementations will be advantageous in different situations, for different users, and/or on different hardware. For example, a user interface may be provided which allows each user to individually select whether they prefer to have notifications presented in a vibratory presentation format or a visual presentation format. As another example, a given device may be known to have a particularly loud speaker and/or a particularly intense haptic output, and as a result presentation of notification content on this device could be setup to be presented visually when a user is interacting with another human, in accordance with the implementation of FIGS. 9A and 9B. One skilled in the art will appreciate that the above situations are merely illustrative examples of when the implementations of FIGS. 8A-8B and 9A-9B could be used, and that there are countless reasons why in any given situation it may be preferable to utilize either the implementation of FIGS. 8A-8B or the implementation of FIG. 9A-9B.

Figure 10:
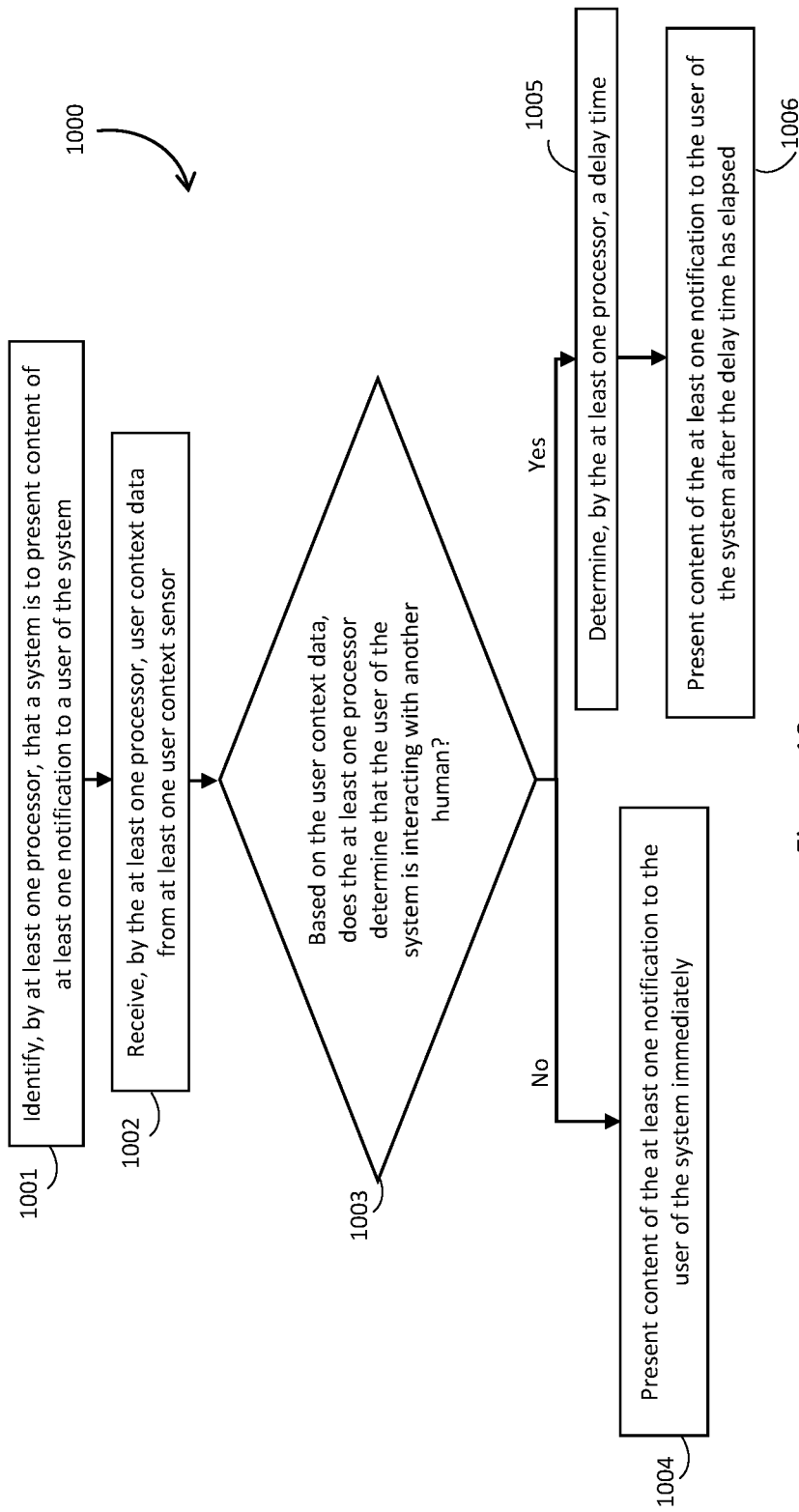
FIG. 10 is a flow diagram showing an exemplary method of presenting notification content immediately if a user is not interacting with another human, or delaying presentation of notification content if the user is interacting with another human, according to at least one illustrated implementation.

FIG. 10 is a flow diagram showing a method 1000 of controlling notifications in accordance with the present systems, devices, and methods. Method 1000 may be implemented using WHUD 100 as illustrated in FIG. 1, and reference numerals below refer to hardware components of WHUD 100 for ease of discussion, but one skilled in the art will appreciate that method 1000 may also be implemented on any hardware as appropriate for a given application. Method 1000 includes acts 1001, 1002, 1003, 1004, 1005, and 1006 but one skilled in the art will appreciate that in alternative implementations certain acts may be omitted and/or additional acts may be added. One skilled in the art will also appreciate that the illustrated order of the acts is shown for exemplary purposes only and may change in alternative implementations. Method 1000 is similar in some respects to method 200, in that acts 1001, 1002, and 1003 correspond to acts 201, 202, and 203 of method 200, respectively, such that the description relating to acts 201, 202, and 203 fully applies to acts 1001, 1002, and 1003, and will not be repeated here for brevity. Additionally, act 1004 further defines act 204, and acts 1005 and 1006 further define act 205.

If the at least one processor 120 determines at 1003 that the user of WHUD 100 is not interacting with another human, method 1000 proceeds to act 1004, in which WHUD 100 presents content of at least one notification to the user immediately (i.e., present the at least one notification according to a first presentation format). On the other hand, if the at least one processor 120 determines at 1003 that the user of WHUD 100 is interacting with another human, method 1000 proceeds to act 1005, in which the at least one processor 120 determines a delay time. The at least one processor 120 then waits until the delay time has elapsed, and proceeds to act 1006. In act 1006, WHUD 100 presents content of the at least one notification to the user of the system after the delay time has elapsed. In essence, method 1000 involves immediately presenting content of at least one notification to a user if the user is not interacting with another human, or delaying presenting of content of the at least one notification if the user is interacting with another human.

Advantageously, delaying presentation of the at least one notification if the user is interacting with another human allows the user to completely focus on the interaction, and be presented with their notifications later when they might be finished with the interaction. The delay time could be a predetermined value, set by a developer of the WHUD 100 or software which runs on the WHUD 100, or set by a user of WHUD 100. The delay time could also be a dynamically determined value, which could be determined based on at least one of the time of day, the user's typical habits and schedule, events in the user calendar, an identity of the other human with which the user is interacting, movement patterns of the user, eye movement patterns of the user, or any other source of information as appropriate for a given application.

Figure 11:
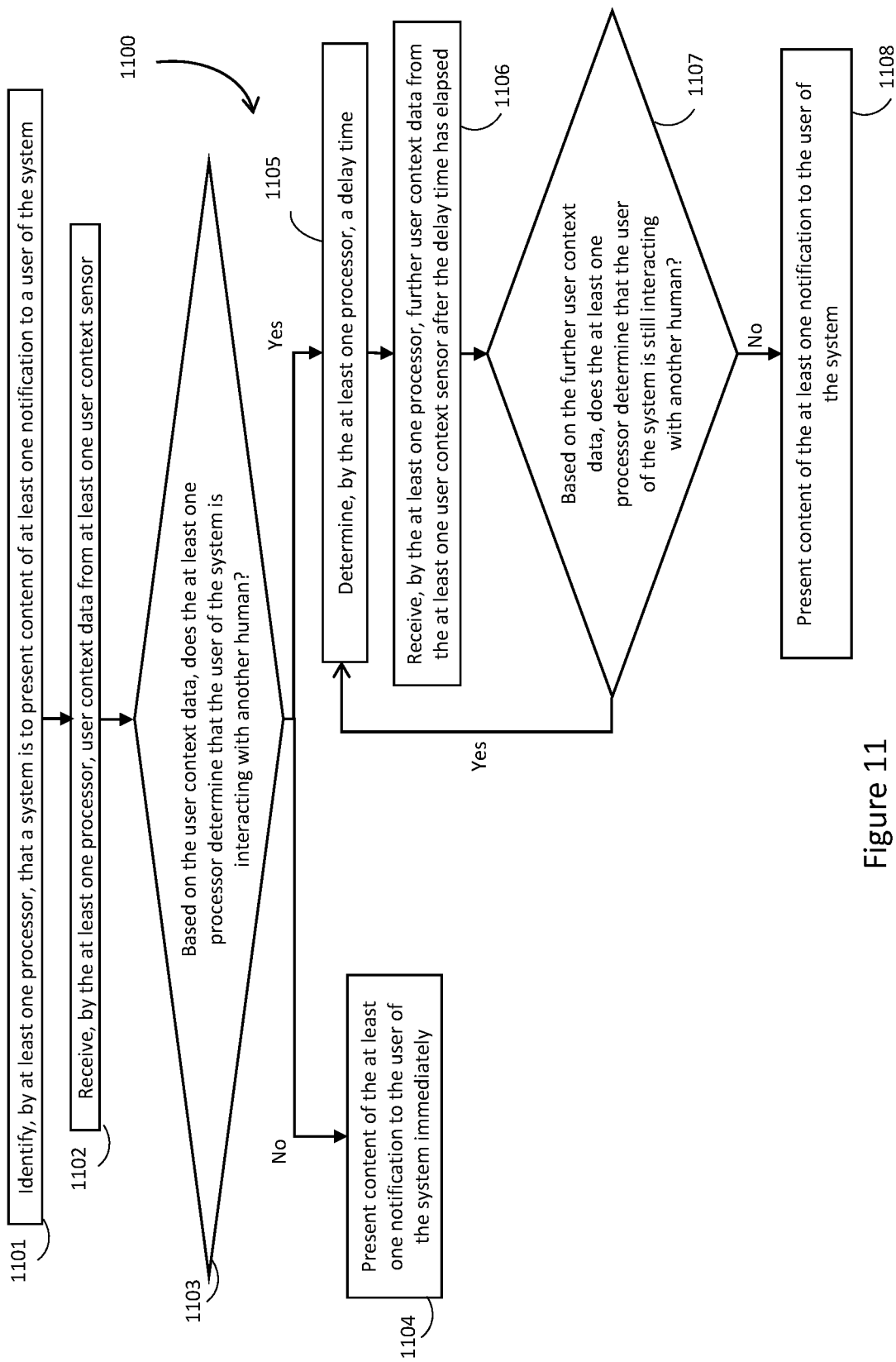
FIG. 11 is a flow diagram showing an exemplary method of presenting notification content immediately if a user is not interacting with another human or repeatedly delaying presentation of notification content if the user is interacting with another human until the user is not interacting with another human, according to at least one illustrated implementation.

FIG. 11 is a flow diagram showing a method 1100 of controlling notifications in accordance with the present systems, devices, and methods. Method 1100 may be implemented using WHUD 100 as illustrated in FIG. 1, and reference numerals below refer to hardware components of WHUD 100 for ease of discussion, but one skilled in the art will appreciate that method 1100 may also be implemented on any hardware as appropriate for a given application. Method 1100 includes acts 1101, 1102, 1103, 1104, 1105, 1106, 1107, and 1108 but one skilled in the art will appreciate that in alternative implementations certain acts may be omitted and/or additional acts may be added. One skilled in the art will also appreciate that the illustrated order of the acts is shown for exemplary purposes only and may change in alternative implementations. Method 1100 is similar to method 1000, in that acts 1101, 1102, 1103, 1104, and 1105 correspond to acts 1001, 1002, 1003, 1004, and 1005 of method 1000, respectively, such that the description relating to acts 1001, 1002, 1003, 1004, and 1005 fully applies to acts 1101, 1102, 1103, 1104, and 1105, and will not be repeated here for brevity. Acts 1106, 1107, and 1108 further define how a delay time can be used to appropriately present content of at least one notification to a user, as discussed below.

After determining a delay time in act 1105, method 1100 proceeds to act 1106, in which the at least one processor 120 receives further user context data from at least one user context sensor after the delay time has elapsed. At 1107, the at least one processor 120 determines whether the user is still interacting with another human based on the further user context data. If the user is not interacting with another human anymore, method 1100 proceeds to act 1108, in which WHUD 100 presents content of the at least one notification to the user. On the other hand, if at 1107 the at least one processor 120 determines based on the further user context data that the user is still interacting with the other human, method 1100 returns to act 1105, at which a new delay time is generated, and acts 1106 and 1107 are repeated. In essence, method 1100 as shown in FIG. 11 involves delaying presentation of a notification if a user is interacting with a human, and periodically checking (with intervals of the delay time) whether the user is still interacting with the other human, in order to determine whether the at least one notification should be presented. The loop of acts 1105, 1106, and 1107 shown in FIG. 11 can be repeated indefinitely, until the at least one processor 120 determines that the user is no longer interacting with another human. Alternatively, the loop of acts 1105, 1106, and 1107 can be repeated a set number of times, such that after presentation of the notification has been delayed the set number of times, the notification will eventually be presented to the user even if the user is still interacting with another human. The number of times the loop should repeat can be a predetermined number, set by a developer of the WHUD 100 or software which runs on the WHUD 100, or set by a user of WHUD 100. The number of times the loop should be repeated could also be a dynamically determined value, which could be determined based on at least one of the time of day, the user's typical habits and schedule, events in the user calendar, an identity of the other human with which the user is interacting, movement patterns of the user, eye movement patterns of the user, or any other source of information as appropriate for a given application.

Figure 12:
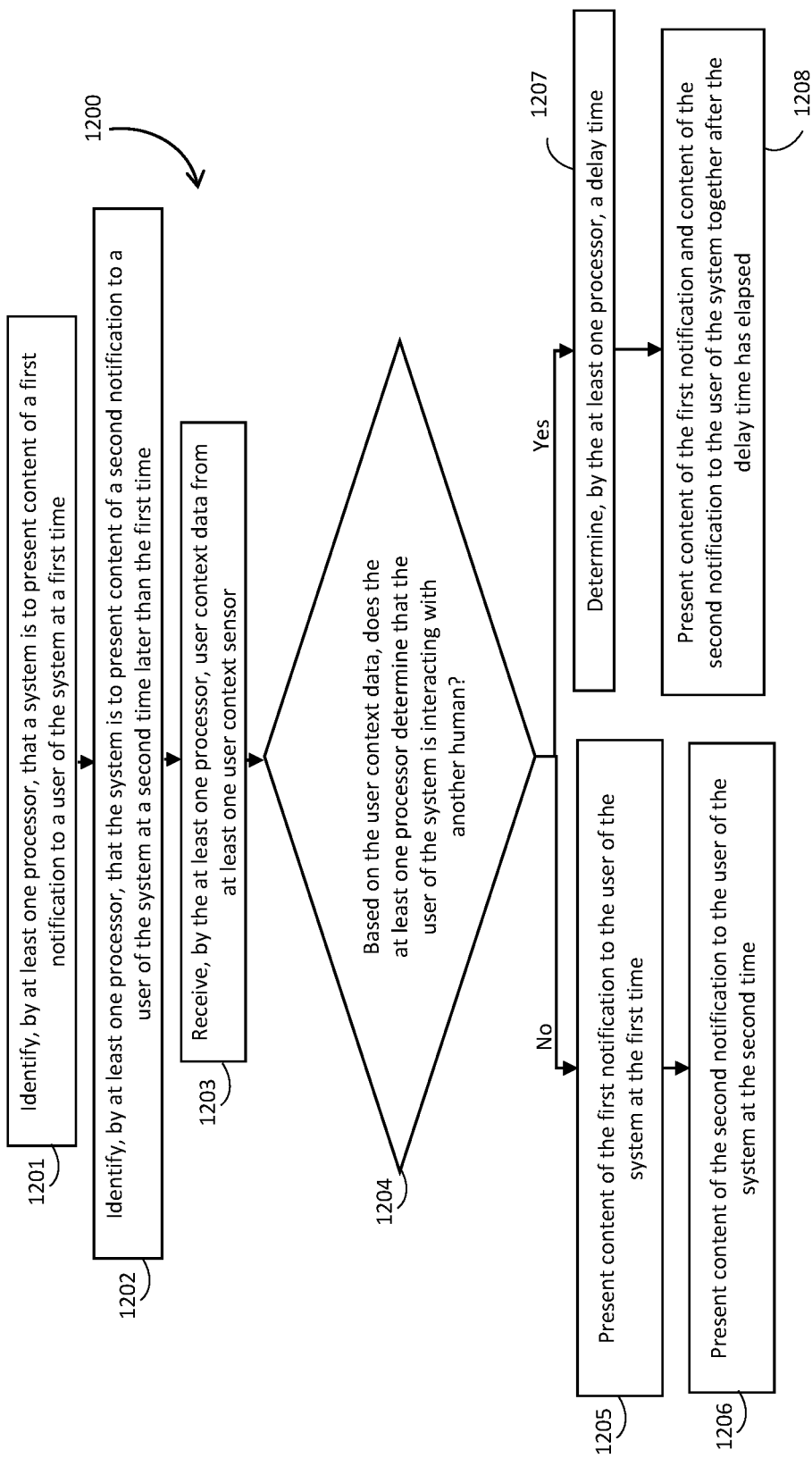
FIG. 12 is a flow diagram showing an exemplary method of presenting content of first and second notifications to a user at first and second times, respectively, if the user is not interacting with another human, or presenting first and second notifications together after a delay time if the user is interacting with another human, according to at least one illustrated implementation.

FIG. 12 is a flow diagram showing a method 1200 of controlling notifications in accordance with the present systems, devices, and methods. Method 1200 may be implemented using WHUD 100 as illustrated in FIG. 1, and reference numerals below refer to hardware components of WHUD 100 for ease of discussion, but one skilled in the art will appreciate that method 1200 may also be implemented on any hardware as appropriate for a given application. Method 1200 includes acts 1201, 1202, 1203, 1204, 1205, 1206, 1207, and 1208 but one skilled in the art will appreciate that in alternative implementations certain acts may be omitted and/or additional acts may be added. One skilled in the art will also appreciate that the illustrated order of the acts is shown for exemplary purposes only and may change in alternative implementations. Method 1200 is similar to method 1000, in that acts 1203 and 1204 correspond to acts 1002 and 1003 of method 900, respectively, such that the description relating to acts 1002 and 1003 fully applies to acts 1203 and 1204, and will not be repeated here for brevity. Act 1201 involves identifying, by the at least one processor, that a system is to present content of a first notification to a user of WHUD 100 at a first time and act 1202 involves identifying, by the at least one processor, that the system is to present content of a first notification to a user of WHUD 100 at a second time later than the first time. The identifying of acts 1201 and 1202 is similar to the identifying of act 201 in method 200 of FIG. 2, and thus the description of act 201 fully applies to acts 1201 and 1202, and will not be repeated here for brevity. However, acts 1201 and 1202 further expand on the concept of act 201, in that acts 1201 and 1202 together essentially involve identifying that a system is to present two notifications to a user of the system at different times.

If the at least one processor 120 determines at act 1204 that the user of WHUD 100 is not interacting with another human, method 1200 proceeds to acts 1205 and 1206. At 1205, WHUD 100 presents content of the first notification to the user at the first time, and at 1206, WHUD 100 presents content of the second notification to the user at the second time. In essence, acts 1205 and 1206 involve presenting the first and second notifications at the times which they were identified to be presented at. This could be, for example, presenting a notification about a first received message when the first message is received, and presenting a notification about a second received message when the second message is received. On the other hand, if that at least one processor determines at act 1204 that the user of WHUD 100 is interacting with another human, method 1200 proceeds to acts 1207 and 1208. At 1207, the at least one processor 120 determines a delay time. At 1208, WHUD 100 presents content of the first notification and content of the second notification to the user of WHUD 100 together after the delay time has elapsed. In essence, method 1200 involves identifying when two or more notifications are to be presented at different times, and if the user is interacting with another human, delaying presentation of the two or more notifications until after a delay time has elapsed, and presenting the two or more notifications together after the delay time has elapsed. In summary, method 1200 can group notifications identified while the user is interacting with another human, and present the grouped notifications to the user after a delay time or after the user is no longer interacting with another human.

Figure 13:
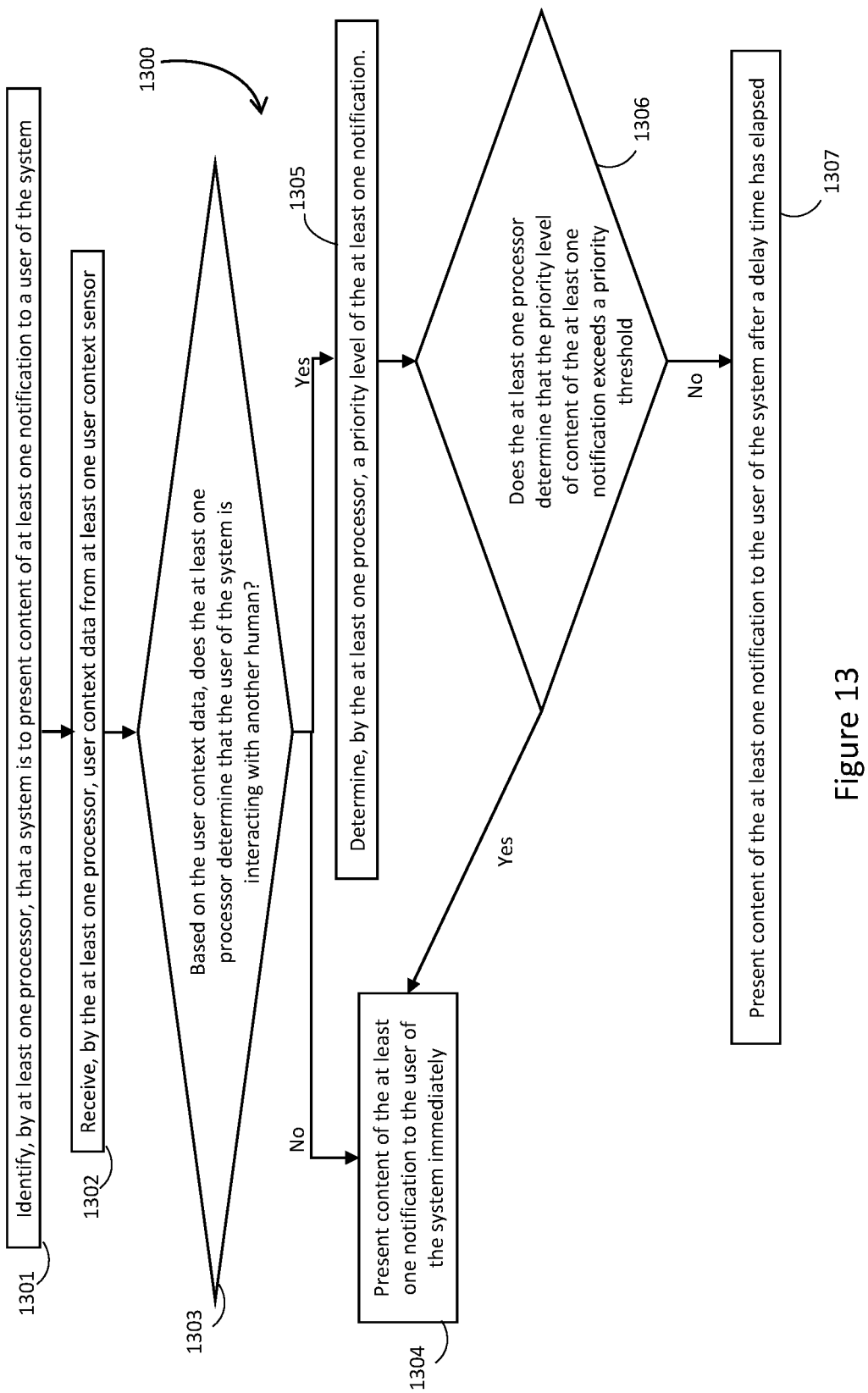
FIG. 13 is a flow diagram showing an exemplary method of determining whether notification content should be presented immediately, even if the user is interacting with another human, based on a priority level of the notification, according to at least one illustrated implementation.

FIG. 13 is a flow diagram showing a method 1300 of controlling notifications in accordance with the present systems, devices, and methods. Method 1300 may be implemented using WHUD 100 as illustrated in FIG. 1, and reference numerals below refer to hardware components of WHUD 100 for ease of discussion, but one skilled in the art will appreciate that method 1300 may also be implemented on any hardware as appropriate for a given application. Method 1300 includes acts 1301, 1302, 1303, 1304, 1305, 1306, and 1307 but one skilled in the art will appreciate that in alternative implementations certain acts may be omitted and/or additional acts may be added. One skilled in the art will also appreciate that the illustrated order of the acts is shown for exemplary purposes only and may change in alternative implementations. Method 1300 is similar to method 1000, in that acts 1301, 1302, 1303, and 1304 correspond to acts 1001, 1002, 1003, and 1004 of method 1000, respectively, such that the description relating to acts 1001, 1002, 1003, and 1004 fully applies to acts 1301, 1302, 1303, and 1304, and will not be repeated here for brevity. Method 1300 includes a more detailed implementation of act 1005 of method 1000, wherein the at least one notification is presented according to a second presentation format different from the first presentation format. Specifically, if the at least one processor 120 determines at act 1303 that the user is interacting with another human, method 1300 proceeds to act 1305. At 1305, the at least one processor 120 determines a priority level of the at least one notification, as is discussed in more detail later. At 1306, the at least one processor 120 determines whether the priority level of content of the at least one notification exceeds a priority threshold. If the priority level of content of the at least one notification does exceed a priority threshold, method 1300 proceeds to act 1304, presenting content of the at least one notification to the user of WHUD 100 immediately. If the priority level of content of the at least one notification does not exceed the priority threshold, method 1300 proceeds to act 1307, presenting content of the at least one notification to the user of WHUD 100 after a delay time has elapsed. In essence, method 1300 involves determining whether a notification is high priority, presenting high priority messages to the user immediately even if the user is interacting with another human, and delaying presentation of low priority messages until later if the user is interacting with another human.

FIGS. 14 and 15A-15D illustrate exemplary techniques for determining a priority level of a notification, as in act 1306 of method 1300 in FIG. 13.

Figure 14:
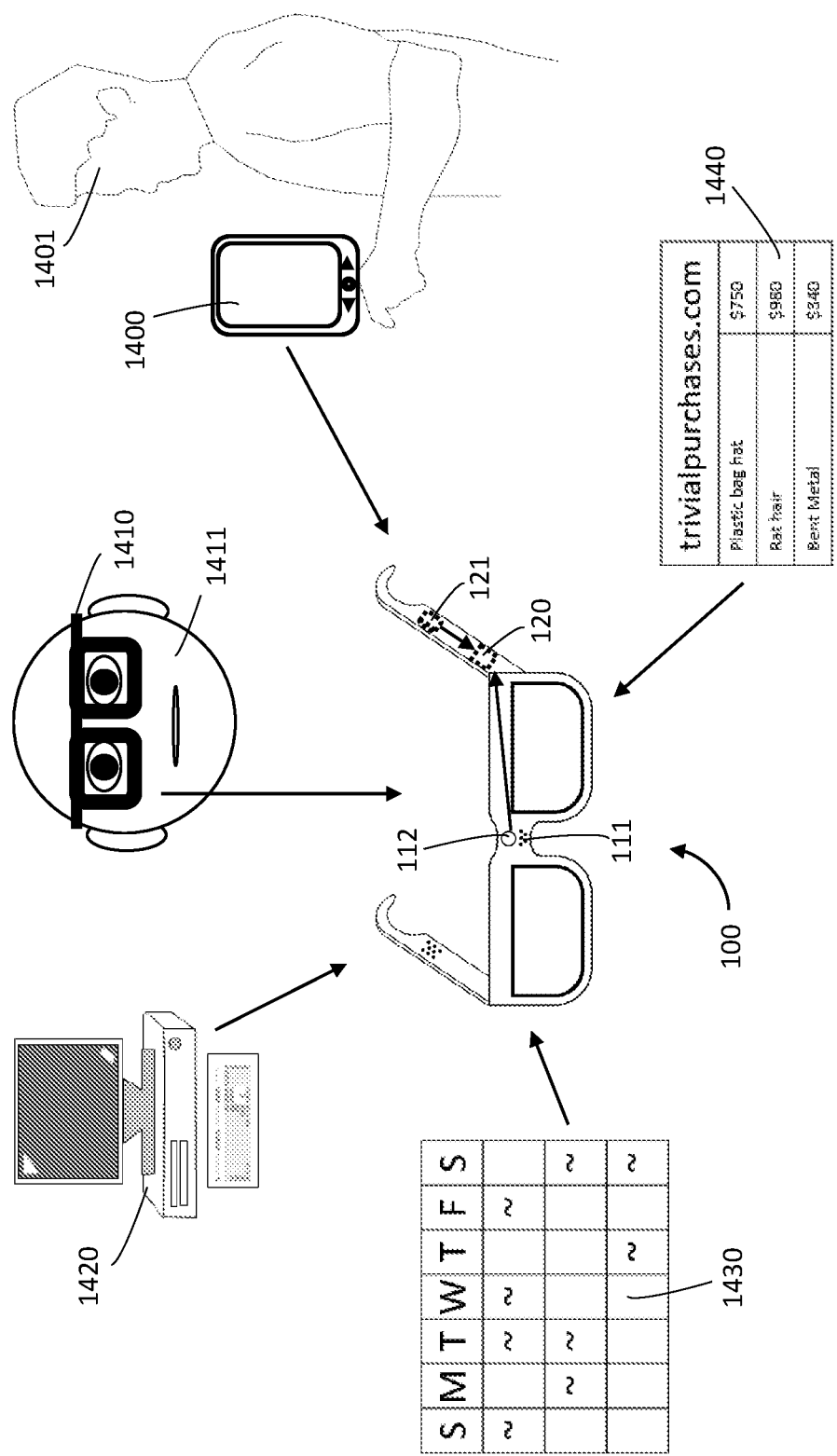
FIG. 14 is a schematic diagram that shows several exemplary sources of notification content which can be used to determine a priority level of at least one notification, according to at least seven illustrated implementations.

FIG. 14 illustrates several sources of content of the at least one notification, which enables determining, by the at least one processor 120, a source of content of the at least one notification, and determining, by the at least one processor 120, a priority level of the notification based on the source of content of the at least one notification. FIG. 14 includes remote device 1400 associated with remote user 1401, such that the at least one processor 120 can determine priority level of content of at least one notification based on the remote device 1400 and/or the remote user 1401 associated with remote device 1401. For example, if remote device 1400 is a device which is unfamiliar to WHUD 100, and/or the remote user 1401 of remote device 1400 is unknown to WHUD 100, the at least one processor 120 may determine that content of at least one notification received from the remote device 1400 should have a low priority level. On the other hand, if WHUD 100 recognizes remote device 1400 and/or remote user 1401 as an important contact of the user of WHUD 100, the at least one processor 120 may determine that content of at least one notification received from remote device 1400 should be high priority. FIG. 14 also illustrates remote WHUD 1410 associated with remote user 1411, for which the same discussion as regarding remote device 1400 and remote user 1401 applies, but the remote device is a WHUD. FIG. 14 also illustrates a remote computer 1420, to illustrate that content of at least one notification can come from sources other than portable electronic devices, but can also come from home computers, laptops, and servers, among any other suitable content source, as appropriate for a given application. FIG. 14 also illustrates a calendar 1430, which may include scheduled events for the user of WHUD 100. Calendar 1430 can be stored on non-transitory processor readable medium 121 of WHUD 100, or can be stored external to WHUD 100, such as on a remote server. Calendar 1430 can provide content of at least one notification to WHUD 100, and the at least one processor 120 can determine that content of notifications from calendar 1430 are either high priority or low priority, depending on the settings of the calendar and the user's preferences. Further, content of notifications from calendar 1430 can be determined as having different priority levels depending on the nature of the content. As an example, the at least one processor 120 may determine that meetings with the user's boss or clients are always high priority, but may determine that scheduled breaks and tea parties are low priority. FIG. 14 also illustrates a website 1440, which can provide content of at least one notification to the user of WHUD 100. The at least one processor 120 may determine that content of notifications from website 1440 are either low or high priority, depending on the settings of the website, the user's preferences, and the nature of the content of the at least one notification. For example, the at least one processor 120 may determine that promotional notifications from the website, such as advertisements of new products, are in general low priority. However, the user could set notifications regarding a specific product as high priority, should they want to act the moment the product is available. In addition, a source of content of at least one notification does not need to be external to WHUD 100, but rather content of notifications can be generated internally, such as from the operating system of WHUD 100, software which runs on WHUD 100, and/or sensors carried by WHUD 100. As examples, the at least one processor 120 could generate content of at least one notification based on a battery level of WHUD 100, available storage capacity of WHUD 100, available random access memory (RAM) of WHUD 100, available processing capacity of the at least one processor 120, temperature of WHUD 100, and any other suitable information stored on non-transitory processor readable medium 121, received by sensors of WHUD 100, or otherwise available to WHUD 100, as appropriate for a given application.

FIGS. 15A-15D illustrate several example notifications, from which the at least one processor 120 can analyze the content of the notification to determine a priority level of the notification. FIGS. 15A-15B show notifications which the at least one processor 120 may analyze the content of, in order to determine that the notifications are of high priority, whereas FIGS. 15C-15D show notifications which the at least one processor may analyze the content of, in order to determine that the notification are of low priority.

Regarding FIG. 15A, the source of the notification is a calendar of the user of WHUD 100, in which the user has a meeting with their boss scheduled in 5 minutes. The at least one processor 120 may determine that the content of a notification is high priority based on any or all of at least: the nature of the notification, other people relevant to the notification, time restrictions related to the notification, and/or any other suitable information related to the calendar. In this case, the nature of the notification is a meeting reminder (i.e., important to ensure that the user is not late), other people relevant to the notification includes the user's boss (i.e., an important person), and time restrictions related to the notification include a start time in 5 minutes (i.e., imminent). Because all of these factors point to the notification being important, the at least one processor 120 may determine that the content of the notification of FIG. 15A is high priority. However, one skilled in the art will appreciate that all of the above factors do not need to indicate that the content of the notification is important in order for the at least one processor 120 to determine that the content of the notification is high priority. Rather, if a single property of the content of the notification is found to be important, the at least one processor 120 may determine that the content of the at least one notification is high priority. Similarly, a threshold number of properties indicating that the content of the notification is important could cause the at least one processor 120 to determine that the content of the at least one notification is high priority. Alternatively, a confidence score could be utilized in which each of the properties relating to the importance of the content of the at least one notification are weighted against each other to produce a confidence score which indicates the level of confidence the at least one processor has that the content of the at least one notification is high priority. One skilled in the art will appreciate that the techniques and features related to determining a confidence score discussed above regarding combining properties of user context data are also fully applicable to determining confidence scores for analysis of content of at least one notification.

Regarding FIG. 15B, the source of the notification is a mother of the user of WHUD 100, and the content of the notification is a message which says "Your brother is in the hospital!". The at least one processor 120 may determine that since the source of the message is a known contact of the user, and the content of the message is of an urgent nature, the notification is high priority. An analysis of the content of the notification can include searching for keywords in the content, like "hospital", "injury", or "serious", for example, and searching for subjects in the content which are related to the user, such as "brother", "father", or "Bob" in a case where the user has a known contact named Bob. One skilled in the art will appreciate that the above examples of keywords to search for are merely exemplary, and that any suitable keywords could be used as appropriate for a given application. Further, any suitable analysis technique could also be applied to determine the importance of the content of the notification, as appropriate for a given application.

Regarding FIG. 15C, the source of the notification is a tea company called Delicious Tea, and the content of the notification is a message which says "New product starting today! Come try out the new Ultra-delicious tea!". The at least one processor 120 may determine that since the source of the message is not an important contact of the user, nor is the content of an urgent nature, the notification is low priority.

Regarding FIG. 15D, the source of the notification is an application installed on the device called "Mobile Button-Clicking Game", and the content of the notification is an alert which informs the user that Mobile Button-Clicking Game was successfully updated. The at least one processor 120 may determine that since the source of the content of the notification is a non-important game, and the content is of a non-urgent nature, the notification is low-priority.

Determining priority level of a notification can utilize at least one data structure, database or data store to provide data on which to base the determination. For example, a database could be utilized which stores crowdsourced user evaluations of notifications presented to users previously. Preferably, such a database would be connected to a large quantity of users, to maximize available data. With such a database, every time a notification is presented to a user, the user's reaction to the notification can be monitored and stored in the at least one database, such that the user's reaction can be utilized to inform future determinations about how similar notifications should be presented in the future. As an example, if a notification is presented to a user while the user is interacting with another human and the user quickly dismisses the notification, the at least one database could store that the notification was improperly identified as high priority and presented to the user while the user was interacting with another human, but the notification should have been identified as low priority. Consequently, similar notification content in the future could be identified as low priority instead of high priority. Similarly, other reactions from the user could be monitored and stored, such as facial expressions made by the user before and after presentation of the notification, to determine whether the user responds positively or negatively to presentation of the notification. For example, if the user shows a happy emotion upon receiving the notification, it could indicate that the user is pleased to receive the notification and that the assigned priority level of the notification is appropriate. Alternatively, if the user shows an angry emotion, it could indicate that the user is unhappy to receive the notification, and that the determined priority level of the notification is inaccurate. Further, no reaction from the user can also be monitored and stored, which could indicate that the user ignored the notification because they are too busy or are preoccupied. The at least one database may also employ a voting and/or survey system, in which user's vote on, rate, or provide feedback regarding the quality of notification presentation and notification management. In one implementation, a machine learning algorithm is used to review user reactions to presented notifications, such that the machine learning algorithm gradually improves the presentation of notifications for all users. Additionally, the at least one database or data store may employ a learning scheme wherein a user is periodically asked whether they are presently interruptible, with quick response options of "Yes" and "No", and/or with ignoring the question being treated as a "No" response. In this way, a user's habits and preferences can be learned explicitly, for future determination of priority level and threshold for notification presentation.

Figure 16:
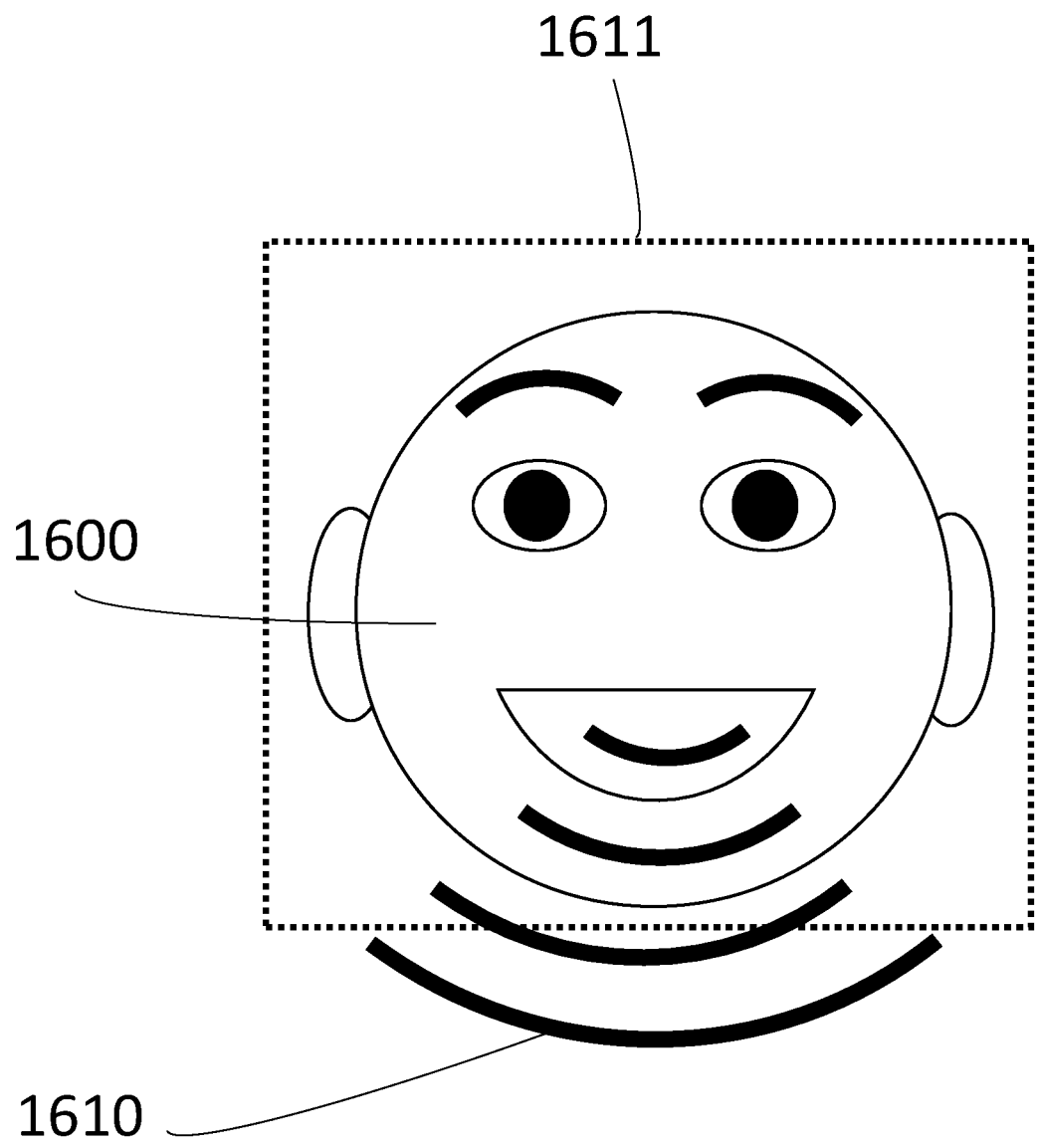
FIG. 16 is a plan view that shows exemplary attributes which can be used to determine an identity of another human with which a user is interacting, according to at least one illustrated implementation.

The priority threshold referenced in the above implementations can be a fixed number, set by developers of the WHUD 100 or the software thereon, or the priority threshold could be a fixed number set by a user. Alternatively, the at least one processor 120 can actively determine the priority threshold based on an identity of the human which the user is interacting with. In this regard, FIG. 16 illustrates a human 1600 with which a user of WHUD 100 is interacting. In the implementation of FIG. 16, microphone 111 of WHUD 100 can capture audio data including data representing spoken sound 1610 from the human 1600. The at least one processor may analyze this spoken sound 1610 to determine an identity of the human 1600. Additionally, camera 112 of WHUD 100 can capture visual data including data representing an appearance 1611 of the human 1600. The at least one processor 120 may analyze the appearance 1611 to determine an identity of the human 1600. Identification of the human 1600 can be based on analysis of the spoken sound 1610 and the appearance 1611, or can be based on analysis of the spoken sound 1610 alone, or can be based on analysis of the appearance 1611 alone. If the at least one processor 120 determines that the human 1600 is an important person, such as the user's boss, the at least one processor 120 may set the priority threshold at a high value. On the other hand, if the at least one processor 120 determines that the human 1600 is not an important person, or is unknown to the user, the at least one processor 120 may set the priority threshold to be a low to moderate value. Further, analysis of the spoken sound 1610 and the appearance 1611 can include more than just determining an identity of human 1600, but can also determine attributes like the human 1600s role, job, and relevance to the user, even if the identity of the human 1600 is not known. For example, the at least one processor 120 may identify that the human 1600 is wearing a uniform from a sales company, and thus determine that the human 1600 is a salesman. As a result, the at least one processor 120 can set the priority threshold to be low.

One skilled in the art will appreciate that in the above implementations where content of at least one notification is presented after a delay time, the features relating to the delay time can be combined for all of these implementations. For example, the features illustrated in FIG. 11 wherein the at least one processor 120 can determine whether a user is still interacting with another human based on further user context data, and determining a new delay time if the user is still interacting with another human, could be applied by one skilled in the art to the implementations shown in FIGS. 12 and 13. With regards to FIG. 12, this would mean that the at least one processor 120 can re-delay presentation of content of the first and second notifications (as well as content of any additional notifications received thereafter) after the delay time has elapsed, until the user is no longer interacting with another human. With regards to FIG. 13, the at least one processor 120 can re-delay presentation of content of the at least one notification if a priority level of the content of the at least one notification does not exceed a priority threshold, and the user is still interacting with another human.

Figure 17:
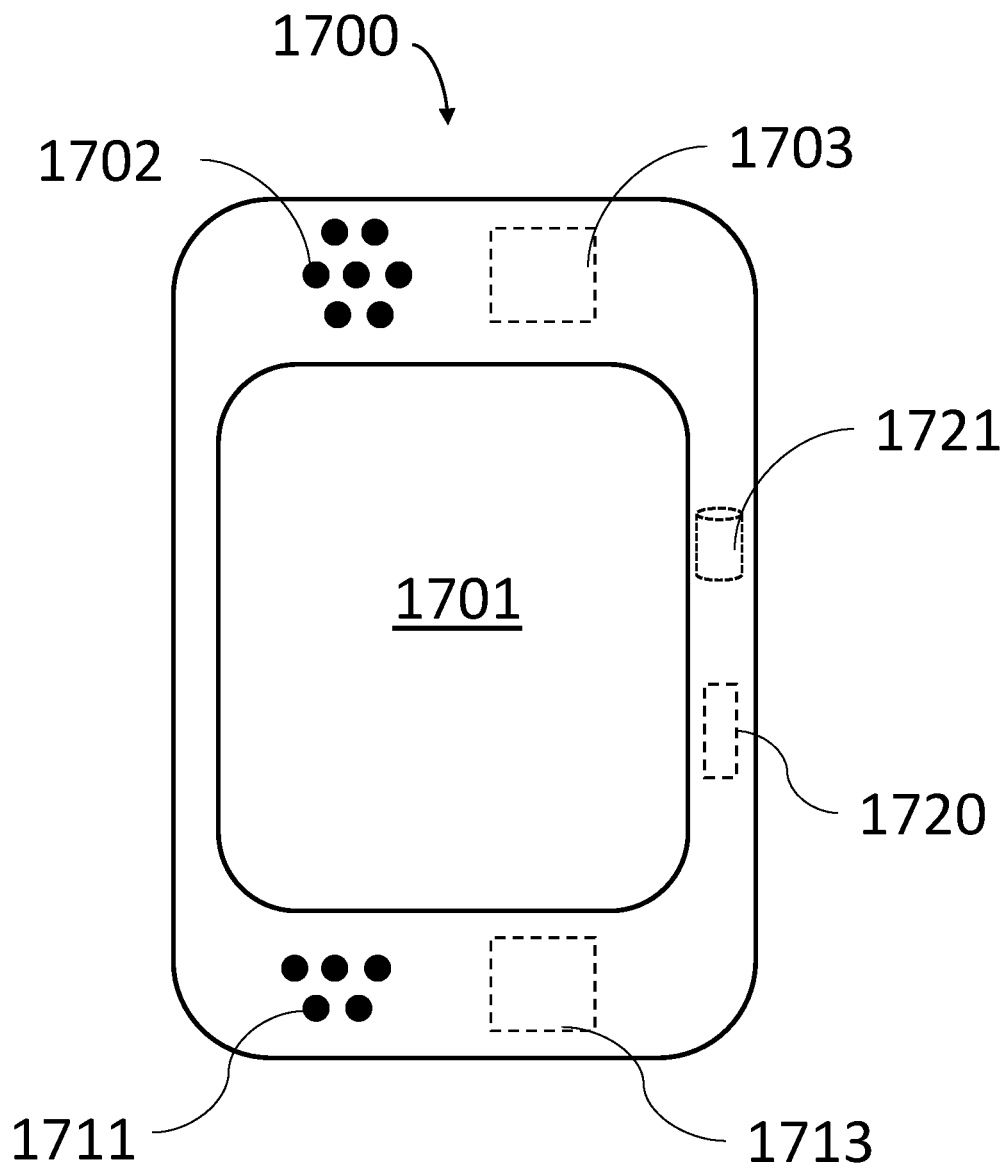
FIG. 17 is a plan view that shows an exemplary non-WHUD device which can be used to determine whether a user is interacting with another human and control presentation of notifications according to the present systems, devices, and methods.

A person of skill in the art will appreciate that the various embodiments for notification management described herein may be applied in non-WHUD applications. For example, the present systems, devices, and methods may be applied in non-wearable heads-up displays and/or in other applications that may or may not include a visible display. FIG. 17 illustrates an example of such a device 1700 to be carried in a user's pocket. Device 1700 includes output devices display 1701, speaker 1702, and haptic output interface 1703. Device 1700 also includes user context sensors microphone 1711 and IMU 1713. Device 1700 also includes at least one processor 1720 communicatively coupled to each of display 1701, speaker 1702, haptic output interface 1703, microphone 1711, and IMU 1713. Device 1700 also includes a non-transitory processor readable medium 1721 communicatively coupled to the at least one processor 1720, and having processor readable instructions stored thereon which, when executed by the at least one processor 1720, cause device 1700 to perform any of methods 200, 1000, 1100, 1200, and 1300, as illustrated in FIGS. 2, 10, 11, 12, and 13, respectively. The at least one processor 1720 can be any suitable component which can execute instructions or logic, including but not limited to a micro-controller, microprocessor, multi-core processor, integrated-circuit, ASIC, FGPA, programmable logic device, or any appropriate combination of these components. The non-transitory processor-readable medium 1721 can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

Based on user context data captured by the microphone 1711 and the IMU 1713, the at least one processor 1720 can determine whether a user of device 1700 is interacting with another human, using any of the methods discussed above regarding FIGS. 3A, 3B, 3C, 3D, 3O, and 3P. Typically with a device carried in a user's pocket, notifications are presented in a vibratory format, either as audible sound or as haptic output. In the case of device 1700, if the at least one processor 1720 determines that the user is not interacting with another human, the at least one notification can be presented to a user according to a first presentation format, such as a vibratory presentation format as exemplified in FIG. 7A, presented through speaker 1702 and/or haptic output interface 1703. If the at least one processor 1720 determines that the user is interacting with another human, the at least one notification can be presented to the user according to a second presentation format different from the first presentation format, such as an alternate vibratory representation as exemplified in FIGS. 7B-7E, presented through speaker 1702 and/or haptic output interface 1703, or a delayed presentation of the at least one notification.

In some implementations, one or more optical fiber(s) may be used to guide light signals along some of the paths illustrated herein.

The devices described herein may include one or more on-board power sources (e.g., one or more battery(ies)), a wireless transceiver for sending/receiving wireless communications, and/or a tethered connector port for coupling to a computer and/or charging the one or more on-board power source(s).

The devices described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Non-Provisional patent application Ser. No. 15/282,535.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the following are incorporated by reference herein in their entirety: U.S. Non-Provisional patent application Ser. No. 15/145,576, U.S. Non-Provisional patent application Ser. No. 15/167,458, U.S. Non-Provisional patent application Ser. No. 15/046,254, U.S. Pat. Nos. 9,299,248, 9,367,139, 9,389,694, U.S. Non-Provisional patent application Ser. No. 14/155,087, U.S. Non-Provisional patent application Ser. No. 14/155,107, PCT Patent Application PCT/US2014/057029, U.S. Non-Provisional patent application Ser. No. 15/282,535, U.S. Provisional Patent Application No. 62/577,081, U.S. Provisional Patent Application Ser. No. 62/607,816, U.S. Provisional Patent Application Ser. No. 62/607,819, U.S. Provisional Patent Application Ser. No. 62/671,248, U.S. Non-Provisional patent application Ser. No. 15/167,458, U.S. Non-Provisional patent application Ser. No. 15/827,667, U.S. Provisional Patent Application Ser. No. 62/658,436, and U.S. Provisional Application No. 62/714,489. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for presenting notification content to a user of the system, the system comprising:
at least one processor;
at least one user context sensor communicatively coupled to the at least one processor; and
a non-transitory processor-readable medium communicatively coupled to the at least one processor, wherein the non-transitory processor-readable medium stores processor-executable instructions that, when executed by the at least one processor, cause the system to:
identify, by the at least one processor, that the system is to present content of at least one notification to a user of the system;
receive, by the at least one processor, user context data from the at least one user context sensor; and
determine, by the at least one processor prior to presenting the at least one notification to the user, whether the user of the system is interacting with another human based on the user context data;
wherein if the at least one processor determines that the user is not interacting with another human, the processor-executable instructions when executed by the at least one processor further cause the system to present content of the at least one notification to the user of the system according to a first presentation format,
wherein if the at least one processor determines that the user is interacting with another human, the processor-executable instructions when executed by the at least one processor further cause the system to present content of the at least one notification to the user of the system according to a second presentation format different from the first presentation format.

2. The system of claim 1 wherein the user context data includes at least one of:
captured audio data from a microphone included in the at least one user context sensor;
captured visual data from a camera included in the at least one user context sensor;
captured user eye data from a user eye-tracking system included in the at least one user context sensor; and
captured user motion data from an inertial measurement unit included in the at least one user context sensor.

3. The system of claim 1 wherein the at least one user context sensor includes at least one microphone, the user context data includes captured audio data from the at least one microphone, and the processor-executable instructions which when executed by the at least one processor cause the at least one processor to determine whether a user of the system is interacting with another human based on the user context data cause the at least one processor to:
analyze at least one of a volume of the captured audio data, a source direction associated with the captured audio data, a source proximity associated with the captured audio data, a frequency spectrum of the captured audio data, emotion of a human represented in the captured audio data, or content of the captured audio data; and
determine whether a user of the system is interacting with another human based on one or a combination of the volume of the captured audio data, the source direction associated with the captured audio data, the source proximity associated with the captured audio data, a frequency spectrum of the captured audio data, emotion of a human represented in the capture audio data, or the content of the captured audio data.

4. The system of claim 1 wherein the at least one user context sensor includes at least one camera, the user context data includes captured visual data from the at least one camera, and the processor-executable instructions which when executed by the at least one processor cause the at least one processor to determine whether a user of the system is interacting with another human based on the user context data cause the at least one processor to:
determine that another human is represented in the captured visual data;

determine at least one of a proximity of the other human to the user, a gaze direction of the other human, a facial expression of the other human, or movement patterns of the other human based on the captured visual data; and determine whether a user of the system is interacting with the other human based on one or a combination of the proximity of the other human to the user, a gaze direction of the other human, a facial expression of the other human, or movement patterns of the other human.

5. The system of claim 1 wherein the at least one user context sensor includes at least one inertial measurement unit, the user context data includes captured user motion data from the at least one inertial measurement unit, and the processor-executable instructions which when executed by the at least one processor cause the at least one processor to determine whether a user of the system is interacting with another human based on the user context data cause the at least one processor to:

analyze at least one of head motions made by the user, head position of the user, head angle of the user, and body motions made by the user based on the captured user motion data; and determine whether a user of the system is interacting with the other human based on one or a combination of at least one of the head motions made by the user, the head position of the user, the head angle of the user, and the body motions made by the user based on the captured user motion data.

6. The system of claim 1 wherein the at least one user context sensor includes a user eye-tracking system, the user context data from the at least one user context sensor includes captured user eye data from the user eye-tracking system, and the processor-executable instructions which when executed by the at least one processor cause the at least one processor to determine whether a user of the system is interacting with another human based on the user context data cause the at least one processor to:

analyze at least one of a blink frequency of the user, gaze direction of the user, movement patterns of at least one eye of the user, movement patterns of at least one eyelid of the user, a facial expression of the user, and iris dilation patterns of at least one eye of the user based on the captured user eye data; and determine whether a user of the system is interacting with the other human based on one or a combination of the blink frequency of the user, gaze direction of the user, movement patterns of at least one eye of the user, movement patterns of at least one eyelid of the user, facial expression of the user, and iris dilation patterns of at least one of the user's eyes based on the captured user eye data.

7. The system of claim 1 wherein the user context data includes at least two of:

captured audio data from a microphone included in the at least one user context sensor;

captured visual data from a camera included in the at least one user context sensor;

captured user eye data from a user eye-tracking system included in the at least one user context sensor; and captured user motion data from an inertial measurement unit included in the at least one user context sensor.

8. The system of claim 1, further comprising a wearable heads-up display which carries the at least one processor, the non-transitory processor-readable medium, and one or more user context sensors of the at least one user context sensor.

9. The system of claim 8, further comprising a peripheral device external to the wearable heads-up display, wherein the peripheral device carries at least one user context sensor of the at least one user context sensor.

10. The system of claim 1, further comprising a display communicatively coupled to the at least one processor, wherein:

the first presentation format includes a visual presentation format in which content of the at least one notification is to be displayed by the display; and the processor-executable instructions which when executed by the at least one processor cause the system to present content of the at least one notification to the user of the system according to a second presentation format cause the system to:

generate, by the at least one processor, a visual summary representative of content of the at least one notification, the visual summary smaller in display size than the visual presentation format when displayed by the display; and display, by the display, the visual summary representative of content of the at least one notification.

11. The system of claim 1, further comprising a display communicatively coupled to the at least one processor, wherein:

the first presentation format includes a visual presentation format in which content of the at least one notification is to be displayed by the display at a first position; and the processor-executable instructions which when executed by the at least one processor cause the system to present content of the at least one notification to the user of the system according to a second presentation format cause the display to display content of the at least one notification at a second position different from the first position.

12. The system of claim 1, further comprising a vibratory output interface communicatively coupled to the at least one processor, wherein:

the first presentation format includes a vibratory presentation format in which content of the at least one notification is to be presented by the vibratory output interface; and the processor-executable instructions which when executed by the at least one processor cause the system to present content of the at least one notification to the user of the system according to a second presentation format cause the system to:

generate, by the at least one processor, an alternate vibratory representation of content of the at least one notification, the alternate vibratory representation having a vibration duration shorter than a vibration duration of the vibratory presentation format, having a vibration intensity lower than a vibration intensity of the vibratory presentation format, having a vibration pattern different from a vibration pattern of the vibratory presentation format, or having a vibration frequency different from a vibration frequency of the vibratory presentation format; and present, by the vibratory output interface, the alternate vibratory representation of content of the at least one notification.

13. The system of claim 1, further comprising a vibratory output interface communicatively coupled to the at least one processor and a display communicatively coupled to the at least one processor, wherein:

the first presentation format includes a visual presentation format in which content of the at least one notification is to be displayed by the display; and
the processor-executable instructions which when executed by the at least one processor cause the system to present content of the at least one notification to the user of the system according to a second presentation format cause the system to:
    generate, by the at least one processor, a vibratory representation of content of the at least one notification; and
    present, by the vibratory output interface, the vibratory representation of content of the at least one notification.

14. The system of claim 1 wherein:
if the at least one processor determines that the user is interacting with another human, the processor-executable instructions when executed by the at least one processor further cause the system to determine, by the at least one processor, a delay time; and
the processor-executable instructions which when executed by the at least one processor cause the system to present content of the at least one notification to the user of the system according to a second presentation format cause the system to present content of the at least one notification after the delay time has elapsed.

15. The system of claim 1 wherein if the at least one processor determines that the user is interacting with another human, the processor-executable instructions when executed by the at least one processor further cause the system to:
    determine, by the at least one processor, a delay time;
    receive, by the at least one processor, further user context data from the at least one user context sensor after the delay time has elapsed; and
    determine, by the at least one processor, whether a user of the system is still interacting with another human after the delay time has elapsed based on the further user context data,
    wherein the processor-executable instructions which when executed by the at least one processor cause the system to present content of the at least one notification to the user of the system according to a second presentation format cause the system to present content of the at least one notification if at least one processor determines that the user is no longer interacting with another human after the delay time has elapsed based on the further user context data.

16. The system of claim 1 wherein the processor-executable instructions which when executed by the at least one processor cause the system to identify, by the at least one processor, that the system is to present content of at least one notification to a user of the system cause the system to:
    identify, by the at least one processor, that the system is to present content of a first notification to the user of the system at a first time; and
    identify, by the at least one processor, that the system is to present content of a second notification to the user of the system at a second time later than the first time,
    further wherein if the at least one processor determines that the user is interacting with another human, the processor-executable instructions when executed by the at least one processor further cause the system to determine, by the at least one processor, a delay time; and
    further wherein the processor-executable instructions which when executed by the at least one processor cause the system to present content of the at least one notification to the user of the system according to a second presentation format cause the system to present content of the first notification and content of the second notification to the user of the system together after the delay time has elapsed.

17. The system of claim 1 wherein if the at least one processor determines that the user is interacting with another human, the processor-executable instructions when executed by the at least one processor further cause the system to determine, by the at least one processor, a priority level of the at least one notification, further wherein the processor-executable instructions which when executed by the at least one processor cause the system to present content of the at least one notification to the user of the system according to a second presentation format cause the system to:
    immediately present content of the at least one notification if the priority level exceeds a priority threshold; and
    present, after a delay time, content of the at least one notification if the priority level does not exceed the priority threshold.

18. The system of claim 17 wherein the processor-executable instructions which when executed by the at least one processor cause the system to determine, by the at least one processor, a priority level of the at least one notification cause the system to:
    determine, by the at least one processor, a source of content of the at least one notification, wherein the source of content of the at least one notification can include at least one of: an operating system installed on the non-transitory processor-readable medium, an application installed on the non-transitory processor-readable medium, a sensor carried by the system, or a content provider external to the system; and
    determine, by the at least one processor, a priority level of the notification based on the source of content for the at least one notification.

19. The system of claim 17 wherein the processor-executable instructions which when executed by the at least one processor cause the system to determine, by the at least one processor, a priority level of the at least one notification cause the system to determine, by the at least one processor, a priority level of the notification based on content of the at least one notification.

20. The system of claim 17 wherein if the at least one processor determines that the user is interacting with another human, the processor-executable instructions when executed by the at least one processor further cause the system to:
    determine, by the at least one processor, an identity of the other human based on the user context data; and
    determine, by the at least one processor, the priority threshold based on the identity of the other human.

21. The system of claim 1 wherein the processor-executable instructions when executed by the at least one processor further cause the system to continuously capture, by the at least one user context sensor, the user context data.

22. The system of claim 1 wherein the processor-executable instructions when executed by the at least one processor further cause the system to capture, by the at least one user context sensor, the user context data only after the at least one processor identifies that the system is to present content of at least one notification to a user of the system.

23. The system of claim 1 wherein the processor-executable instructions when executed by the at least one processor further cause the system to:
    receive, by the at least one processor, a user input to operate the system; and capture, by the at least one user context sensor, the user context data only after the at least one processor receives the user input to operate the system.

\* \* \* \* \*